(12) United States Patent
Okada et al.

(10) Patent No.: US 8,139,241 B2
(45) Date of Patent: Mar. 20, 2012

(54) PRINTING APPARATUS AND ITS CONTROL METHOD, JOB PROCESSING METHOD, AND PRINTING SYSTEM

(75) Inventors: Hideyuki Okada, Kawasaki (JP); Kazuhiko Ushiyama, Edogawa-ku (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/166,466

(22) Filed: Jun. 22, 2011

(65) Prior Publication Data

US 2011/0249283 A1      Oct. 13, 2011

Related U.S. Application Data

(63) Continuation of application No. 11/259,787, filed on Oct. 27, 2005, now abandoned.

(30) Foreign Application Priority Data

Oct. 29, 2004   (JP) .................................. 2004-316308

(51) Int. Cl.
    *G06F 3/12*    (2006.01)
(52) U.S. Cl. ................ 358/1.14; 358/1.13; 358/1.15; 358/1.16; 399/365; 399/381; 399/383
(58) Field of Classification Search .............. None
    See application file for complete search history.

(56) References Cited

U.S. PATENT DOCUMENTS

| | | | |
|---|---|---|---|
| 5,633,932 A | 5/1997 | Davis et al. | |
| 5,752,697 A | 5/1998 | Mandel et al. | |
| 6,378,070 B1 | 4/2002 | Chan et al. | |
| 6,614,546 B1 | 9/2003 | Kurozasa | |
| 6,724,492 B1 | 4/2004 | Iwase et al. | |
| 7,230,731 B2 | 6/2007 | Dan et al. | |
| 7,284,061 B2 | 10/2007 | Matsubayashi et al. | |
| 7,304,757 B2 | 12/2007 | Parry et al. | |
| 7,305,556 B2 | 12/2007 | Slick et al. | |
| 7,333,221 B2 * | 2/2008 | Okajima | 358/1.13 |
| 7,456,980 B2 * | 11/2008 | Kuboki | 358/1.13 |
| 2003/0182438 A1 | 9/2003 | Tenenbaum | |
| 2003/0199267 A1 | 10/2003 | Iwasa et al. | |
| 2004/0012812 A1 | 1/2004 | Shimizu | |
| 2004/0027602 A1 | 2/2004 | Kuboki | |
| 2004/0095595 A1 | 5/2004 | Jacobson | |
| 2004/0233469 A1 | 11/2004 | Kato | |
| 2005/0007620 A1 | 1/2005 | Kouno | |
| 2005/0046876 A1 | 3/2005 | Burget et al. | |
| 2005/0100378 A1 | 5/2005 | Kimura et al. | |

FOREIGN PATENT DOCUMENTS

| | | |
|---|---|---|
| EP | 1 315 076 A2 | 5/2003 |
| JP | 7-125391 A | 5/1995 |
| JP | 8-083153 A | 3/1996 |
| JP | 9-065148 A | 3/1997 |
| JP | 9-134264 A | 5/1997 |

(Continued)

*Primary Examiner* — Chan Park

(74) *Attorney, Agent, or Firm* — Rossi, Kimms & McDowell LLP

(57) ABSTRACT

When authentication data input before execution of print processing based on a secure print job is authenticated, a copy is printed based on the secure print job (S1909). When print processing for the designated number of copies is to be executed after the print processing, the control prompts the user to input authentication data (S1914) before the print processing. When the authentication data is authenticated, print processing is executed based on the secure print job for the designated number of copies (S1916).

7 Claims, 43 Drawing Sheets

FOREIGN PATENT DOCUMENTS

| | | |
|---|---|---|
| JP | 11-174903 A | 7/1999 |
| JP | 11-296327 A | 10/1999 |
| JP | 2001-117744 A | 4/2001 |
| JP | 2001-341361 | 12/2001 |
| JP | 2002-283677 A | 10/2002 |
| JP | 2003-208298 | 7/2003 |
| JP | 2003-300353 | 10/2003 |
| KR | 2003-0084791 A | 11/2003 |

* cited by examiner

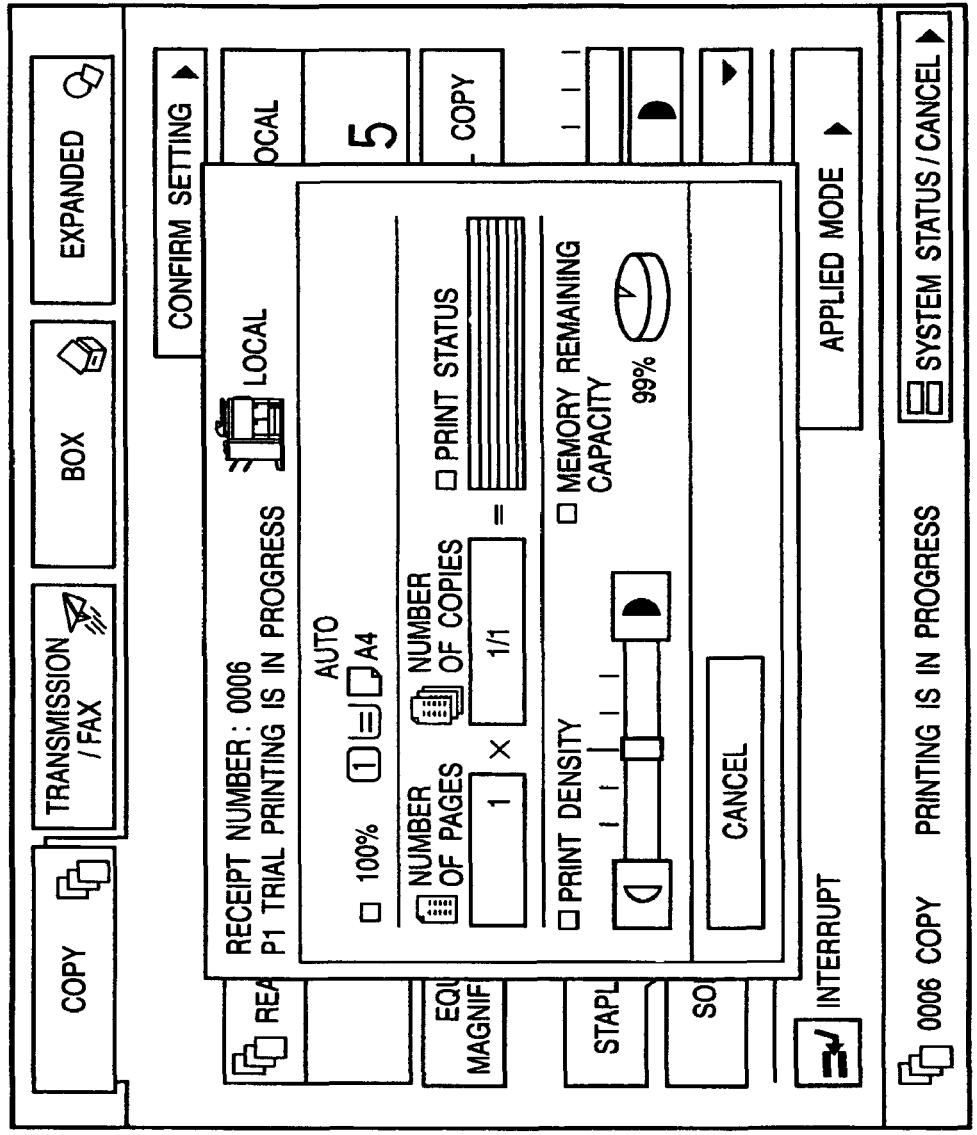
F I G. 7

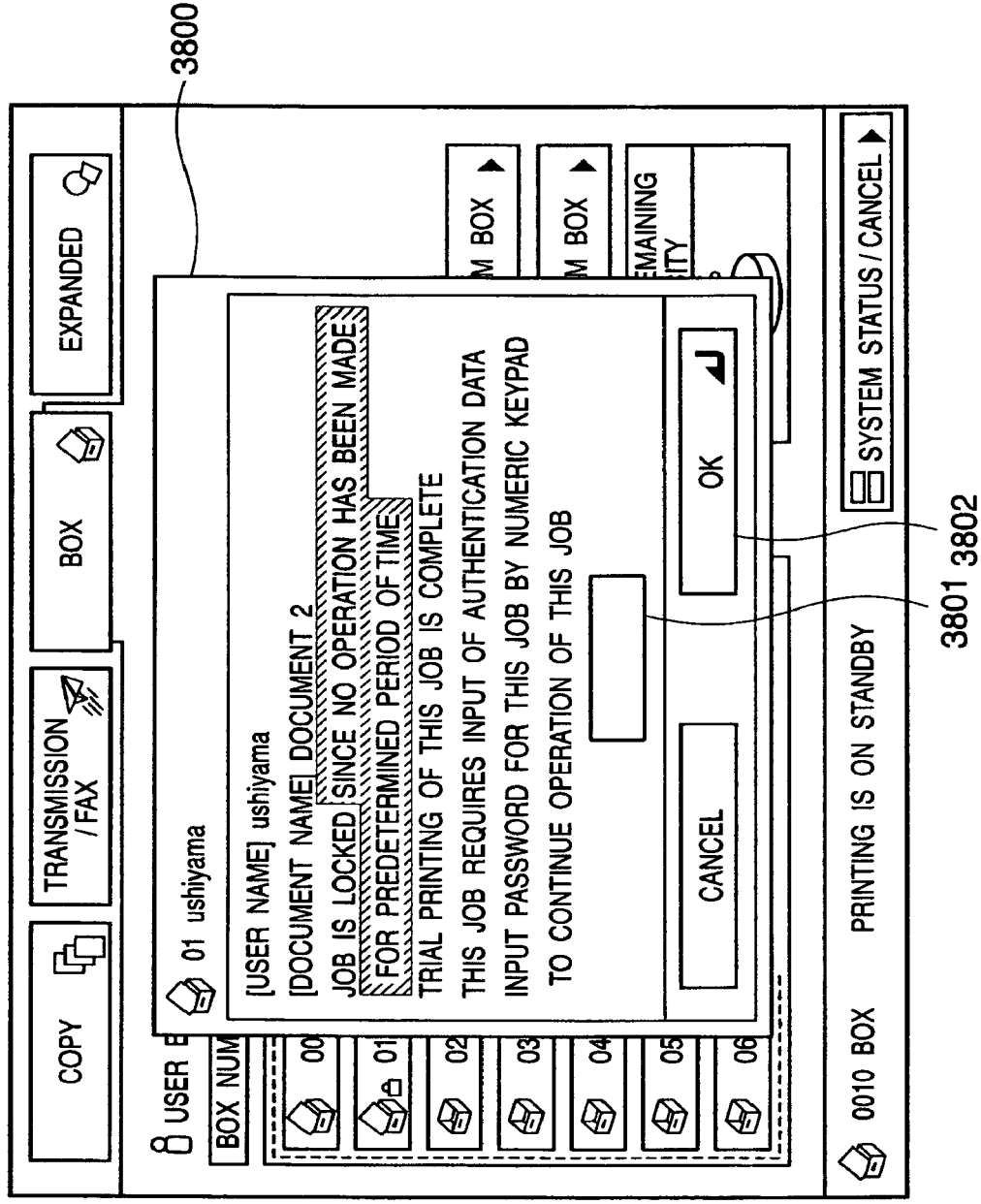

PRINTING APPARATUS AND ITS CONTROL METHOD, JOB PROCESSING METHOD, AND PRINTING SYSTEM

CROSS REFERENCE TO RELATED APPLICATION

This application is a continuation of U.S. patent application Ser. No. 11/259,787, filed Oct. 27, 2005, the entire content of which is herein incorporated by reference.

FIELD OF THE INVENTION

The present invention relates to a printing technique for executing print processing on the basis of a print job and, more particularly, to a printing technique of a print job that requires authentication processing.

BACKGROUND OF THE INVENTION

Upon printing (copying) a plurality of pages, a trial print (trial copy) function which trial-prints some pages prior to main print processing and starts print processing after it is confirmed if the user wants to start, cancel, change, or the like the main print processing is known (see Japanese Patent Laid-Open No. 2003-208298). In terms of the nature of the trial print function, the printing operation of a job to be processed by this function is paused when the user confirms the trial print result or changes the job after confirmation.

Upon printing a secure document, a secure print function which requires authentication to output and allows to output at an arbitrary timing so as to prevent information from leaking to a third party when print processing starts at a position beyond eyeshot is known (see Japanese Patent Laid-Open No. 2001-341361).

The two functions, i.e., the trial print and secure print functions are independent functions, and have no relevance to each other. A job (secure job) which requires authentication to output, and a job (non-secure job) which does not require any authentication to output have a feature in that although they require different control processes before the beginning of execution, their control processes have no difference after their print processes start in practice. For this reason, upon executing the trial print processing of a secure job, when the owner of that secure job leaves from an image forming apparatus main body for the purpose of replenishing paper sheets for the main print processing, toner, or the like after the job is interrupted, a third party may manipulate the secure job which has undergone the trial print processing and waits for post-processing. Hence, the main print operation of the secure job may be executed, and the document security may not be protected.

SUMMARY OF THE INVENTION

The present invention has been made in consideration of the aforementioned problems, and has as its object to provide a technique for maintaining the security of a document to be printed even after execution of trial print processing, when trial print processing is to be executed based on a secure job. It is another object of the present invention to prevent a problem such as poor usability or the like, which is posed to maintain the security after the trial print processing of a secure job upon execution of the trial print processing of a job other than the secure job such as a non-secure job, and to simultaneously realize an effect of maintaining security even after the trial print processing of a secure job and an effect of improving usability upon execution of the trial print processing of a non-secure job.

In order to achieve an object of the present invention, for example, a job processing method of the present invention comprises the following arrangement.

That is, a job processing method in a printing system includes a printing device can accept a plurality of types of print job including a print job of a first type and a print job of a second type, the method comprising the steps of:

enabling an execution of a processing for data of a print job in which a trial printing was performed by the printing device; and enabling the execution of the processing for data of the print job in which the trial printing was performed by the printing device, after an authentication processing for the print job, in case that the job in which the trial printing was performed is the job of the first type but not the job of the second type.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 shows a display example of an operation window (user interface) to be displayed on the display unit 301;

FIG. 38 shows a display example of an operation window (user interface) to be displayed on the display unit 301.

DETAILED DESCRIPTION OF THE PREFERRED EMBODIMENTS

Preferred embodiments of the present invention will now be described in detail in accordance with the accompanying drawings.

First Embodiment

An image forming apparatus as a digital multi-functional peripheral (MFP) comprising a plurality of functions (also called modes) such as a copy function, print function, facsimile function, and the like, and a printing system having this image forming apparatus will be described hereinafter.

Figure 1:
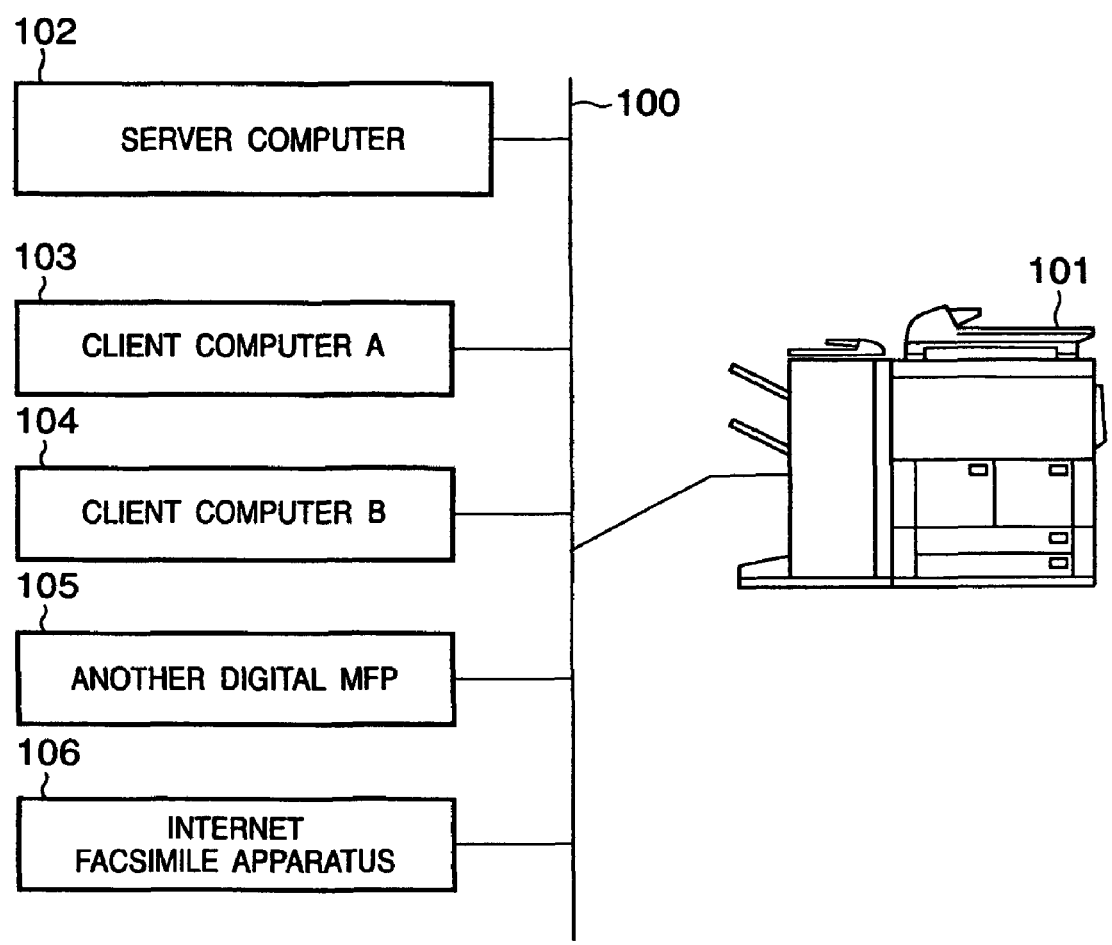
FIG. 1 is a diagram showing the basic arrangement of a printing system according to the first embodiment of the present invention.

FIG. 1 is a diagram showing the basic arrangement of the printing system according to this embodiment. The system according to this embodiment includes an image forming apparatus 101, server computer 102, client computer A 103, client computer B 104, another digital MFP 105, and Internet facsimile apparatus 106. These apparatuses can communicate data with each other via a network 100 such as a LAN or the like. Note that the network 100 is not limited to either a wireless or wired one.

Note that the gist of the following description is not limited by the numbers of respective apparatuses, and a system that can be applied to the following description is not limited to the arrangement shown in FIG. 1 as long as the system includes the image forming apparatus 101 and also an apparatus which can transmit a job to this image forming apparatus 101.

The image forming apparatus 101 will be described below.

The image forming apparatus 101 has a plurality of modes (functions) such as a copy mode, print mode, facsimile mode, and the like. The image forming apparatus 101 can execute various kinds of output processing of job data scanned by a scanner unit of the self apparatus, job data output from the client computer A 103 or B 104, job data output from a scanner of the other digital MFP 105, job data output from the Internet facsimile apparatus 106, and the like. For example, the image forming apparatus 101 can make a printer unit of the self apparatus execute print processing of such job data via a storage unit such as a hard disk or the like of the self apparatus, can transfer such job data to another apparatus via a communication unit of the self apparatus, and so forth.

The print function of the image forming apparatus 101 will be described below. The image forming apparatus 101 comprises an automatic document feeder (so-called ADF) which can automatically and continuously scan a plurality of documents in turn from the first page side in the scanner unit of the self apparatus. Also, the image forming apparatus 101 comprises a plurality of paper feed units (paper feed cassettes) in the printer unit of the self apparatus, can store print sheets of different media types (different sizes and types of print sheets) for respective paper feed units, and selectively feeds a sheet from the paper feed unit of the user's choice to allow the printer unit to print.

The image forming apparatus 101 comprises a so-called sort function of applying sort processing to print sheets printed by the printer unit, a staple function of applying staple processing to print sheets, a punch function of applying punch processing to print sheets printed by the printer unit, and a saddle stitch function of applying folding processing and bookbinding processing to print sheets printed by the printer unit. The image forming apparatus 101 comprises a finisher as a sheet processing device for executing these sheet processing functions in the printer unit.

Figure 2:
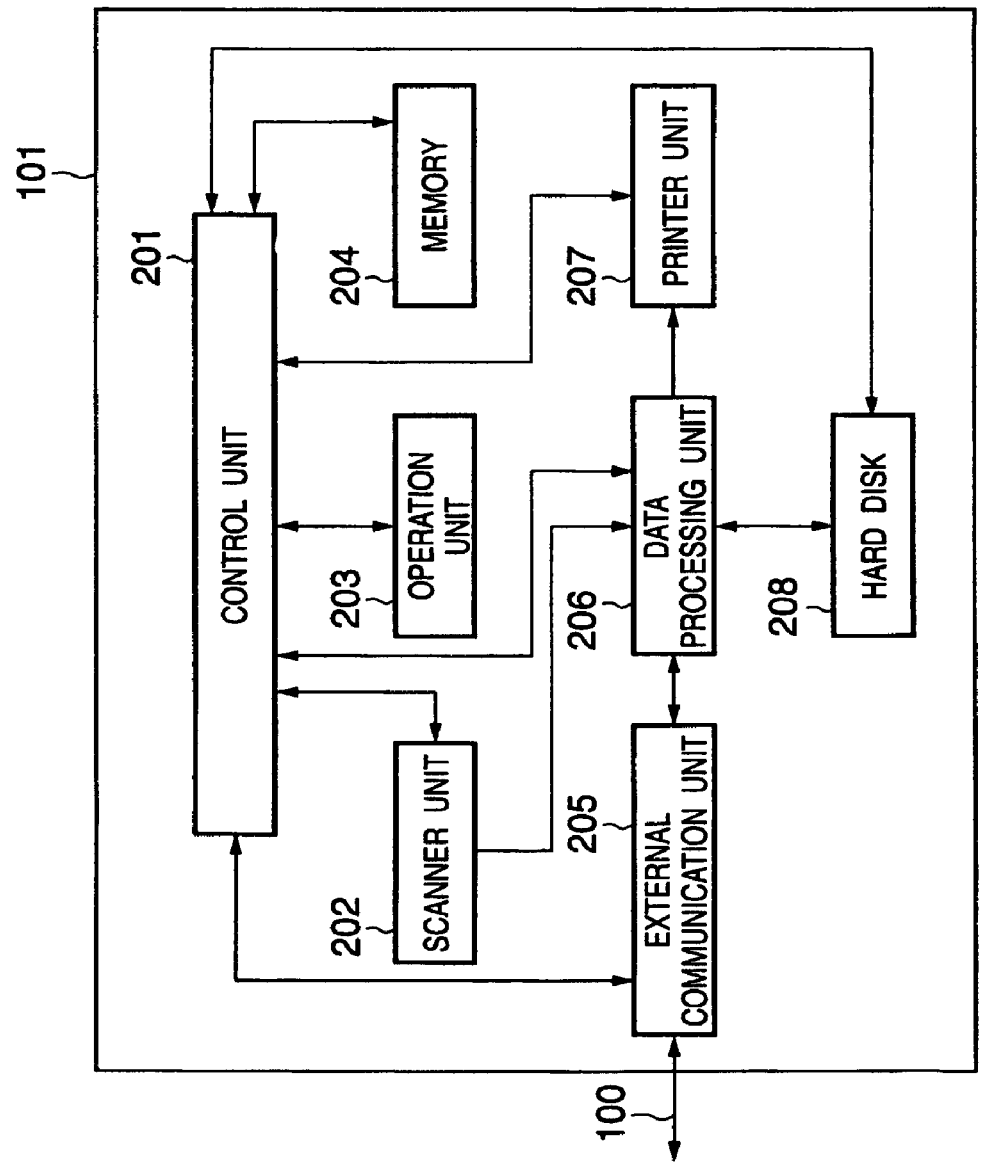
FIG. 2 is a block diagram showing the functional arrangement of an image forming apparatus 101.

FIG. 2 is a block diagram showing the functional arrangement of the image forming apparatus 101. The same reference numeral in FIG. 2 denote the same parts as in FIG. 1.

As shown in FIG. 2, the image forming apparatus 101 comprises various units such as a control unit 201, scanner unit 202, operation unit 203, memory 204, external communication unit 205, data processing unit 206, printer unit 207, hard disk 208, and the like.

The scanner unit 202 has a document feeder such as an ADF or the like, executes scan processing of a document image set on a document table, and outputs the scanned image data to the data processing unit 206.

The operation unit 203 includes a liquid crystal display unit of a touch panel type and a button group, and the information display for the operator of the image forming apparatus 101 and the operation input by the operator of the image forming apparatus 101 are made via this operation unit 203. The memory 204 stores programs and data required for the control unit 201 to control respective units, programs and data required for the image processing unit 101 to execute respective processes (to be described later), various kinds of management information, and the like.

The external communication unit 205 exchanges various data (image data, command data, status request information, status information, time data, and the like) with various external apparatuses (e.g., the server computer 102, client computers A 103 and B 104, and the other digital MFP 105, shown in FIG. 1) via the network 100.

The data processing unit 206 comprises a memory such as a page memory or the like used upon processing image data, a rendering unit for rendering PDL data from the image processing unit or external apparatus to bitmap data, a compression/decompression unit for executing compression processing and decompression processing of data, and the like. The data processing unit 206 appropriately processes job data (including image data) from the scanner unit 202 or job data input from the external apparatus via the external communication unit 205 in accordance with output processing conditions set for that job data, and outputs processed image data to the hard disk 208 or printer unit 207, or to the external communication unit 205 when the data is transmitted to the external apparatus.

The hard disk 208 comprises a storage area that can store and hold a plurality of job data (a plurality of a series of image data), and can store and hold job data input from the scanner unit 202 via the data processing unit 206, job data from various external apparatuses (e.g., the server computer 102, client computers A 103 and B 104, and the other digital MFP 105, shown in FIG. 1), and the like. Also, the hard disk 208 saves programs and data for making the control unit 201 execute respective processes (to be described later) to be implemented by the image forming apparatus 101. These programs and data saved in the hard disk 208 are read out onto the memory 204 in accordance with the control processing of the control unit 201, and are used when the control unit 201 executes various processes.

The printer unit 207 executes print processing of job data input from the scanner unit 202 via the data processing unit 206, job data from various external apparatuses (e.g., the server computer 102, client computers A 103 and B 104, and the other digital MFP 105, shown in FIG. 1), or job data from the hard disk 208 in accordance with print conditions set for that job.

Even during a print operation of a given print job executed by the printer unit 207, print job data (image data) can be accepted from the external apparatuses (e.g., the server computer 102, client computers A 103 and B 104, and the other digital MFP 105, shown in FIG. 1) and the scanner unit 202 of the self apparatus, and the accepted job data are sequentially saved in the hard disk 208. Independently of and parallel to the print operation of a job by the printer unit 207, the input operations of other jobs from the scanner unit 202 and external apparatuses (e.g., the server computer 102, client computers A 103 and B 104, and the other digital MFP 105, shown in FIG. 1) and storage processing of these jobs in the hard disk 208 can be executed.

In the following description, of any jobs of the copy function, print function, and facsimile function, a job which is to undergo print processing by the printer unit 207 will be generically called a "print job".

The control unit 201 includes a processor such as a CPU, MPU, or the like, controls the operations of the respective units, and executes respective processes (to be described later) to be implemented by the image processing apparatus 101.

In this embodiment, all the units shown in FIG. 2 are equipped in the image forming apparatus 101. However, the present invention is not limited to this, and some of these units may be externally arranged. As such arrangement, an arrangement which equips a storage unit such as the hard disk 208 or the like as an external device, an arrangement that houses respective units in independent housings, and the like are available. The following description can be applied to systems with these arrangements.

In order to recognize the operation states of these units, the control unit 201 can issue query data to the respective units and can receive reply result data, thus recognizing the status of each unit. The control unit 201 can acquire and recognize various kinds of status information. For example, the control unit 201 confirms information as to whether or not the document scan processing of the scanner unit 202 is in progress, information as to whether or not a document jam has occurred, and the like on the basis of status information from the scanner unit 202. Also, the control unit 201 confirms information as to whether or not read/write processing of job data of the hard disk 208 is in progress and the like on the basis of status information from the hard disk 208. Furthermore, the control unit 201 confirms information as to whether or not the print processing of the printer unit 207 is in progress, information as to whether or not an error has occurred, and the like on the basis of information from the printer unit 207. Moreover, the control unit 201 confirms information as to whether or not reception of external data of the external communication unit 205 is in progress, information as to whether or not data transfer to an external apparatus of the external communication unit 205 is in progress, and the like on the basis of information from the external communication unit 205.

The operation unit 203 controlled by the control unit 201 will be described below using FIG. 3.

Figure 3:
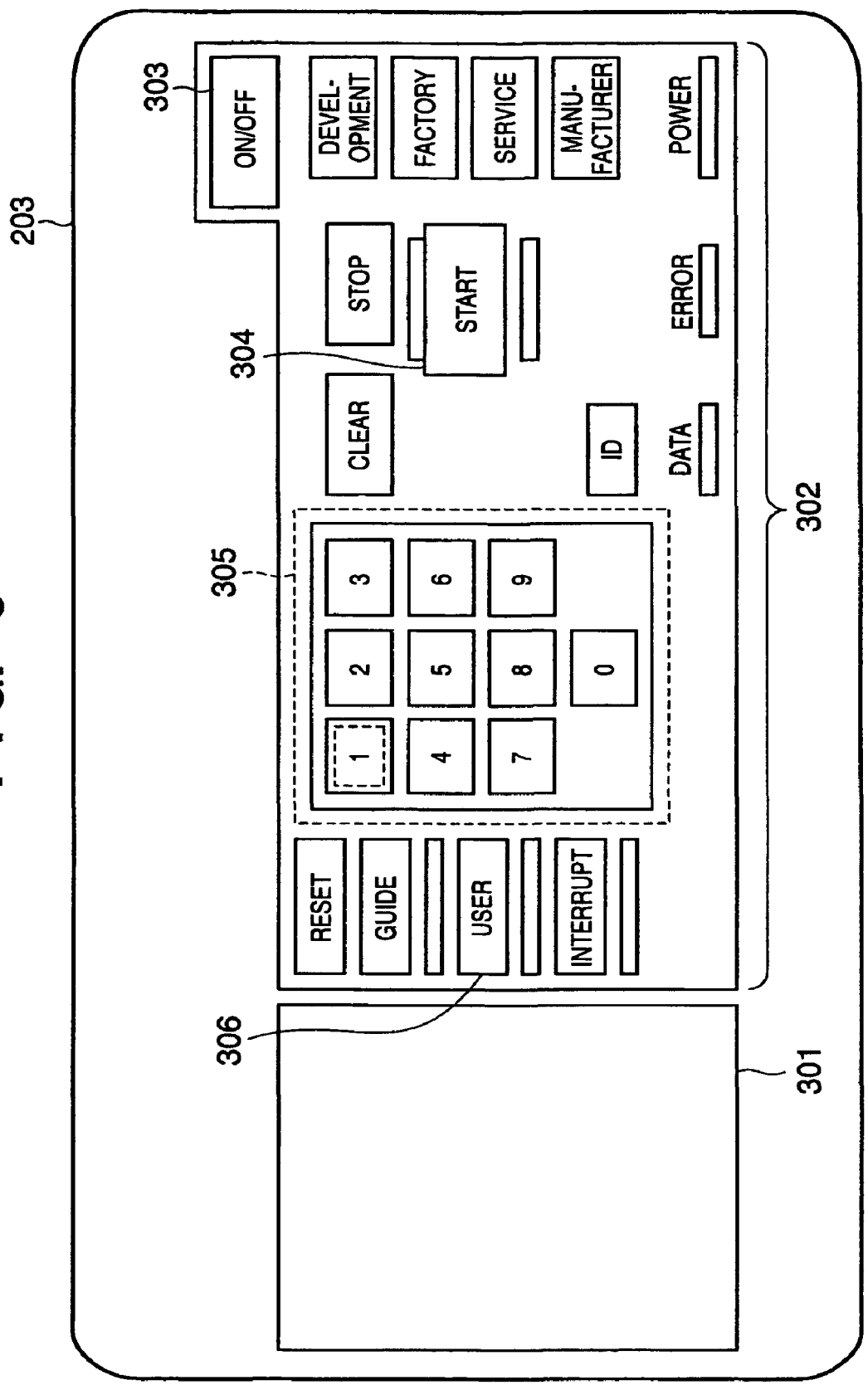
FIG. 3 shows an example of the arrangement of an operation unit 203 shown in FIG. 2.

FIG. 3 shows an example of the arrangement of the operation unit 203 shown in FIG. 2. The same reference numerals in FIG. 3 denote the same parts as in FIG. 2.

Referring to FIG. 3, the operation unit 203 comprises a display unit 301 and button group 302. The display unit 301 comprises a liquid crystal type touch panel, and has a function of displaying various kinds of information, button icons, and the like, and a function of detecting a position designated on the display screen, and notifying the control unit 201 of that position. Note that the arrangement of the operation unit 203 is not limited to such specific arrangement, and the operation unit 203 need only have a function of displaying information, and a function of inputting various instructions.

The button group 302 will be described below. A key 303 is used to instruct to turn on/off the power supply of the image forming apparatus 101. Every time the operator presses the key 303, the power supply of the image forming apparatus 101 is switched to either ON/OFF. A start key 304 is used to instruct execution of processing. Keys 305 are used to input various numerical values as a numeric keypad. For example, the keys 305 can be used to input and set the number of print copies and the like. A user key 306 is used to input instructions for displaying various user mode setting windows for initial settings, administrator settings, timer settings, and the like. Note that the button group 302 includes an indicator used to notify the operation that data reception is in progress, an indicator used to notify the operator of occurrence of an error by flickering, an indicator used to notify the operator that the power supply is ON, and the like.

Various operation window examples to be displayed on the display unit 301 in the operation unit 203 under the display control of the control unit 201, and various operation control examples based on user's operations made via these windows will be described below using FIGS. 4 to 32.

FIGS. 4 to 32 show display examples of operation windows (user interfaces) to be displayed on the display unit 301 shown in FIG. 3.

Figure 4:
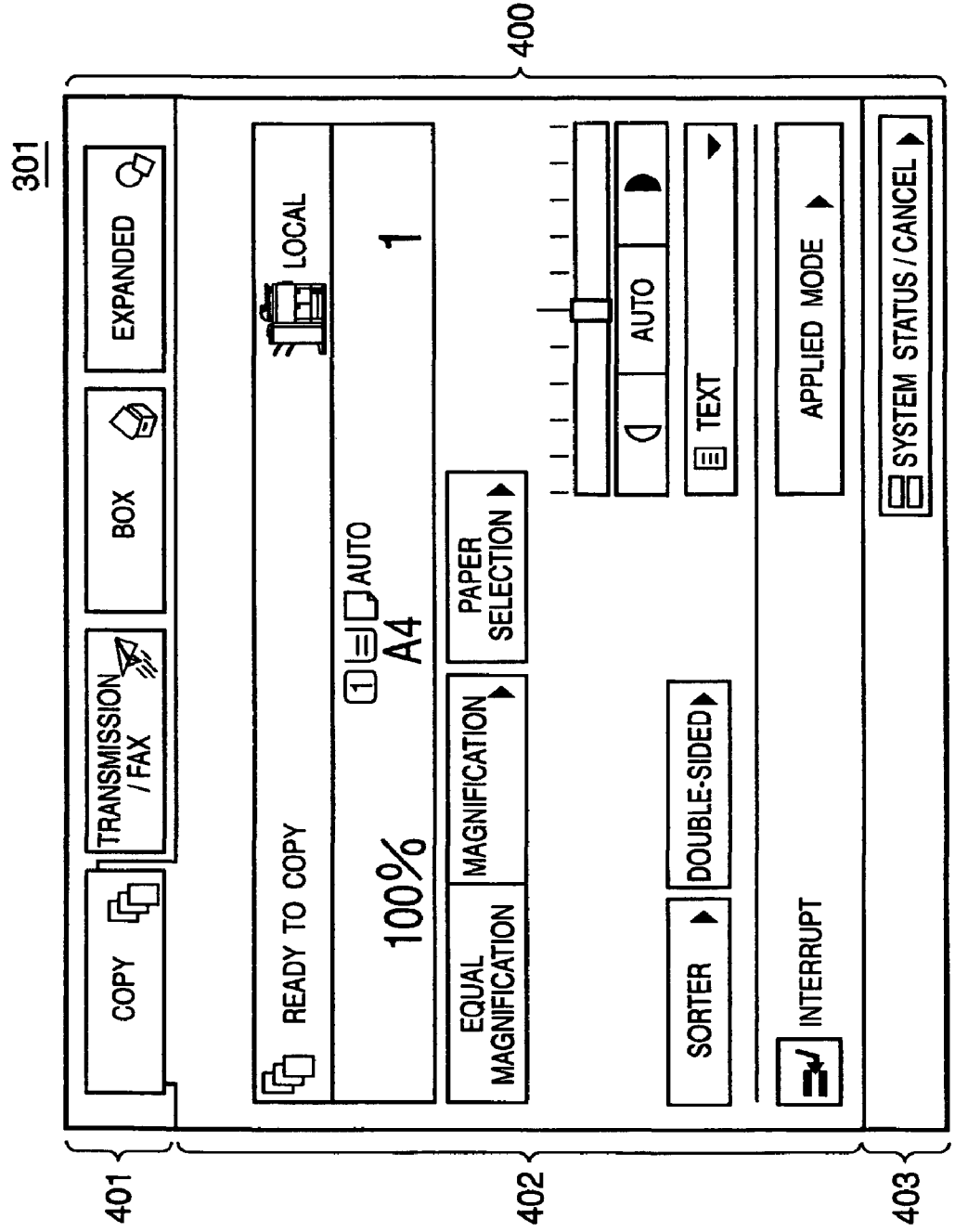
FIG. 4 shows a display example of an operation window (user interface) to be displayed on a display unit 301.

As shown in FIG. 4, a display window 400 to be displayed on the liquid crystal display unit 301 is roughly classified into three display components. Note that FIG. 4 is a view for roughly explaining the configuration of the display window, and does not illustrate all components to be displayed on an actual display window.

Reference numeral 401 denotes a function selection area which comprises operation instruction keys (operation buttons) used by the operator to select a desired one of a plurality of operation modes (also called functions) of the image forming apparatus 101, which include a copy mode, transmission mode, facsimile mode, box mode, expanded mode, and the like.

Reference numeral 402 denotes a processing condition setting area which comprises operation instruction keys used by the operator to set various processing conditions (e.g., print setting parameters, see FIG. 5) for job data (image data) to be processed in the operation mode selected by the operator using the function selection area 401.

Reference numeral 403 denotes a status display area which allows the operator to be notified of and confirm various kinds of status information (including operation status information such as image data loading in progress, print in progress, and the like, various kinds of error information such as a document jam, print sheet jam, staple jam, and the like, various kinds of warning information such as out-of-toner, out-of-paper, and the like, and so forth) indicating the operation states of the image forming apparatus 101.

In this manner, the contents of the display window to be displayed on the display unit 301 have these three display components. The processing condition setting area 402 undergoes display control to have display contents according to the mode selected on the function selection area 401. The function selection area 401 undergoes display control to be able to function after transition to another window (for example, an operation window that displays the function selection area 401 even after transition to another window, and allows the operator to select a function). The status display area 403 undergoes display control to allow the user to always confirm status information of the image forming apparatus even after transition to any window (the status line (display area) 403 is displayed independently of a window to be switched).

This image forming apparatus 101 has a copy mode which controls the printer unit 207 to print job data (also called image data) from the scanner unit 202 via a memory such as the hard disk 208 or the like. Also, the image forming apparatus 101 has an external print mode which controls the printer unit 207 to print job data from an external apparatus such as the client computer A 103 or B 104, the other digital MFP 105, facsimile apparatus 106, or the like via a memory such as the hard disk 208 or the like. The image forming apparatus 101 has a box mode which stores job data output from the scanner unit 202 and job data output from the external apparatus in a predetermined storage area (also called a box area) in the hard disk 208, allows the user to select desired job data from the operation unit 203 after the job data area stored in the box, and controls the printer unit 207 to print the selected job data or controls the external communication unit 205 to transmit the job data to the external apparatus. In this manner, the image forming apparatus 101 of this embodiment comprises a plurality of operation modes including at least two operation modes. However, this embodiment is not limited to this, and may be applied to a single-function image forming apparatus having only one of these operation modes.

Print processing to be executed by the image forming apparatus 101 will be described below. A print job input to the hard disk 208 of the image forming apparatus 101 is the one transmitted from the external apparatus or the one input from the scanner unit 202 of the self apparatus. Print jobs input to the hard disk 208 are sequentially stored in the hard disk 208, and include a "secure job" and "non-secure job".

The "secure job" allows to be printed only when an input password is authenticated. For example, in this embodiment, job data accepted from a data generation source such as an external apparatus (e.g., a computer or the like or another image forming apparatus or the like) and/or the scanner unit of the self apparatus is held in a memory such as the hard disk of the self apparatus or the like without being immediately printed by the printer unit. After the job data is stored in the memory, the user who wants to print that job inputs authentication data such as a password or the like via a user interface such as the operation unit of this image forming apparatus or the like. Under the condition that the authentication data that matches authentication data set in advance for that job is input via the user interface of the image forming apparatus, the controller of the image forming apparatus controls to execute print processing of the job data held in the hard disk. In other words, the secure job is a job which is held in the memory of the image forming apparatus in a locked state unless appropriate authentication processing (including processing for prompting the user to input authentication data which matches that for the job held in the memory on the image forming apparatus side) is executed by the image forming apparatus, and is prohibited from being freely read out from the memory and printed.

On the other hand, when print processing is to be done based on the "non-secure job", no password input is required. That is, for example, a job in a normal print mode corresponds to this job. In other words, the "non-secure job" is a job which is allowed to be automatically printed (without any intervention of the operator such as an explicit print instruction or the like to be issued after the operator inputs the job to the memory) without any authentication processing or the like executed by the image forming apparatus after the job is input to the memory.

Hence, for example, when the client computer A 103 transmits a print job to the image forming apparatus 101, the client computer A 103 allows the user on the computer side to set via a printer driver or the like to be displayed on, e.g., the display of the computer whether or not this job is a secure or non-secure job. When this job is to be set as a secure job, the user on the computer side determines a password via, e.g., the printer driver, and the computer transmits the print job to this image forming apparatus while appending command data indicating a job in a secure print mode to the job data (document data to be printed. The image forming apparatus 101 sequentially stores the received job data in the hard disk 208 in the form of a queue.

After a job is stored in the hard disk 208, the user may set this job to be a secure job using the operation unit 203. In this case, the user sets a password by making the same operation as that made on the computer A 103 side. After the password is set, the control unit 201 appends this password to the job data, thus setting this job as a secure job.

A storage area for holding data to be stored in a "box" (corresponding to a folder) is assured in advance on the hard disk 208, and there are a plurality of such "boxes". For example, when operator A creates box A, and when operator A operates the image forming apparatus 101 to receive a print job from the scanner unit 202, this job data is stored in box A. Whether or not the operator of the image forming apparatus 101 is operator A may be determined by prompting the operator to input a password before use of this apparatus, and if the password is authenticated, it may be determined that the operator is operator A. Therefore, a "box for storing secure jobs" and a "box for storing non-secure jobs" may be set for respective boxes. In this case, jobs stored in the box set as the "box for storing secure jobs" are namely secure jobs.

In any case, print job data are sequentially saved in the hard disk 208.

When the user selects "copy" on the function selection area 401, print job data is registered by enqueuing it in a queue; when the user selects "box", print job data is registered in one of boxes.

Print processes to be executed when "copy" is selected (copy mode) and when "box" is selected (box mode) will be respectively explained below.

An example when the image forming apparatus 101 of this embodiment executes job processing using its trial print function under the control of the control unit 201 of this apparatus will be described below. The following description will be given using a job in the copy mode that controls the printer unit 207 to print job data input from the scanner unit 202 of the image forming apparatus via the hard disk 208 of the apparatus.

Figure 5:
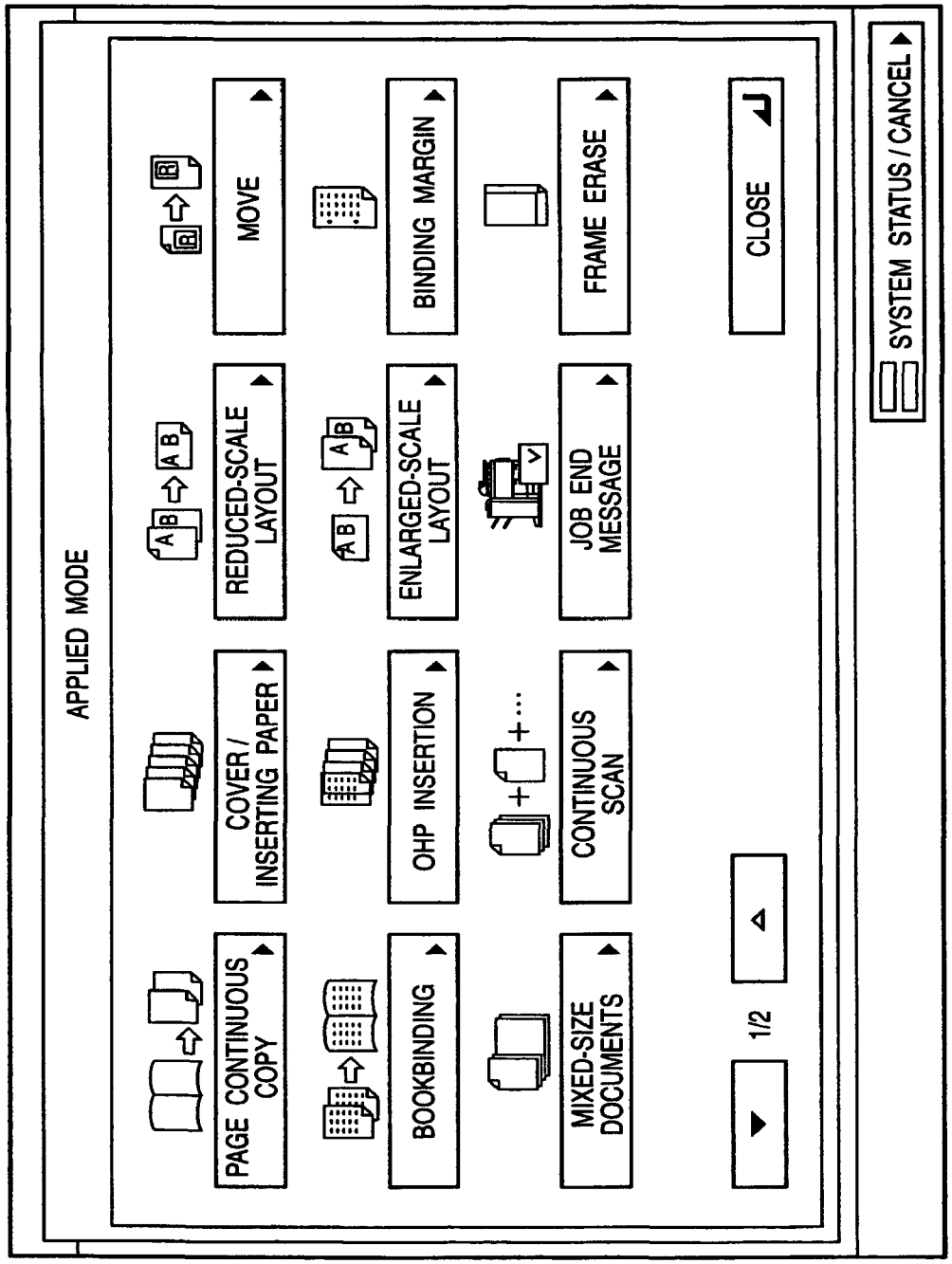
FIG. 5 shows a display example of an operation window (user interface) to be displayed on the display unit 301.

When the user selects the copy mode on the operation unit 203, the control unit 201 controls the display unit 301 of the operation unit 203 to display the operation window shown in FIG. 4 in response to this selection. The control unit 201 controls the display unit to display a display window to allow the user to set various print conditions for a job to be output such as a setting of an output paper size, a setting of the number of output copies, a setting of a print magnification, a print setting of double- or single-sided printing, a finishing setting associated with an instruction for applying at least one sheet processing of sort processing, staple processing, punch processing, and bookbinding processing to printed sheets, and the like of the job to be printed. When the user presses an applied mode key on the window of FIG. 4, a display window shown in FIG. 5 is displayed, and allows the user to set various other print conditions (various settings such as continuous page copy, cover paper/inserting paper, reduced-scale layout, and the like) which are not displayed on the window of FIG. 4.

Assume that the user has made various settings as follows as print conditions for a job (a job including four pages of a document) while displaying the operation window shown in FIG. 4 on the display unit 301.

(Condition 1) "5" copies are set as the number of output copies using the numeric keypad 305 of the operation unit 203.

(Condition 2) An output magnification is equal to the document image size (100%).

(Condition 3) "Staple" is set as the finishing setting via a touch panel key.

(Condition 4) "Double-sided printing" is set as a setting for faces to be printed via a touch panel key.

Assume that the user sets a series of print conditions having a plurality of print condition parameters for the job data including image data for four pages to be output via the operation window of FIG. 4 and the like. In response to this, the control unit 201 controls to display a setting window shown in FIG. 6 to allow the operator to confirm the contents set for the job, and can accept an instruction for making this image forming apparatus execute a trial print operation of the job from the user via a trial copy key (also called a trial print key) 1 on the window of FIG. 6.

Figure 6:
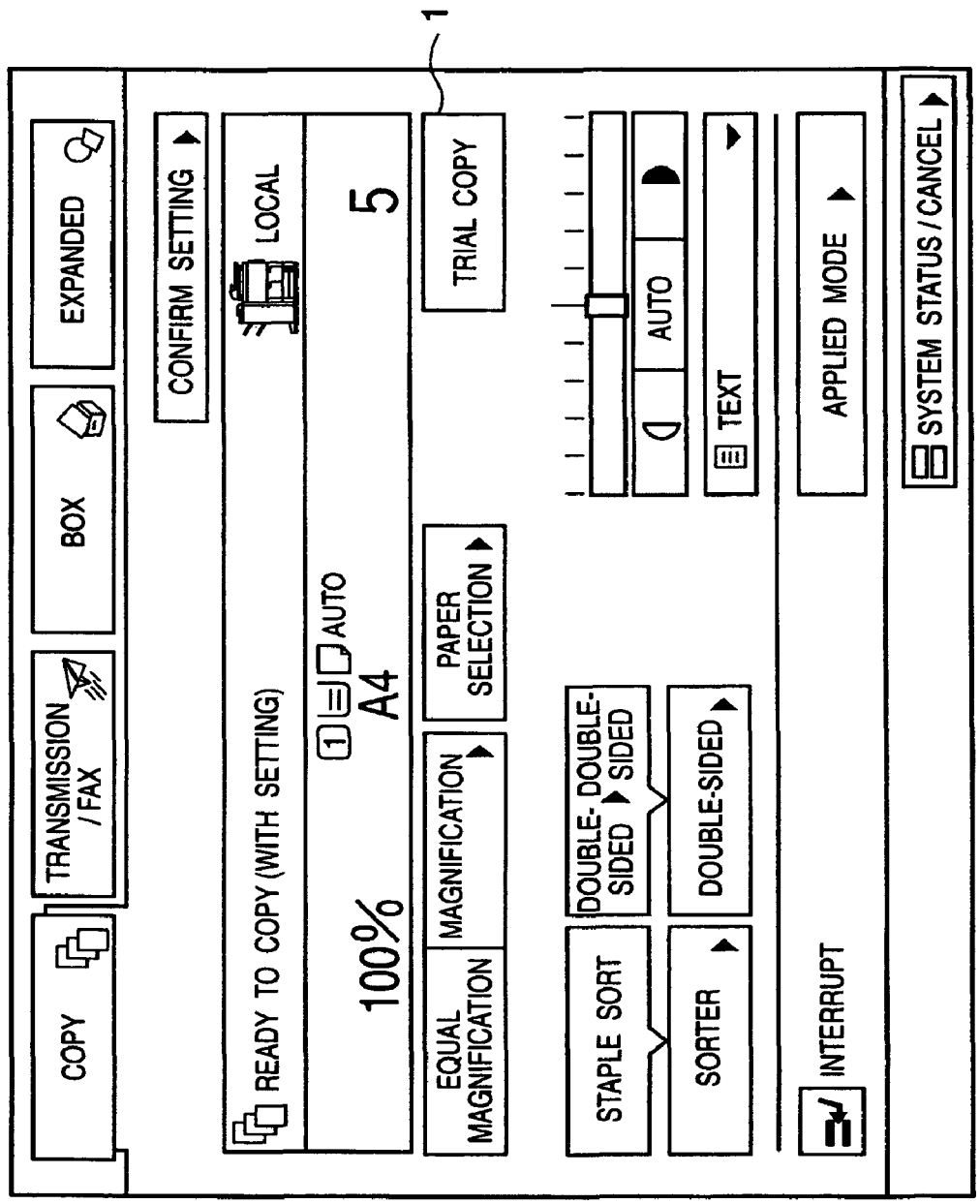
FIG. 6 shows a display example of an operation window (user interface) to be displayed on the display unit 301.

As can be seen from comparison between the windows shown in FIGS. 4 and 6, the control unit 201 controls to display the trial print (trial copy) key 1 on the operation window of FIG. 6. When the setting contents of the print conditions set by the user includes conditions that the number of output copies is 2 or more, the finishing setting such as staple, sort, or the like is ON, and so forth, the control unit 201 controls to display the trial print key 1 on the operation unit, and allows the user to instruct to execute trial print processing according to the set print conditions via the trial print key.

In this way, according to this embodiment, when the above condition is met (at least one of when the set number of output copies is 2 or more and when the finishing setting is ON), the control is made to display the trial print key 1 (see the UI in FIG. 6) to permit execution of the trial print function.

On the other hand, if the above condition is not met (at least one of when the set number of output copies is 1 and when the finishing setting is OFF), the control is made to prohibit the trial print key from being displayed on the display unit 301 to prohibit execution of the trial print function. For example, first of all, when the number of output copies is 1, the print operation remains the same independently of trial or main print processing. Even when the settings of the print conditions are changed to redo printing, the user can easily change the settings of the print conditions. In addition, if the number of print copies is only one in the first place, no wasteful output occurs. Hence, paying attention to these facts, this specification is determined with due considerations to the user so as not to introduce extra confusion to him or her.

The description will revert to FIG. 6. When the user inputs a trial print execution instruction by pressing the trial print key 1 on the window and then presses the start key 304 of the operation unit 203 in FIG. 3 while the display window in FIG. 6 is displayed on the display unit 301, the control unit 201 controls the image forming apparatus to execute the following trial print operation of the job.

The control unit 201 starts scan processing of document image data for four pages of the job, which are set on the document feeder of the scan unit 202 starts, and sequentially stores data in the hard disk 208 page by page. As processing of the job having the image data for four pages stored in the hard disk 208, a magnification is set to be an equal magnification (equal to the document image size), the first and second pages of the job are printed on two faces of the first print sheet (A4-size print sheet), the first print sheet is exhausted onto a processing tray with the first page facing down (to be exhausted in a face-down state), the third and fourth pages of the job are recorded on the observe and reverse faces of the second print sheet (A4-size print sheet), and the second print sheet is exhausted in a similar exhaust mode. When the two print sheets are stacked on the processing tray, the control unit 201 controls a stapler of the finisher to apply staple processing to a bundle of sheets including the two print sheets. Upon determination of completion of the processing based on information from an exhaust sensor, the control unit 201 pauses the print operation of the job.

As described above, in the trial print mode, the control unit 201 controls the image forming apparatus to execute the print operation of the job according to print conditions based on the plurality of print condition parameters set by the user while ignoring the print setting associated with the number of output copies. That is, in the trial print mode, the control unit 201 controls to process the job under the print conditions: the magnification=100%, the paper size=A4 size, double-sided printing=ON, staple=ON, and the number of output copies=1.

Note that the control unit 201 controls the display unit 301 to display an operation window of FIG. 7, so as to notify the user of the job processing status during the trial print operation. In this example, the job is processed as a receipt number "0006", and the window in FIG. 7 notifies the user that the number of print copies is 1, and the print operation of the image of the first page of the job is now in progress.

In this embodiment, the user confirms the output product for one copy to check if it is a desired print result. After that, various instructions can be selectively accepted from the user via the display unit 301 of the operation unit 203, so as to continue the print operation of the job intact without changing the settings of the print conditions, to redo the print operation by changing the settings of the print conditions, or to cancel the print processing itself of this job.

Note that if the user inputs a print execution instruction via the start key 304 of the operation unit 203 without pressing the trial print key 1 on the window of FIG. 6, i.e., without inputting any trial print operation instruction, the control unit 201 controls to execute print processing in accordance with all the print conditions set by the user as the print operation of the job in response to this input. That is, in this example, the control unit 201 controls to process the job under the print conditions: the magnification=100%, the paper size=A4 size, double-sided printing=ON, staple=ON, and the number of output copies=5.

In this embodiment, as described above, both a job in the secure print mode which permits to start print processing after the user executes authentication processing (e.g., input of authentication data) via the operation unit 203 of the image forming apparatus before execution of the print processing, and a job in the non-secure print mode which permits to start print processing without requiring the user to execute authentication processing (e.g., input of authentication data) via the operation unit 203 of the image forming apparatus before execution of the print processing can be accepted. In addition, the user can set the secure or non-secure print mode for a job to be processed. Furthermore, the user can also set whether or not the aforementioned trial print mode is set for the job to be processed.

With this arrangement, when it is determined that a job set with the trial print mode is a secure job for which the user sets the secure print mode, the control unit 201 controls to execute authentication processing, which is executed before the beginning of the trial print processing, again after it executes the aforementioned trial print operation in the trial print mode and before it accepts the aforementioned instruction (various instructions selectively input from the user after execution of the trial print processing, so as to change the settings of the print conditions, to continue the print operation for the remaining number of output copies without under the print conditions intact, or to cancel the print processing).

On the other hand, when it is determined that a job set with the trial print mode is a non-secure job for which the user does not set the secure print mode, the control unit 201 controls to prohibit the authentication processing during a period after it executes the trial print operation in the trial print mode and before it receives the above instruction for the trial-printed job from the user, thus accepting the instruction from the user.

That is, if the job is a secure print job, the control unit 201 controls to switch the display contents of the display unit 301 of the operation unit 203 from the job processing status window shown in FIG. 7 to a password input request window (not shown) in response to, e.g., completion of the trial print operation. Then, the control unit 201 prohibits the setting window in FIG. 8 from being displayed unless the user inputs, via this authentication data input request window (not shown), authentication data which matches authentication data such as a password or the like, which was input before the beginning of the trial print operation as a condition for permitting to start the trial print operation. In this way, the control unit 201 controls to prohibit the image forming apparatus from executing various processes (to change print settings, to start main print processing without changing any settings, or to cancel the print processing itself) for the job after the trial print processing of the trial-printed secure job. On the other hand, when the user inputs, via the authentication data input request window (not shown), authentication data which matches authentication data such as a password or the like which was input before the beginning of the trial print operation as a condition for permitting to start the trial print operation of the job, the control unit 201 controls to switch the display contents of the display unit 301 from the password input request window to the setting window in FIG. 8, so as to selectively accept various instructions from the user via that window, and controls to permit to execute processing (to change settings, to execute main print processing for printing the remaining number of copies, or to cancel print processing) according to the instruction from the user for the trial-printed secure job.

Figure 8:
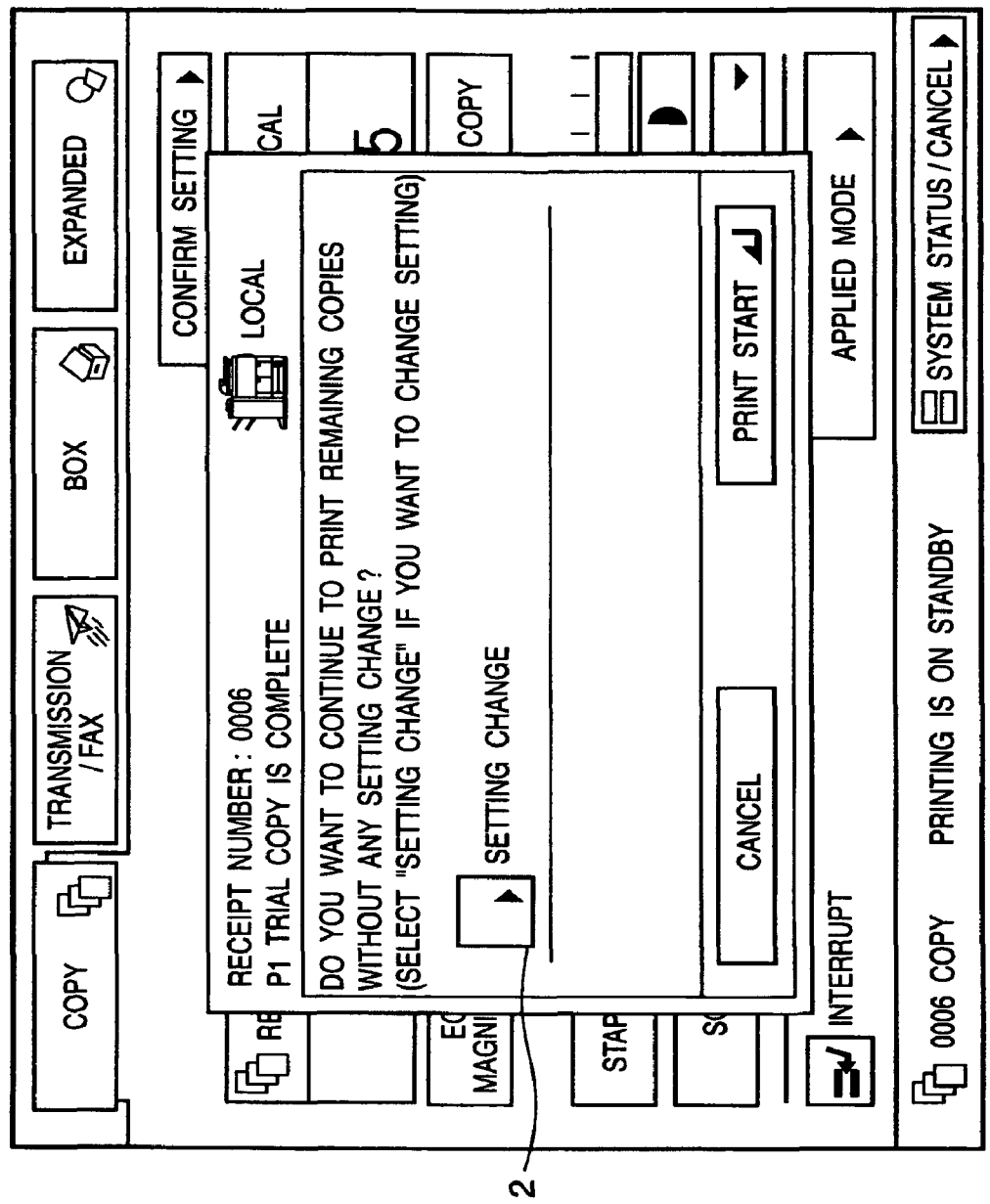
FIG. 8 shows a display example of an operation window (user interface) to be displayed on the display unit 301.

Furthermore, if the job is a non-secure print job, the control unit 201 controls to switch the display contents of the display unit 301 of the operation unit 203 from the job processing status window in FIG. 7 directly to the operation window in FIG. 8 while prohibiting display of the authentication data input request window (not shown), so as to selectively accept various instructions from the user via that window, and controls to permit to execute processing (to change settings, to execute main print processing for printing the remaining number of copies, or to cancel print processing) according to the instruction from the user for the trial-printed non-secure job.

Referring back to FIG. 8, the control unit 201 controls to display, on the display unit 301, the operation window in FIG. 8, which comprises a key used to accept, from the user, an instruction for changing the settings of the print conditions as a process to be executed for the trial-printed job (a setting change key 2 in FIG. 8), a key used to accept, from the user, an instruction for executing the main print operation without changing any settings of the print conditions (a print start key in FIG. 8), and a key used to accept, from the user, an instruction for canceling the print processing itself of the job (a cancel key in FIG. 8).

As for the timing at which the control unit 201 controls to display the operation window in FIG. 8, for example, when, for example, the job which is to undergo the trial print processing is a non-secure print job, the control unit 201 controls to display the operation window in FIG. 8 in response to confirmation of completion of the trial print processing by a detection unit in various devices. On the other hand, when the job which is to undergo the trial print processing is a secure print job, the control unit 201 controls to display the operation window in FIG. 8 in response to confirmation of completion of the trial print processing and of re-execution of authentication processing, which was executed by the image forming apparatus before the beginning of the trial print processing of the job, after completion of the trial print processing (e.g., re-input of the password, which was input by the user via the operation unit 203 before the trial print processing as a condition for permitting to start the trial print processing, via the password input request window displayed after completion of the trial print processing).

After the window shown in FIG. 8 is displayed, the following operation is executed. The following explanation will be given using the job with the receipt number "0006" including four pages, which has been explained using FIGS. 4 to 7.

As described above, the trial-printed job with the receipt number "0006" was set by the user with the plurality of print condition parameters "the number of output copies: 5, output paper: A4 size, magnification: equal magnification (100%), finishing setting: staple=ON, double-sided printing setting: double-sided printing=ON" as print conditions, before execution of the trial print processing in response to an instruction from the key 1 on the display window of FIG. 6.

Under such conditions, assume that the user presses the "print start" key via the window in FIG. 8 and inputs an instruction for starting the print operation as a main print operation under the print conditions intact without changing any settings of the print conditions. In this case, the control unit 201 controls to execute the print operation without changing any settings of the print conditions set by the user using image data of the job held in the hard disk 208.

In this case, the control unit 201 controls to execute print processing under the print conditions "output paper: A4 size, magnification: equal magnification (100%), finishing setting: staple=ON, double-sided printing setting: double-sided printing=ON" of those set by the user, except that the number of output copies is only 4. That is, although the user designated the number of print copies=5 in the above settings, the control unit 201 does not adopt this numerical value, and controls to execute the print operation for the number of output copies obtained by subtracting one from the number of print copies designated by the user (in this example, 5−1=4 (copies)) under the user's print conditions except for the setting of the number of print copies.

This is because the user instructs the print operation since he or she can obtain a desired print result without particularly changing the print conditions as a result of the trial print operation, and a copy output by the trial print operation can be handled as one of final products, i.e., this is a specification that considers minimizing wasteful outputs as a user's merit. That is, in this example, since both the print results for the remaining four copies which are output without changing any settings and the print result for one copy output by the trial print operation are adopted, the user can consequently obtain desired output results for five copies.

The control unit 201 controls to execute such series of processes (to be also referred to as a first sequence hereinafter) in response to depression by the user of the "print start" key on the display window in FIG. 8 which is permitted to be displayed on the display unit 301 under the condition that various conditions described above are met (the condition that the trial-printed job is a non-secure job, or the condition that the trial-printed job is a secure job and the authentication processing for that secure job is executed after the trial print operation) after execution of the trial print operation.

Figure 15:
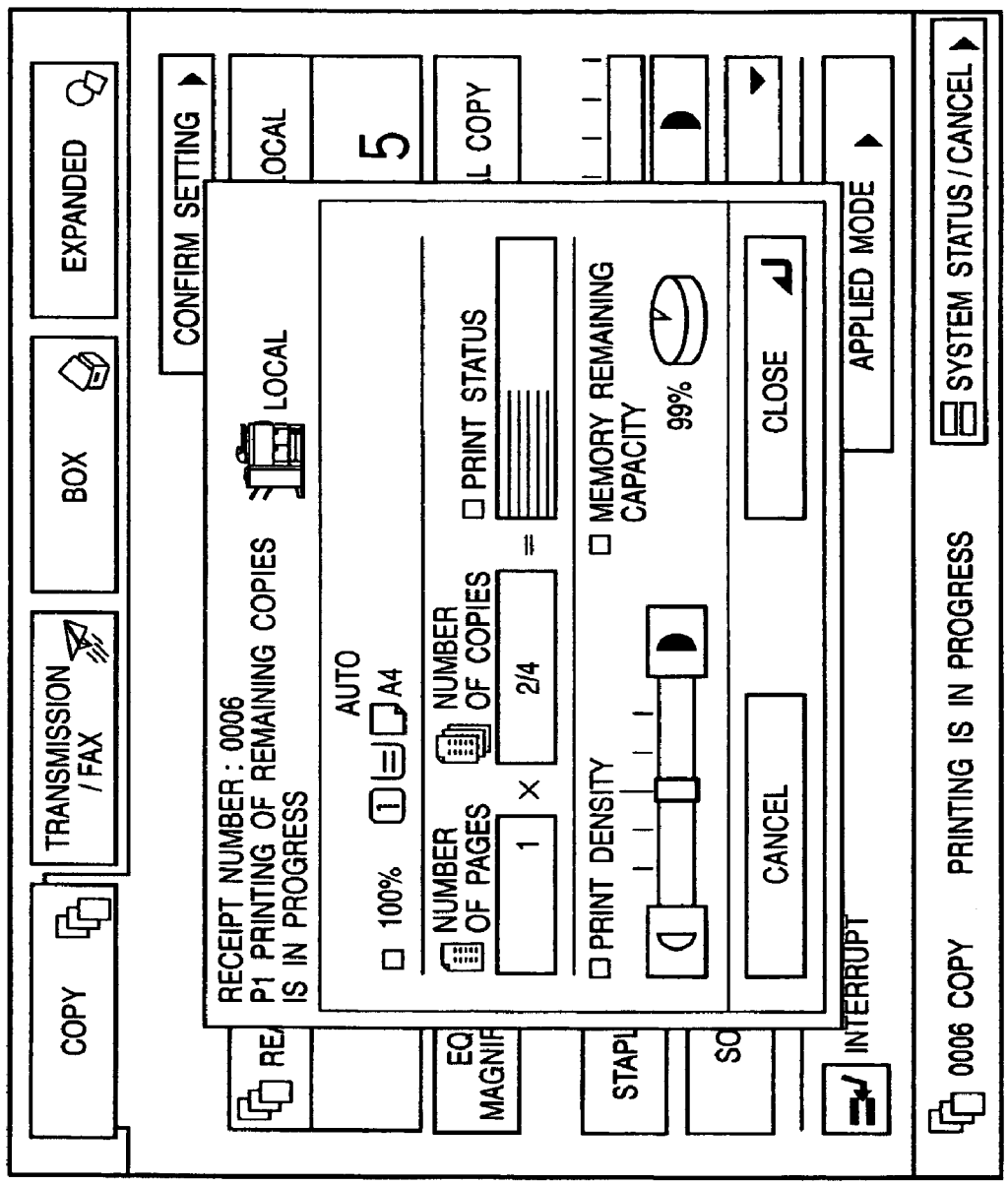
FIG. 15 shows a display example of an operation window (user interface) to be displayed on the display unit 301.

FIG. 15 shows a window that notifies the user of the print status when the main print operation is started without changing any settings after the trial print operation. In this example, the user is notified that the number of output copies for the job with the receipt number "0006" is changed to "4" since no settings are required to change after the trial print operation, and the print operation of the first page of the second copy is now in progress.

Figure 9:
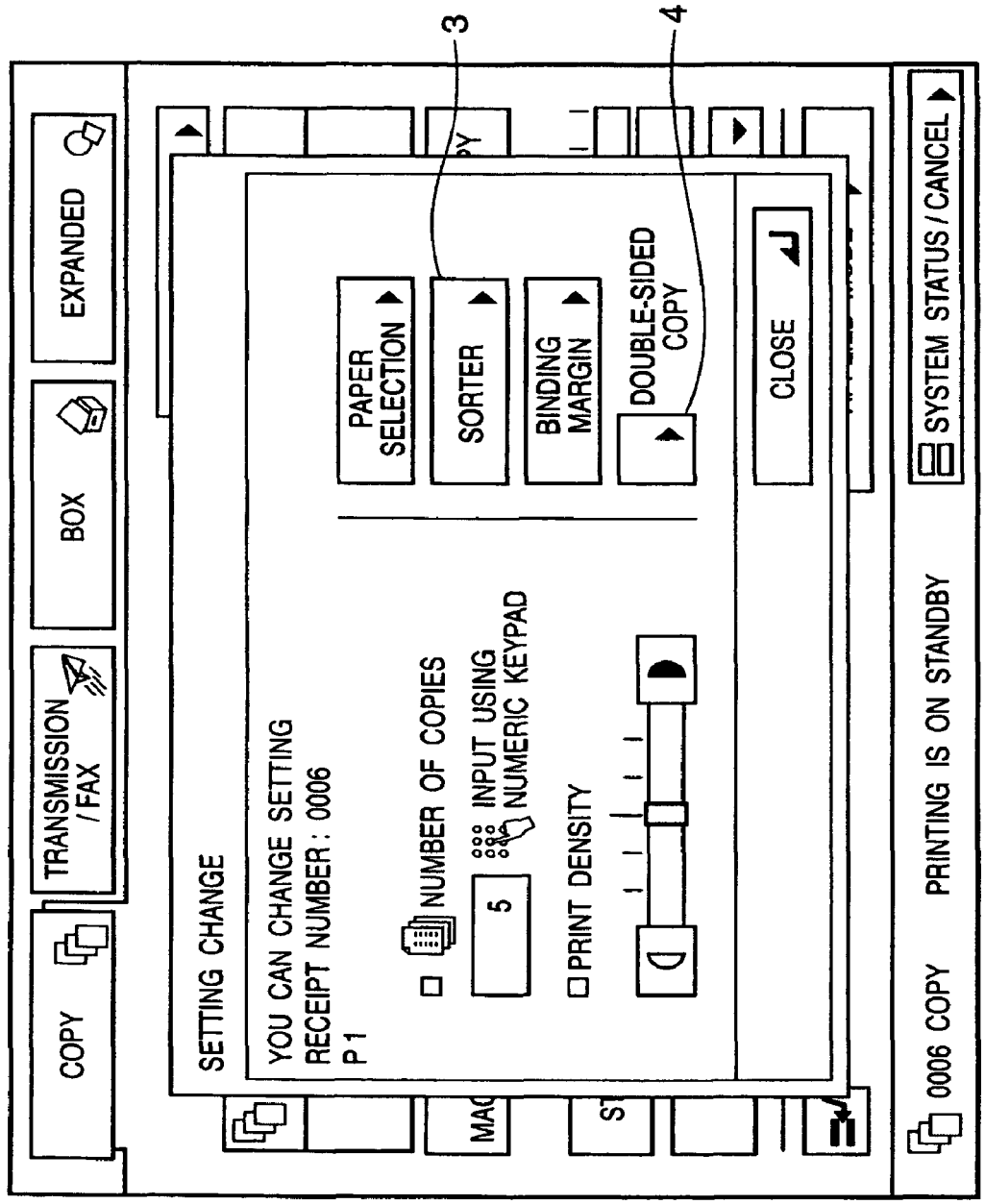
FIG. 9 shows a display example of an operation window (user interface) to be displayed on the display unit 301.

On the other hand, when the user inputs the setting change instruction of the job with the receipt number "0006" by pressing the "setting change" key 2 on the window in FIG. 8, the control unit 201 controls to display, e.g., a display window in FIG. 9 on the display unit 301 and to allow the user to change the settings of the print conditions of the job in response to this instruction. In the example of FIG. 9, the user can change the number of output copies, the setting of paper sheets used in the job, that of a print density, that of a binding margin, that of finishing, and that of double- or single-sided printing. Since this job is initially set with "5" copies as the number of output copies, the control unit 201 controls the display unit 301 to display "5" as a default value in correspondence with the number of output copies set by the user before the trial print operation, as shown in FIG. 9, even when the setting of the number of output copies is to be changed.

On the window of FIG. 9, when the user wants to change the setting of finishing of a series of print conditions including a plurality of print conditions of the trial-printed job with the receipt number "0006", he or she presses a "sorter" key 3 on the window of FIG. 9. In response to this user's operation, the control unit 201 switches the display contents to a window of FIG. 10 to allow the user to change the setting to another finishing mode (e.g., to change the setting from staple=ON to punch=ON or the like) or to select a setting to cancel the finishing setting itself (in this example, to change the finishing setting from "staple=ON" to "staple=OFF").

Figure 11:
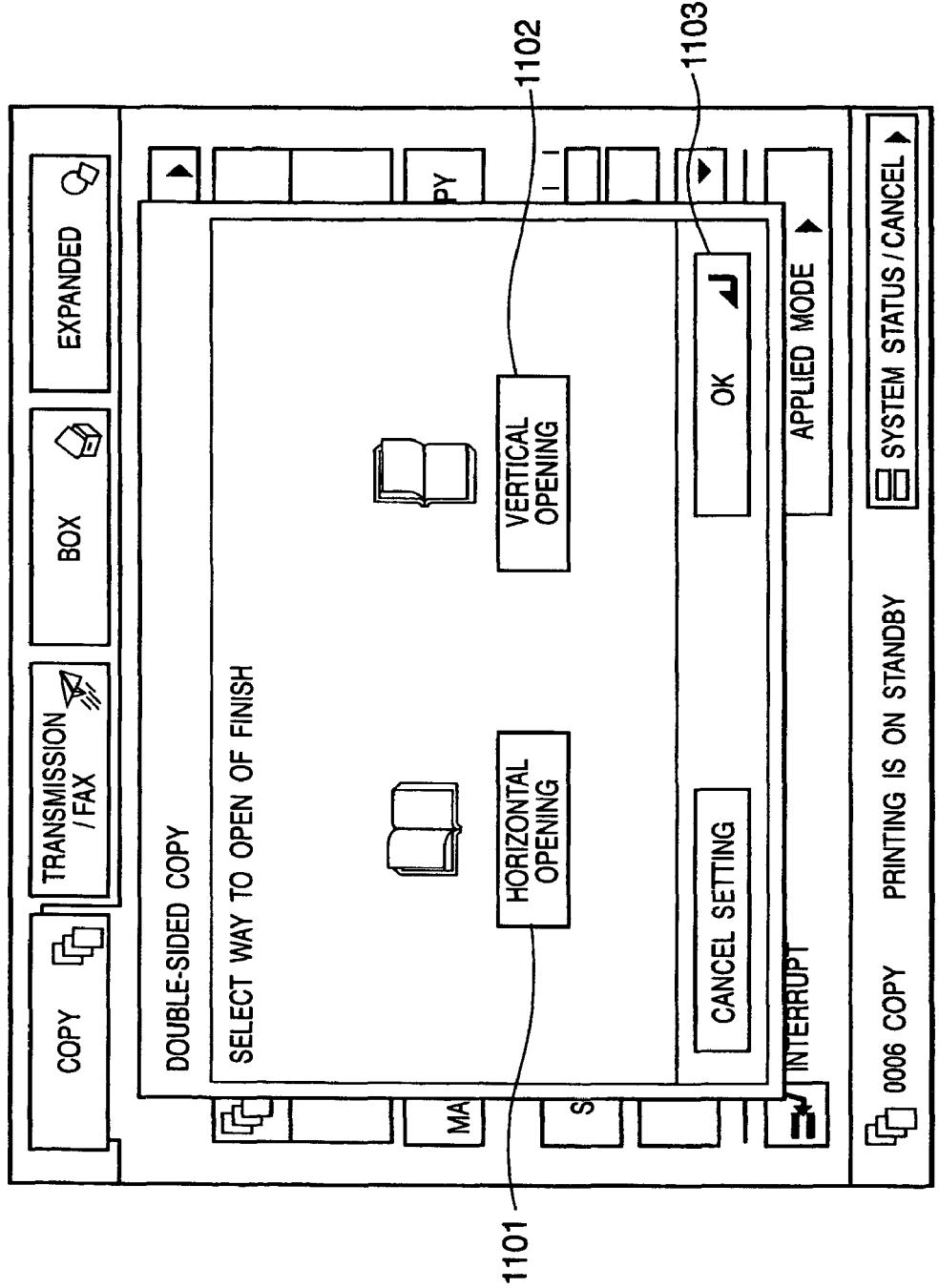
FIG. 11 shows a display example of an operation window (user interface) to be displayed on the display unit 301.

Likewise, when the user presses a key 4 on the window of FIG. 9, the control unit 201 switches the display contents to a window of FIG. 11, and allows the user to change various settings associated with double-sided printing (e.g., to change a binding direction, or to cancel double-sided printing itself and to change a setting to single-sided printing, or the like) via the window of FIG. 11 and the like.

Assume that the user changes the setting from "double-sided printing=ON" to "single-sided printing=ON" as a setting change of the job.

Figure 12:
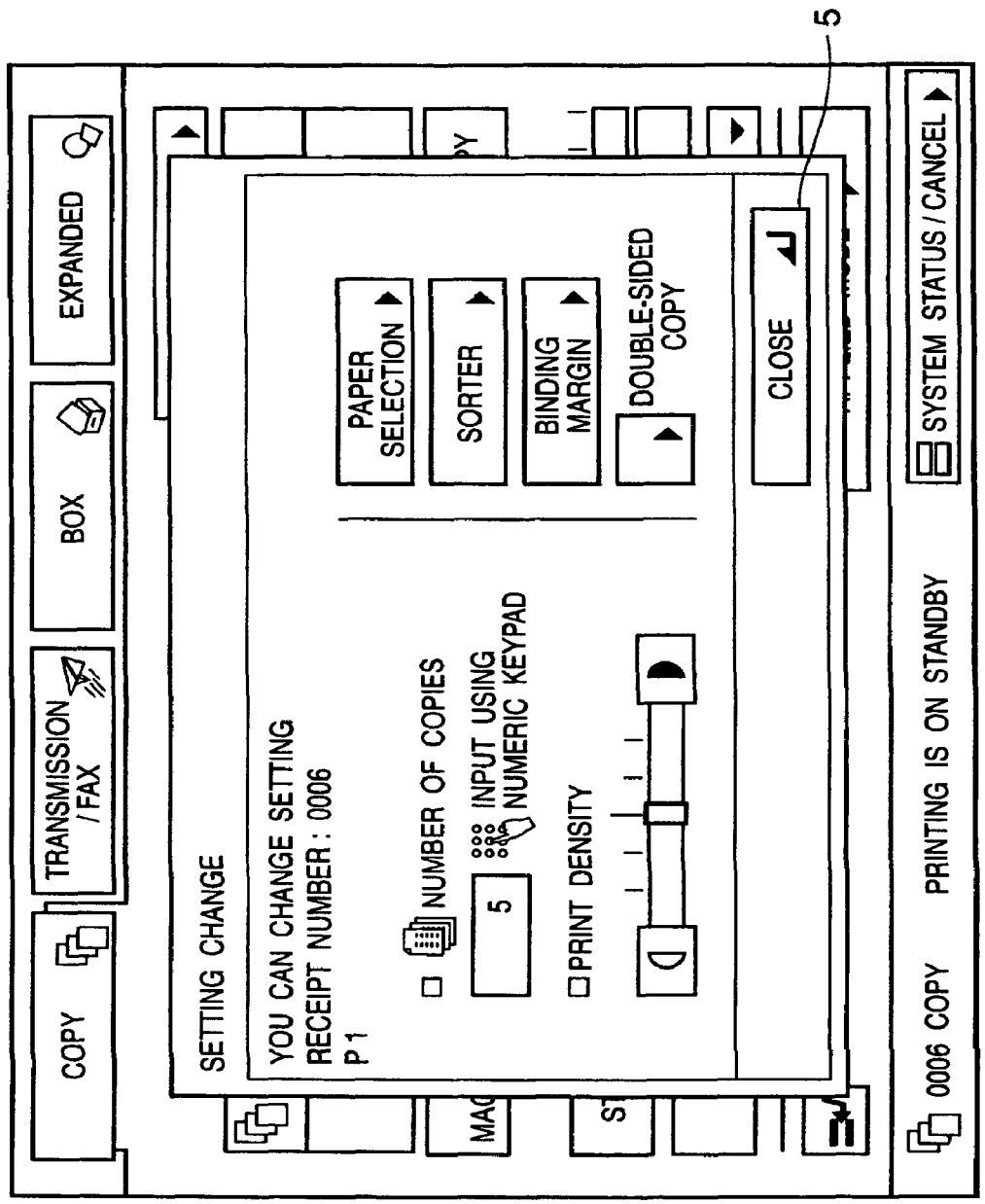
FIG. 12 shows a display example of an operation window (user interface) to be displayed on the display unit 301.

In response to completion of the user's setting change, the control unit 201 controls to display a window of FIG. 12 on the display unit 301. As the difference between FIGS. 9 and 12, when the setting change window is displayed for the first time, the key 4 is enabled (ON display state) to indicate the setting "double-sided printing=ON", while the key 4 is disabled to cancel "double-sided printing=ON", i.e., to set "single-sided printing=ON" in FIG. 12. When the user presses a "close" key 5 in FIG. 12, the control unit 201 controls to display a window of FIG. 13 on the display unit 301. When the user then presses a "print start" key 6 in FIG. 12, the control unit 201 controls the image forming apparatus to execute print processing according to the print conditions whose settings are changed by the user after the aforementioned trial print operation.

That is, in this example, the print processing of the job with the receipt number "0006" is processed under the print conditions "the number of output copies: 5, output paper: A4 size, magnification: equal magnification (100%), finishing setting: staple=ON, double-sided printing setting: double-sided printing=OFF (single-sided printing=ON)". Note that the number of output copies in this case remains unchanged from "5 copies" unlike in the case of no setting change. Unlike in the above case, since the user who confirmed the trial print result inputs the setting change instruction, it is assumed that the trial-printed print product is not counted as a final product, and the job is printed again for five copies as the number of output copies which is designated initially. In this way, the operability is improved. However, when the number of output copies is changed on the window of FIG. 9, print processing is executed in accordance with the changed number of output copies.

The control unit 201 controls to execute such series of processes (to be also referred to as a second sequence hereinafter) in response to depression by the user of the "setting change" key on the display window of FIG. 8, which is permitted to be displayed on the display unit 301 under the condition that various conditions described above are met (the condition that the trial-printed job is a non-secure job, or the condition that the trial-printed job is a secure job and the authentication processing for that secure job is executed after the trial print operation) after execution of the trial print operation.

Figure 14:
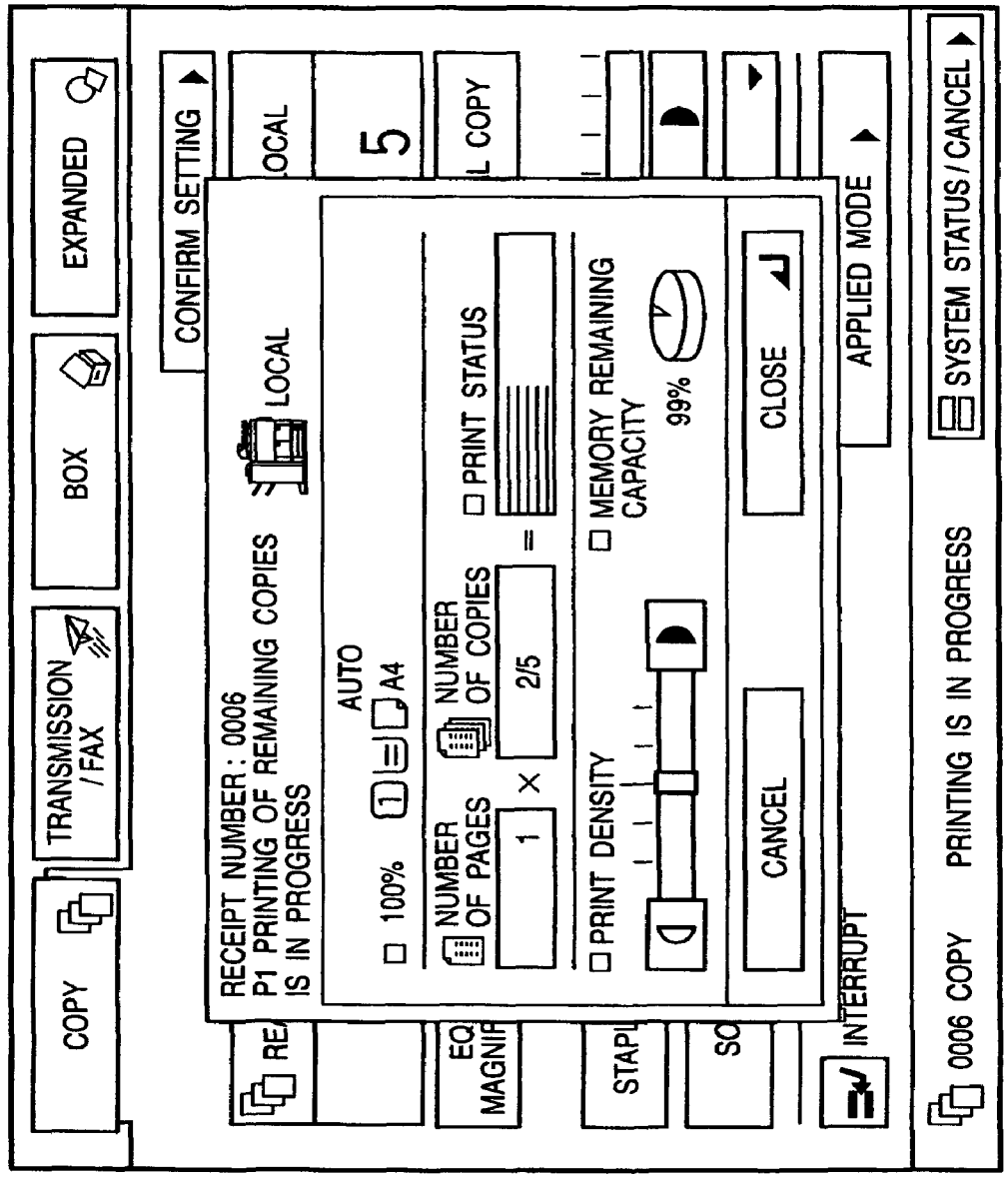
FIG. 14 shows a display example of an operation window (user interface) to be displayed on the display unit 301.

FIG. 14 shows a window during execution of the main print processing after the job settings have been changed. In this manner, the user is notified of the print status of the job to be processed with the receipt number "0006". For example, in this case, the user is notified that since the settings have been changed, the number of output copies is "5 copies", and the print operation of the first page of the second copy is now in progress.

Figure 13:
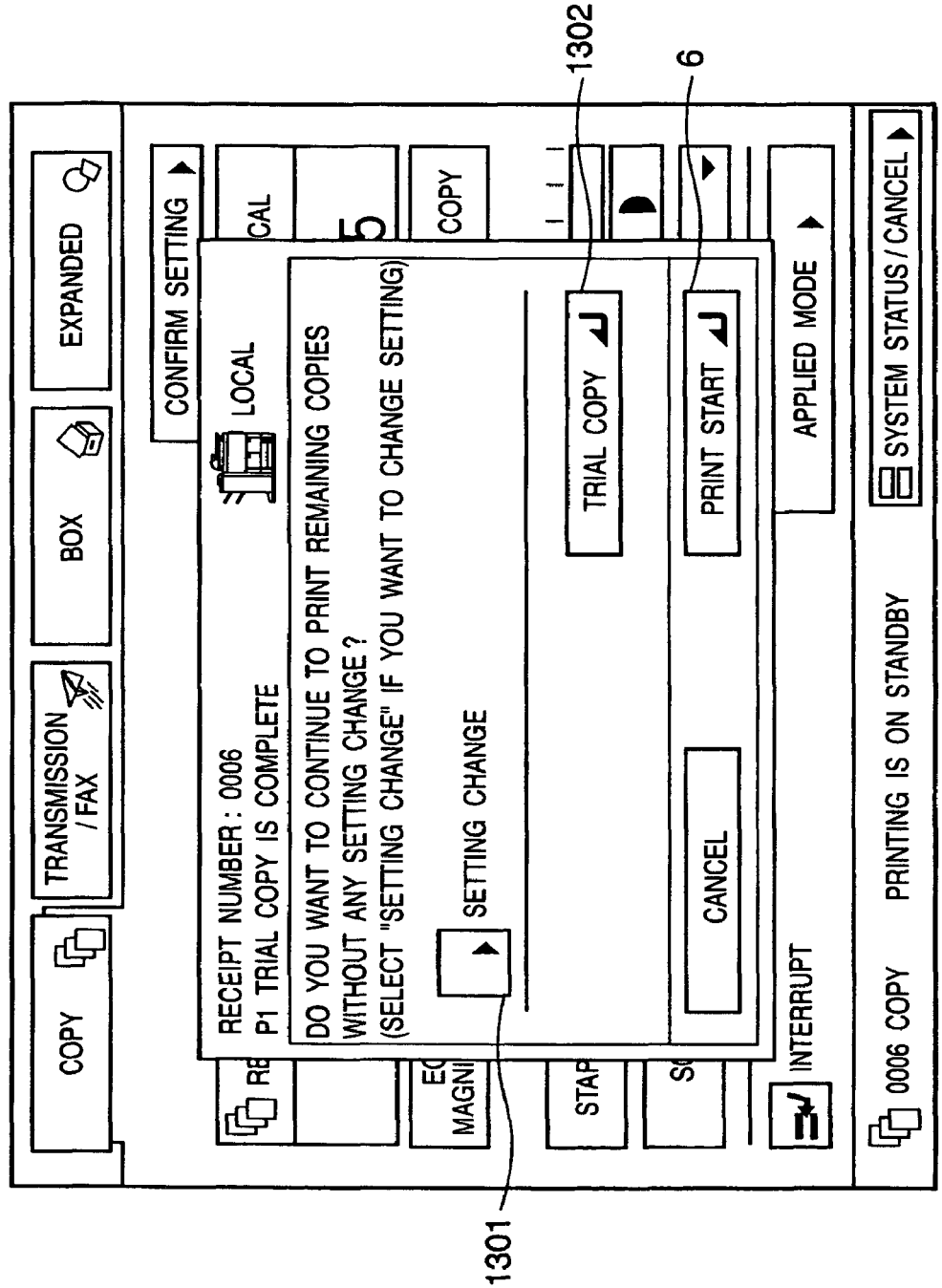
FIG. 13 shows a display example of an operation window (user interface) to be displayed on the display unit 301.

Upon depression of a key 1302 on the window of FIG. 13, the control unit 201 controls to execute trial print processing again for the job with the receipt number "0006" under the print conditions after the setting change, except for the number of output copies is 1. In this way, since the loop control is executed to perform trial print processing again under the print conditions after the setting change even when the settings have been changed after the trial print operation, the usability can be further improved.

On the other hand, when the user presses the "cancel" key on the window of FIG. 8, the control unit 201 controls the print processing itself of the trial-printed job with the receipt number "0006" and ends all processes. In this case, the control unit 201 controls to return the display contents on the display unit 301 to the initial window (that of FIG. 4), and also to clear the image data of the job with the receipt number "0006" from the hard disk 208.

The control unit 201 controls to execute such series of processes (to be also referred to as a third sequence hereinafter) in response to depression by the user of the "cancel" key on the display window of FIG. 8, which is permitted to be displayed on the display unit 301 under the condition that various conditions described above are met (the condition that the trial-printed job is a non-secure job, or the condition that the trial-printed job is a secure job and the authentication processing for that secure job is executed after the trial print operation) after execution of the trial print operation.

As described above, in this embodiment, the control unit 201 controls the image forming apparatus to selectively execute, as processes for a trial-printed job, a series of operations (first sequence) "the settings of print conditions are changed, and main print processing is then executed", a series of operations (second sequence) "main print processing is executed intact without changing the print conditions", or an operation (third sequence) "the print processing itself is canceled" on the basis of the user's instruction input via the window of FIG. 8 and the like. When a job which is to undergo trial print processing is a secure job, the control unit 201 permits to execute such operations for the trial-printed job under the condition that the authentication processing including the user's intervention operation is executed after the trial print processing (the same authentication processing as that executed before the beginning of the trial print operation is executed again after the trial print operation). On the other hand, when the authentication processing including the user's intervention operation is not executed after the trial print operation, the control unit 201 controls to prohibit the job operations after the trial print operation of the secure job. In addition, when a job which is to undergo trial print processing is a non-secure job, the control unit 201 permits to execute the execute such operations for the trial-printed job without executing any authentication processing including the user's intervention operation.

With this arrangement, in this embodiment, even when trial print processing is executed based on a secure job, the security of a document to be printed can be maintained, and the security of a secure job can be continuously maintained even after execution of the trial print processing. In addition, a problem of, e.g., poor usability upon trial printing of a job other than a secure job (e.g., a non-secure job) so as to maintain the security after the trial print processing of a secure job can be prevented. Hence, both the effect of maintaining security even after a secure job is trial-printed, and the effect of improving usability upon trial-printing of a non-secure job can be achieved at the same time.

<Box Mode>

Figure 16:
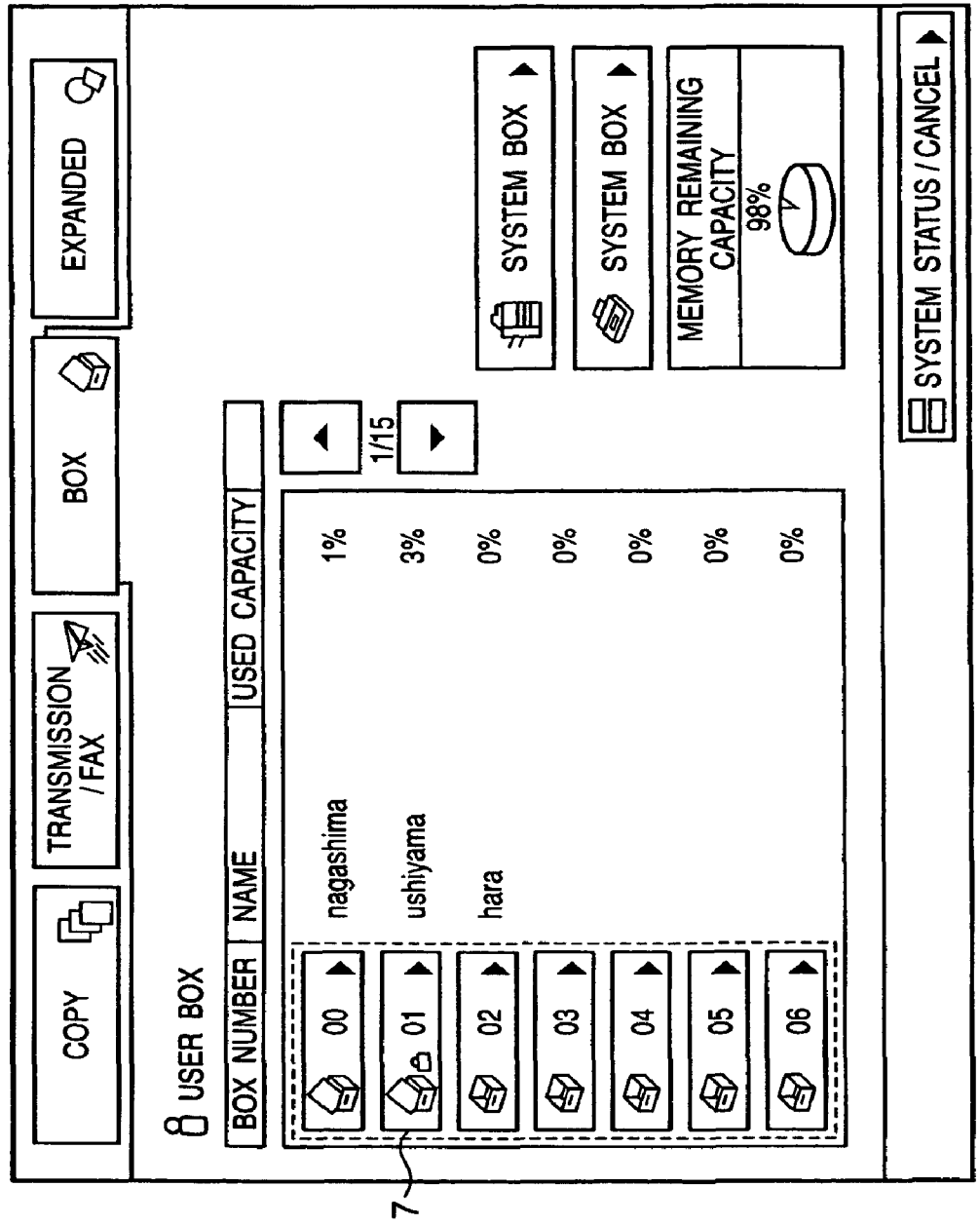
FIG. 16 shows a display example of an operation window (user interface) to be displayed on the display unit 301.

FIG. 16 shows a display example of a window which is used to display a list of boxes provided for respective operators of the image forming apparatus 101, is displayed upon selection of "box" on the function selection area 401. FIG. 16 displays three boxes "nagashima", "ushiyama", and "hara". That is, these three boxes are those for three operators, respectively. These boxes are assigned user names. Note that a key mark appears on a box 7 "ushiyama", and it indicates that a password input is required upon printing a job stored in this box. That is, secure jobs are stored in the box "ushiyama".

On the other hand, no key marks appear on boxes "nagashima" and "hara" on the window of FIG. 16. Contrary to the box "ushiyama", this means that no password input are required upon printing jobs stored in these boxes. That is, print jobs stored in these boxes correspond to non-secure print jobs.

As described above, in this embodiment, a plurality of virtual boxes are assured in the hard disk 208 of the image forming apparatus, and the user can register as an initial setting whether "to set/not to set a password" for each box. In this embodiment, a job stored in a box with a password is handled as a secure print job, and a job stored in a box without any password is handled as a non-secure print job.

In this embodiment, whether a job is a secure or non-secure job is determined not only for respective boxes, but also for each print job. For example, when a host computer generates a print job via a printer driver, as described above, the user can set for each job on the printer driver whether a job is a secure or non-secure job. In this manner, the arrangement to be adopted is not particularly limited.

Figure 17:
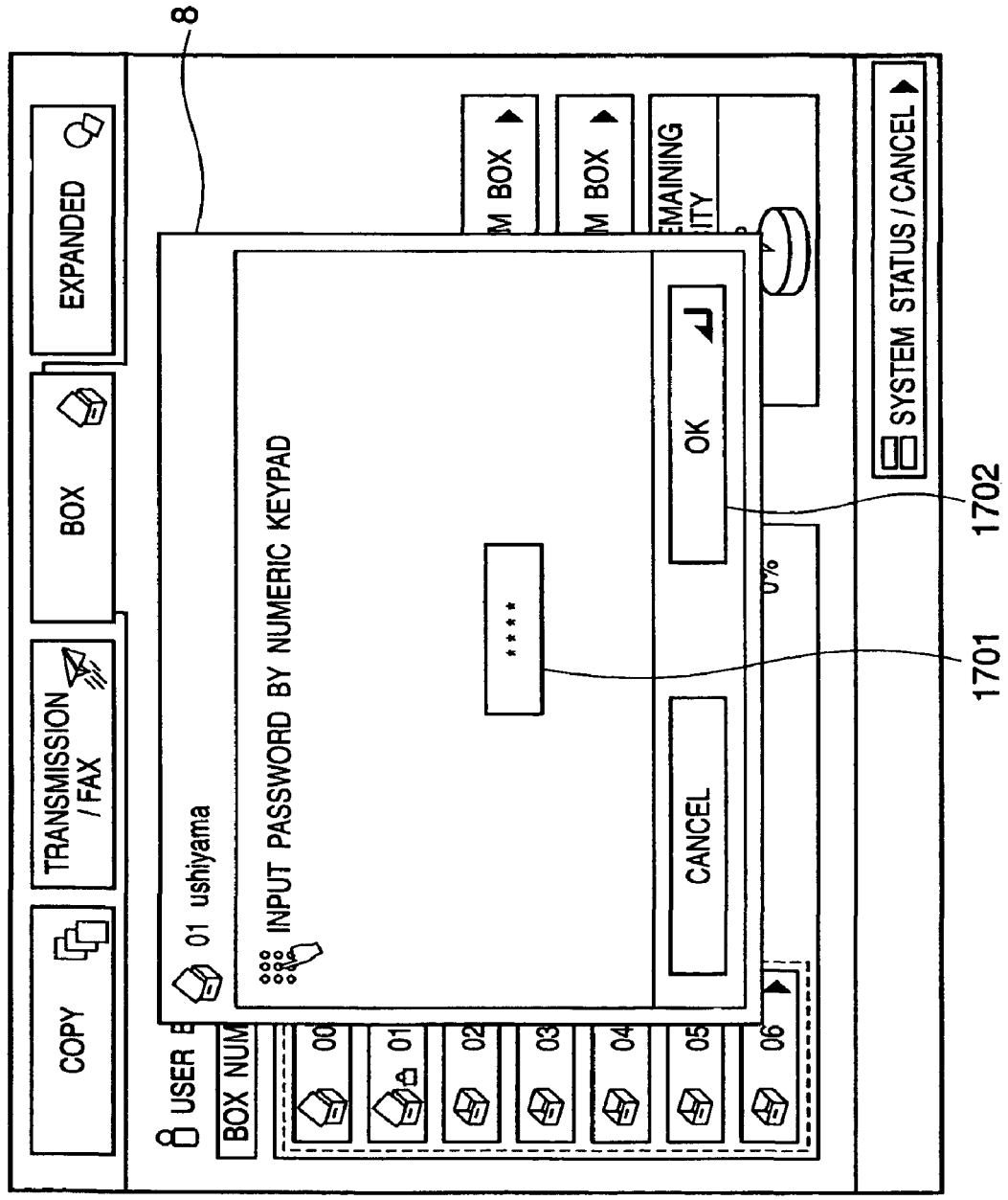
FIG. 17 shows a display example of an operation window (user interface) to be displayed on the display unit 301.

When the operator designates the box 7 with a finger, the control unit 201 detects this designation, and switches the window of the display unit 301 to that shown in FIG. 17. In FIG. 17, reference numeral 8 denotes a window used to input a password; 1701, a field for inputting a password; and 1702, a button icon used to instruct authentication of the password when this button icon is designated after the password is input.

When the operator inputs a password to the field 1701 using the operation unit 203 and designates the button icon 1702, the control unit 201 detects this designation, and authenticates the password input to the field 1701. This authentication processing is executed by collating a password which is assigned to this box (box "ushiyama") in advance with that input to the field 1701.

Figure 18:
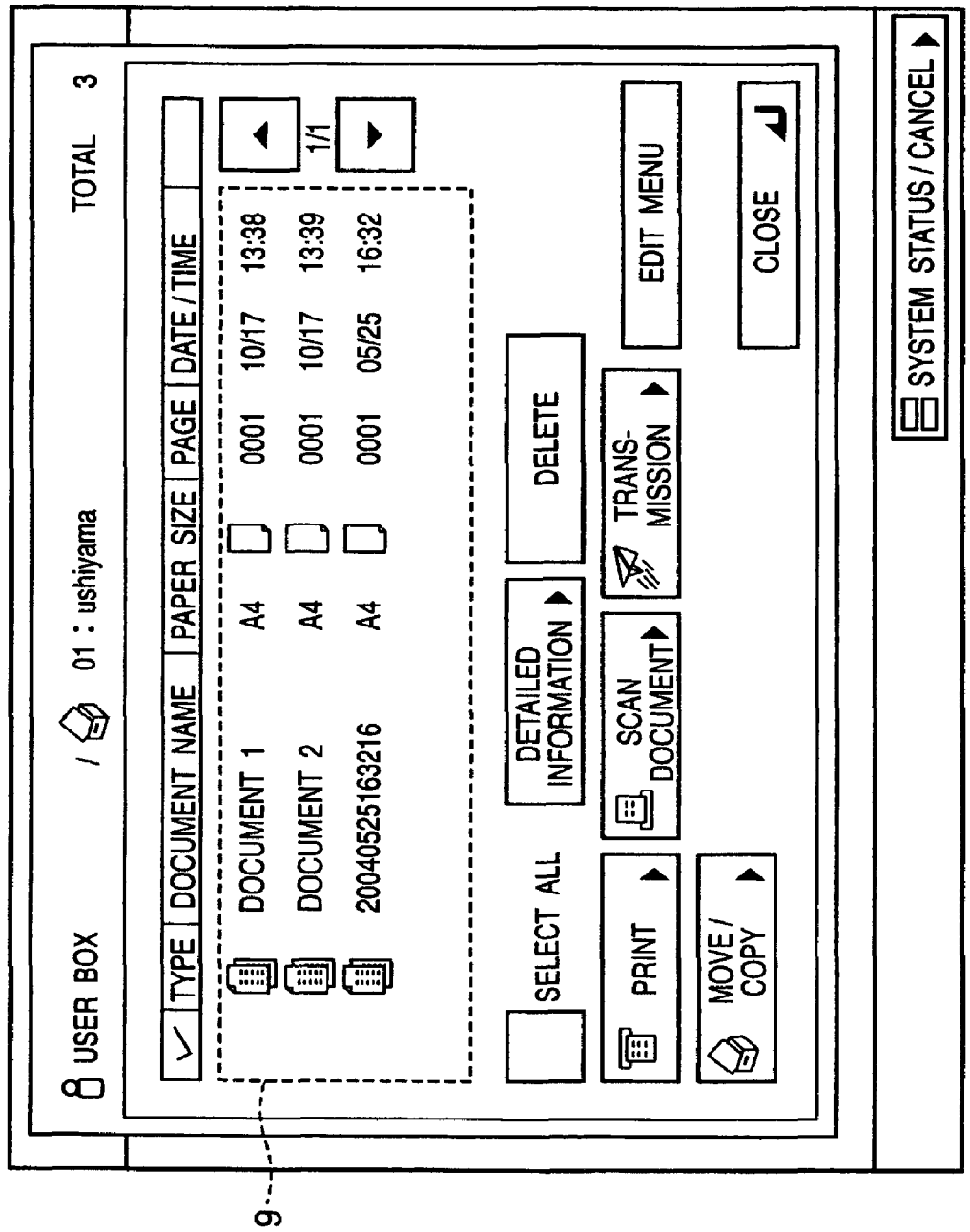
FIG. 18 shows a display example of an operation window (user interface) to be displayed on the display unit 301.
Figure 19:
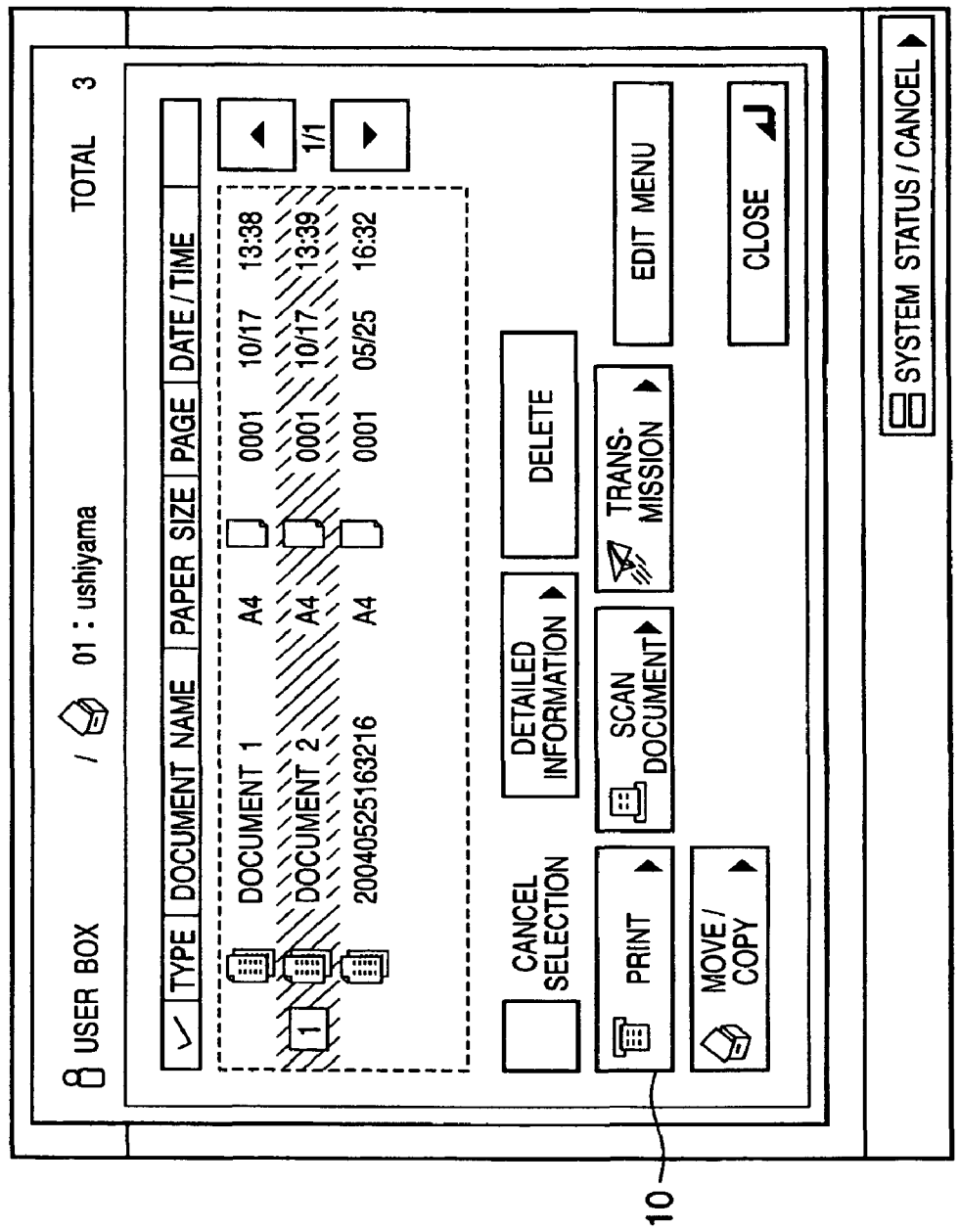
FIG. 19 shows a display example of an operation window (user interface) to be displayed on the display unit 301.

If the password input to the field 1701 is authenticated (if it matches with the password assigned to the box "ushiyama"), the control unit 201 detects this, and switches the display content of the display unit 301 to a window shown in FIG. 18.

The window shown in FIG. 18 displays a list 9 used to display a list of jobs held in the box "ushiyama", and the operator selects a job to be printed from those (three jobs in FIG. 18) displayed in the list 9 using the operation unit 203. In the following description, assume that, for example, the operator selects a job with a document name "document2". Upon selection of a job, the control unit 201 detects it, and executes processing for switching display contents of the display unit 301 to a window shown in FIG. 19.

Figure 20:
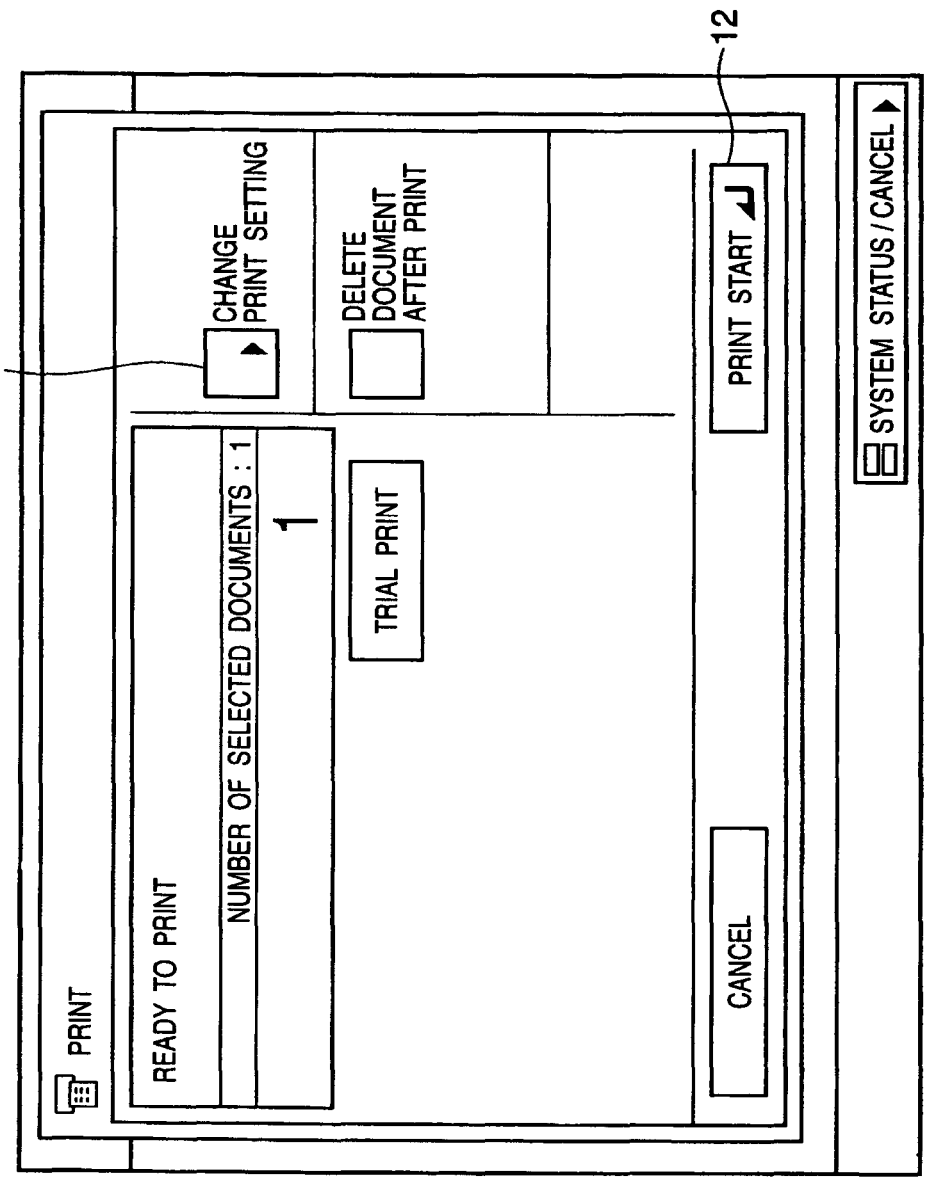
FIG. 20 shows a display example of an operation window (user interface) to be displayed on the display unit 301.

When the operator designates a "print" button icon 10 with a finger, the control unit 201 detects this, and executes processing for switching display contents of the display unit 301 to a window shown in FIG. 20.

Referring to FIG. 20, reference numeral 11 denotes a button icon used to change print settings. When the operator designates this button icon 11 with a finger, the control unit 201 detects this, and executes processing for switching display contents of the display unit 301 to a window shown in FIG. 21. The window shown in FIG. 21 allows the operator to make a sorter setting, a setting associated with the print face such as double- or single-sided printing, a setting of the number of print copies, and the like. In this case, the operator sets a sorter setting to be "punch sort", a setting of double-sided printing to be "ON", and a setting of the number of print copies to be "12". After such settings, the control unit 201 detects this, and switches display contents of the display unit 301 to a window shown in FIG. 22.

Figure 22:
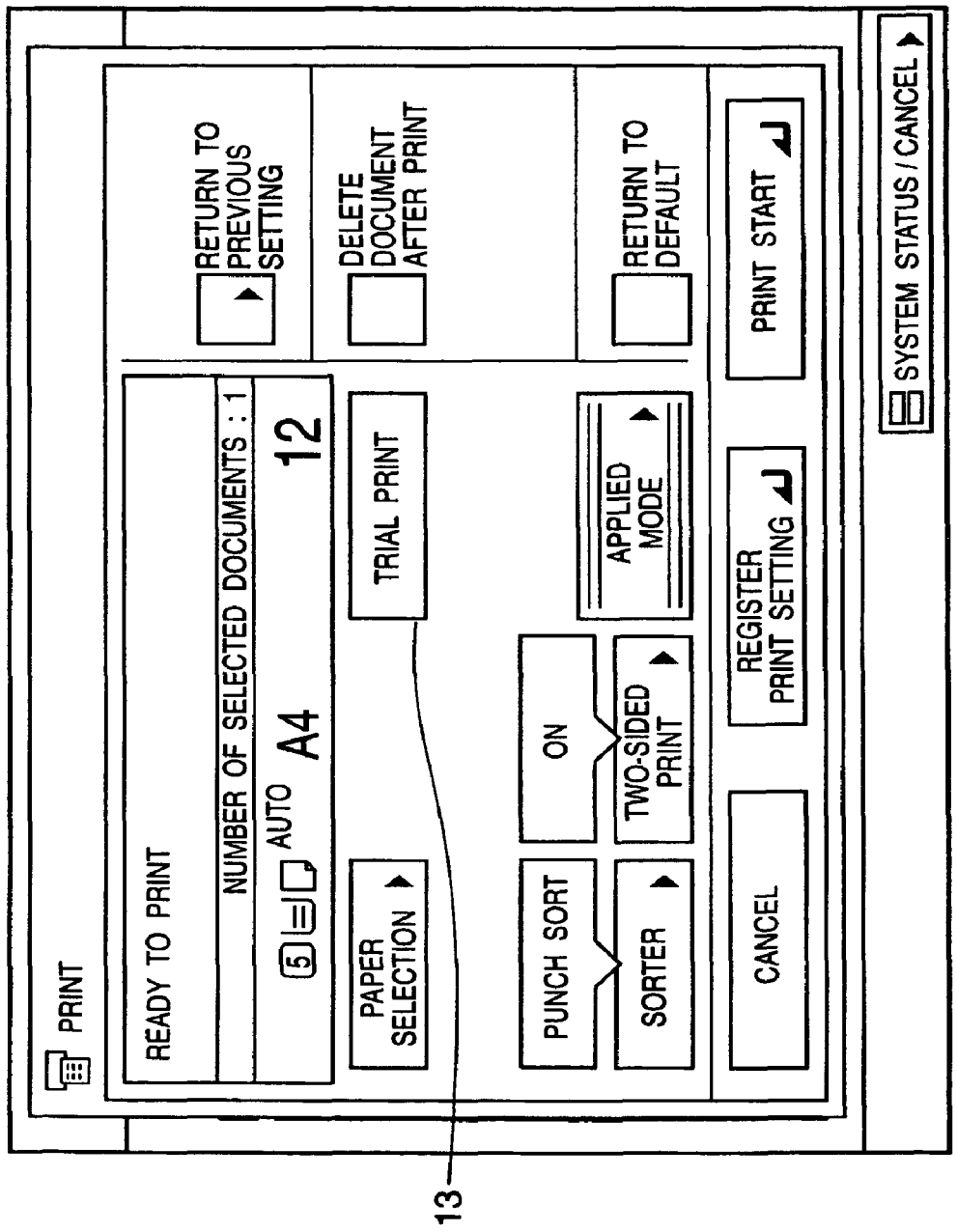
FIG. 22 shows a display example of an operation window (user interface) to be displayed on the display unit 301.
Figure 23:
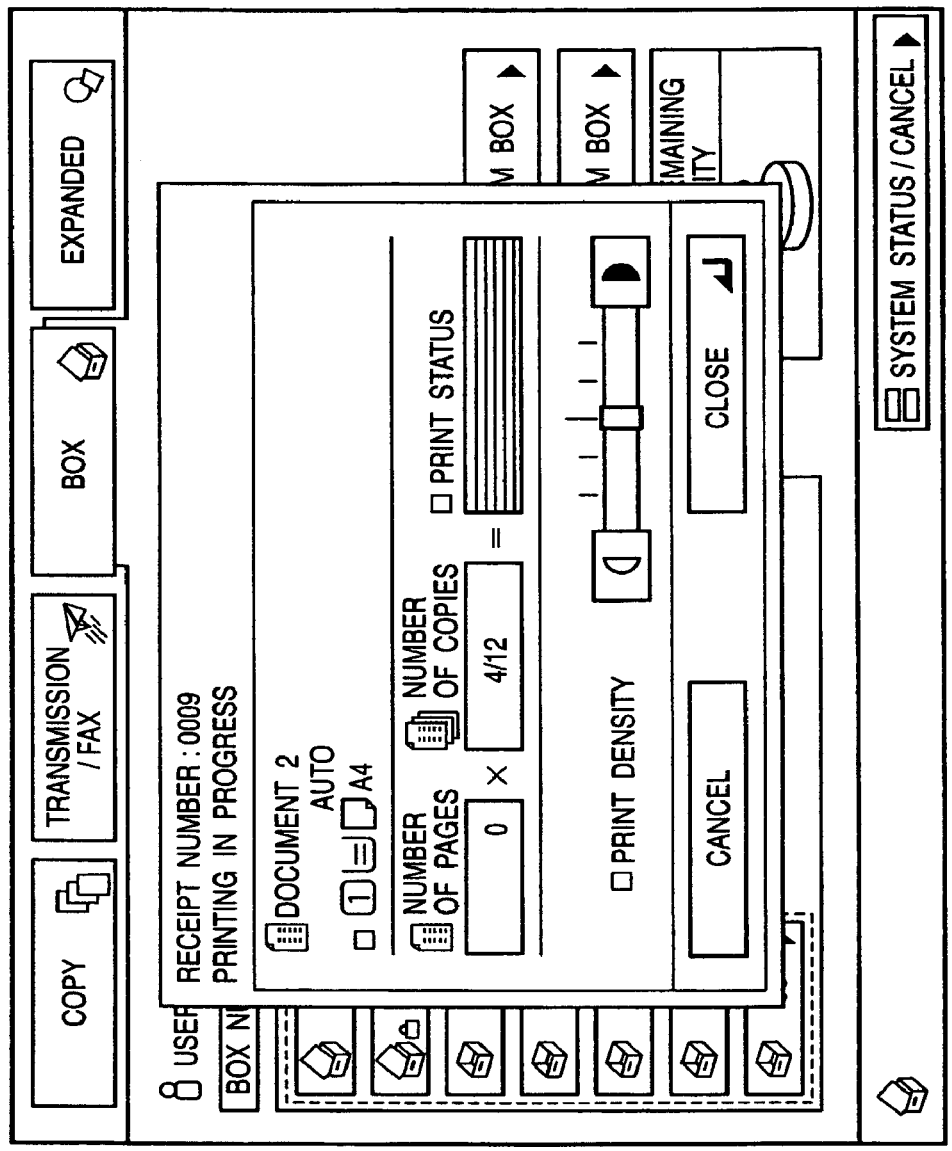
FIG. 23 shows a display example of an operation window (user interface) to be displayed on the display unit 301.
Figure 24:
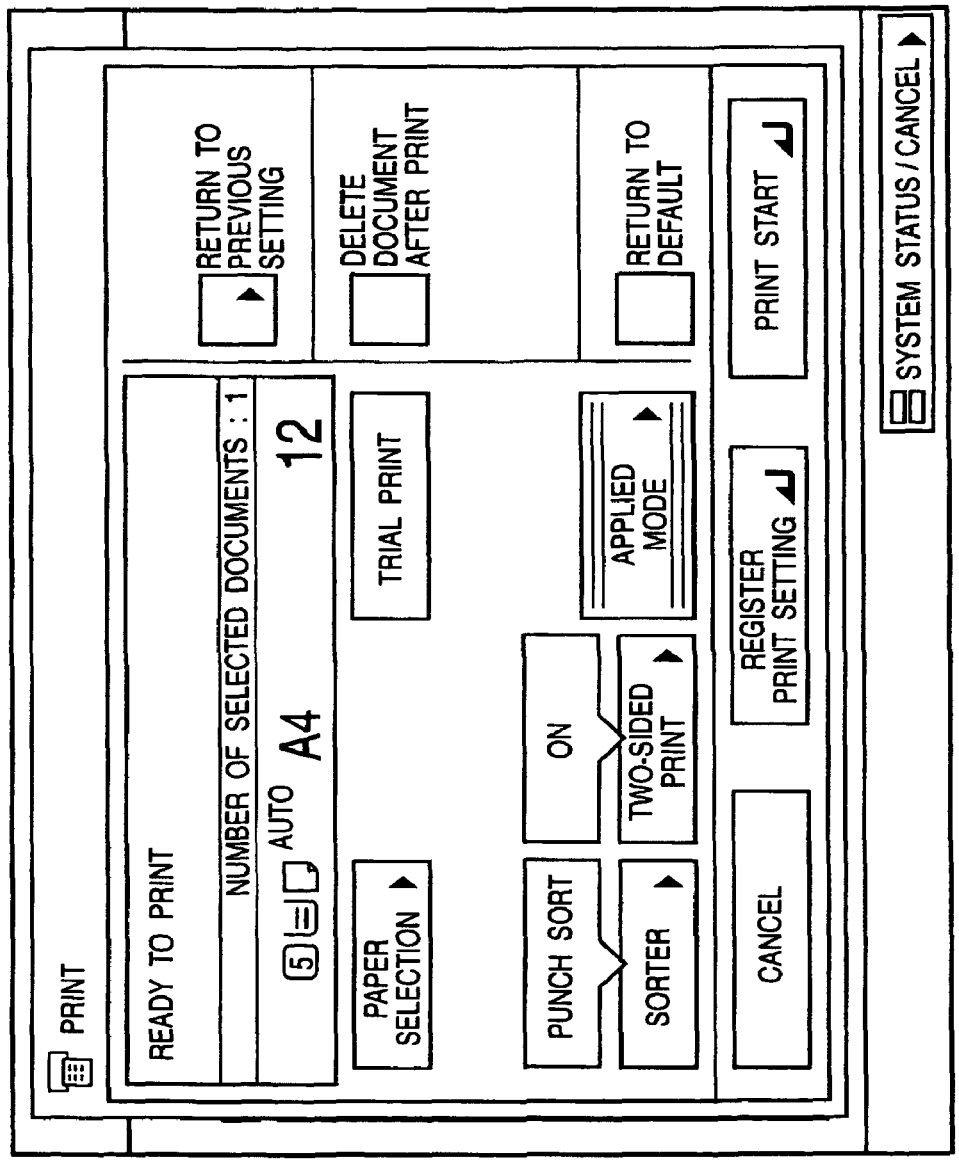
FIG. 24 shows a display example of an operation window (user interface) to be displayed on the display unit 301.
Figure 25:
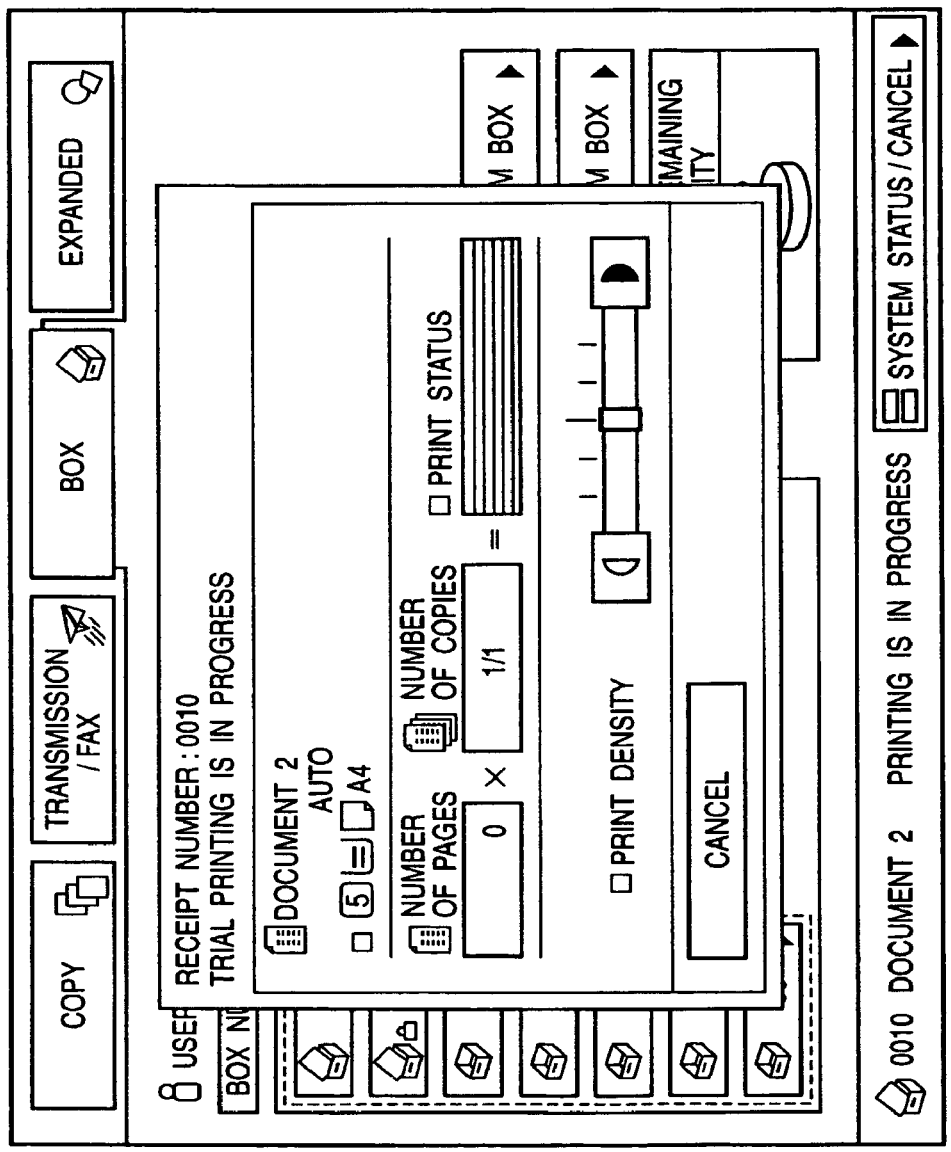
FIG. 25 shows a display example of an operation window (user interface) to be displayed on the display unit 301.

When the operator designates a "print start" button image on the window of FIG. 22, the control unit 201 detects this, switches display contents of the display unit 301 to a window shown in FIG. 23, and executes print processing based on a print job.

Also, in FIG. 22, reference numeral 13 denotes a button icon used to instruct trial print (trial copy) processing. When the operator designates this button icon with a finger, he or she can instruct to execute trial print processing of a job selected from the list 9. When the operator designates this button icon 13 with a finger or the like, the control unit 201 detects this, and switches display contents of the display unit 301 to a window shown in FIG. 24. When the operator designates a "print start" button icon, the control unit 201 detects this, switches display contents of the display unit 301 to a window shown in FIG. 25, and executes trial print processing. Executing the trial print processing is to print one copy according to the job selected from the list 9. The number of copies to be printed is not limited to one, but it is the number of copies equal to or smaller than the number of print copies set by the operation unit 203.

Figure 26:
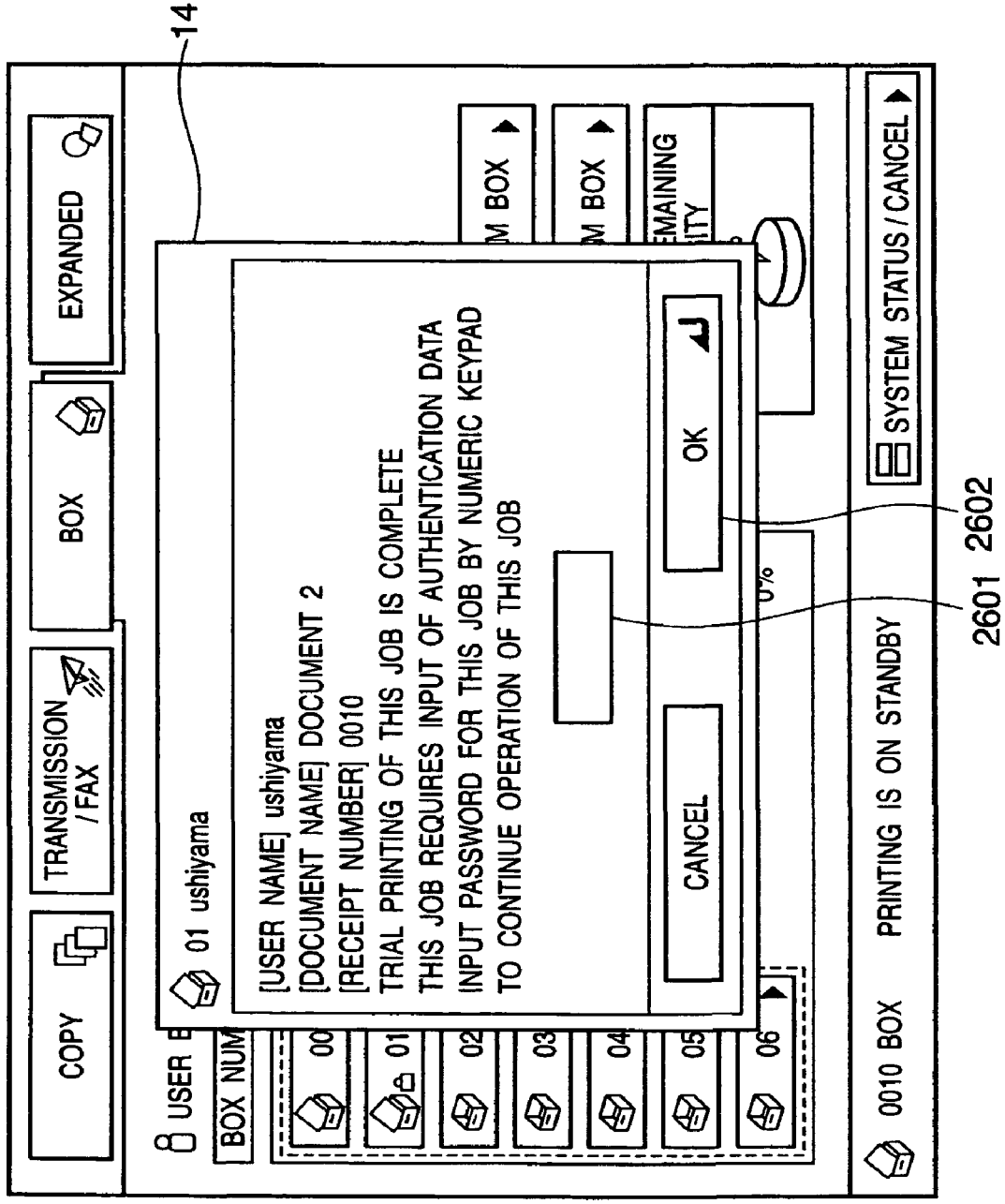
FIG. 26 shows a display example of an operation window (user interface) to be displayed on the display unit 301.

Upon completion of the print processing for one copy, the control unit 201 detects this, switches display contents of the display unit 301 to a window shown in FIG. 26, and prompts the operator to input a password required to grant a permission to the subsequent processes. In FIG. 26, reference numeral 14 denotes a window used to input a password; 2601, a field for inputting a password; and 2602, a button icon used to instruct authentication of the password when this button icon is designated after the password is input. When the print job is not a secure job, the window in FIG. 26 does not appear.

Figure 27:
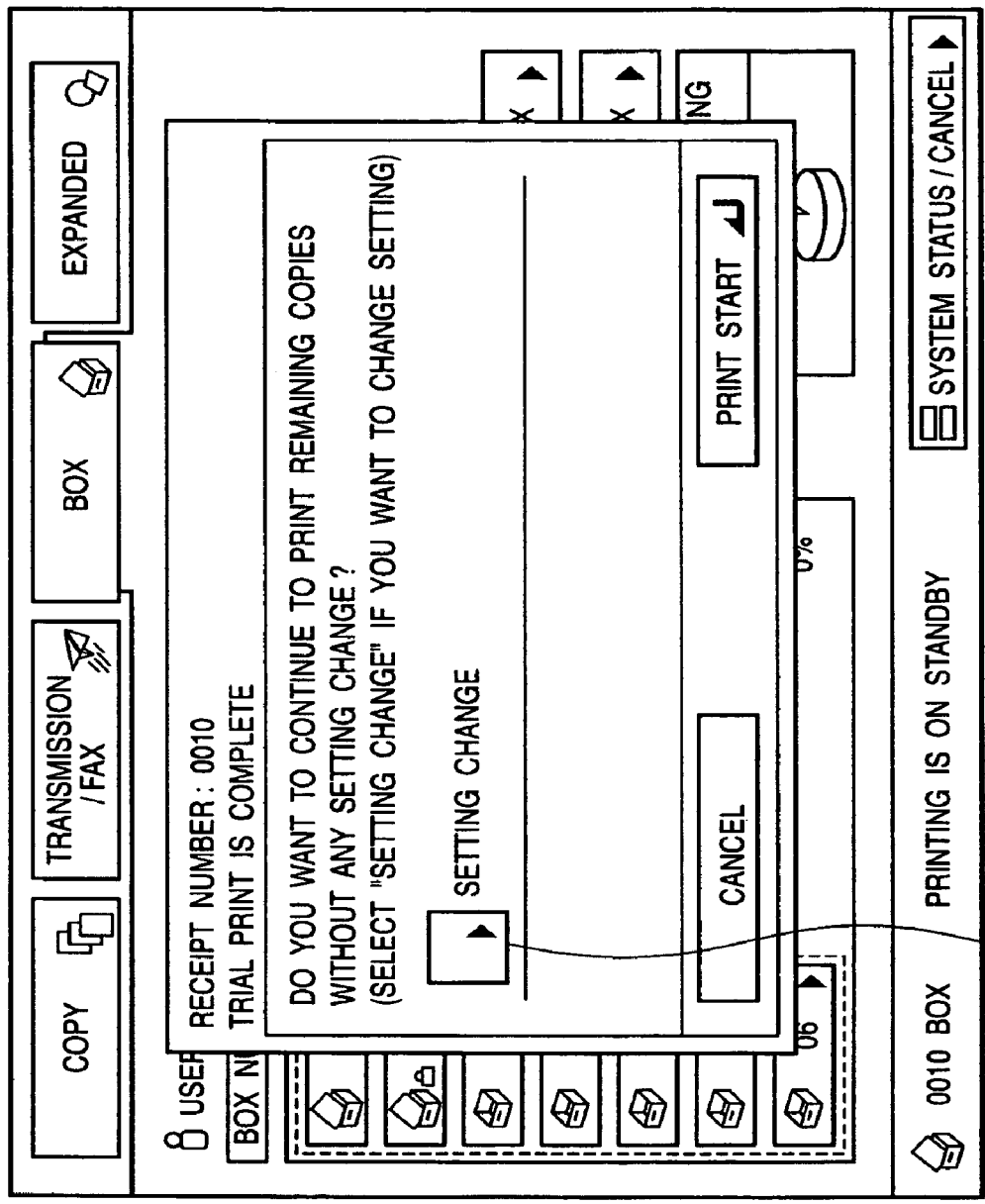
FIG. 27 shows a display example of an operation window (user interface) to be displayed on the display unit 301.

When the operator inputs a password to the field 2601 using the operation unit 203 and designates the button icon 2602, the control unit 201 detects this designation, and authenticates the password input to the field 2601. This authentication processing is as described above. If the password input to the field 2601 is authenticated, the control unit 201 detects this, and switches the display content of the display unit 301 to a window shown in FIG. 27. When the print job is not a secure job, the window shown in FIG. 27 is displayed directly without displaying the window in FIG. 26.

The operator confirms the print settings by checking one copy printed by the trial print processing. If the operator wants to change the settings, he or she designates a button icon 15.

Figure 28:
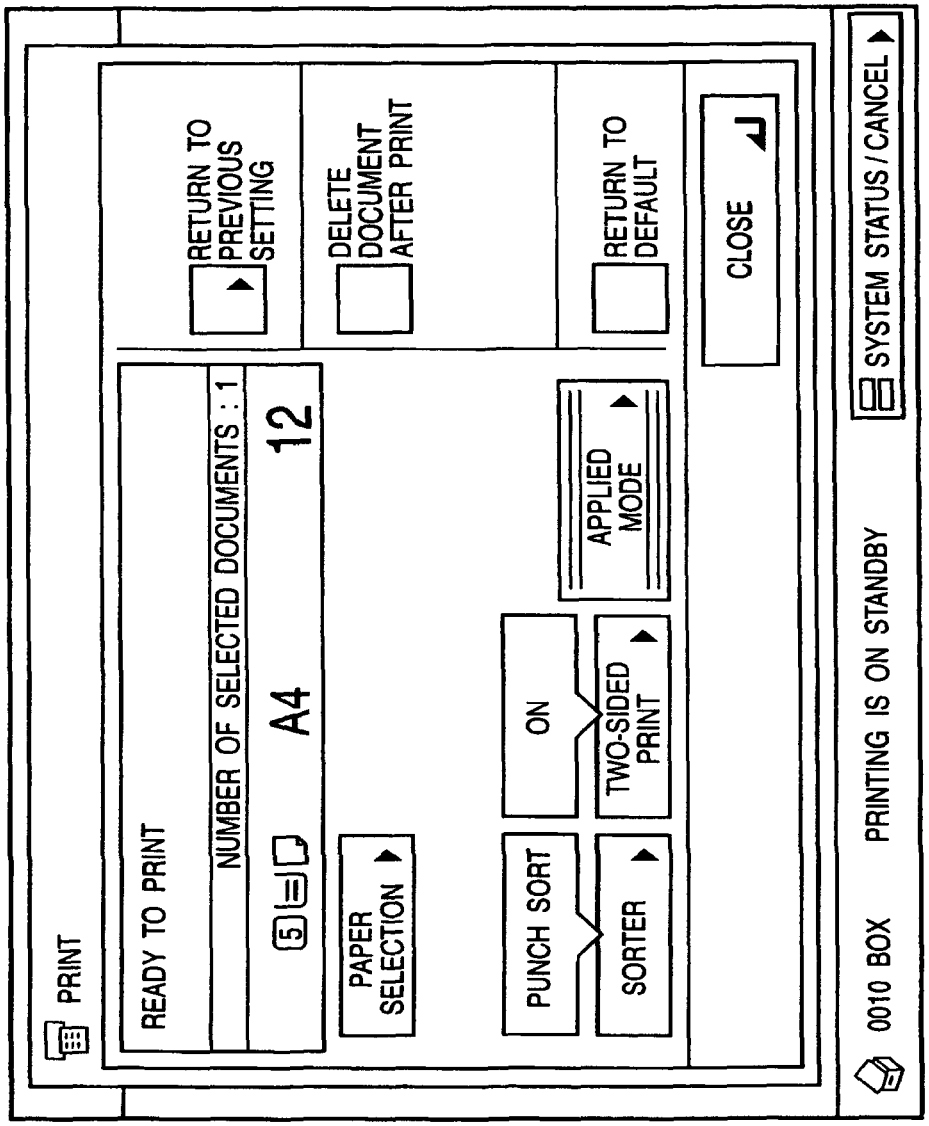
FIG. 28 shows a display example of an operation window (user interface) to be displayed on the display unit 301.
Figure 29:
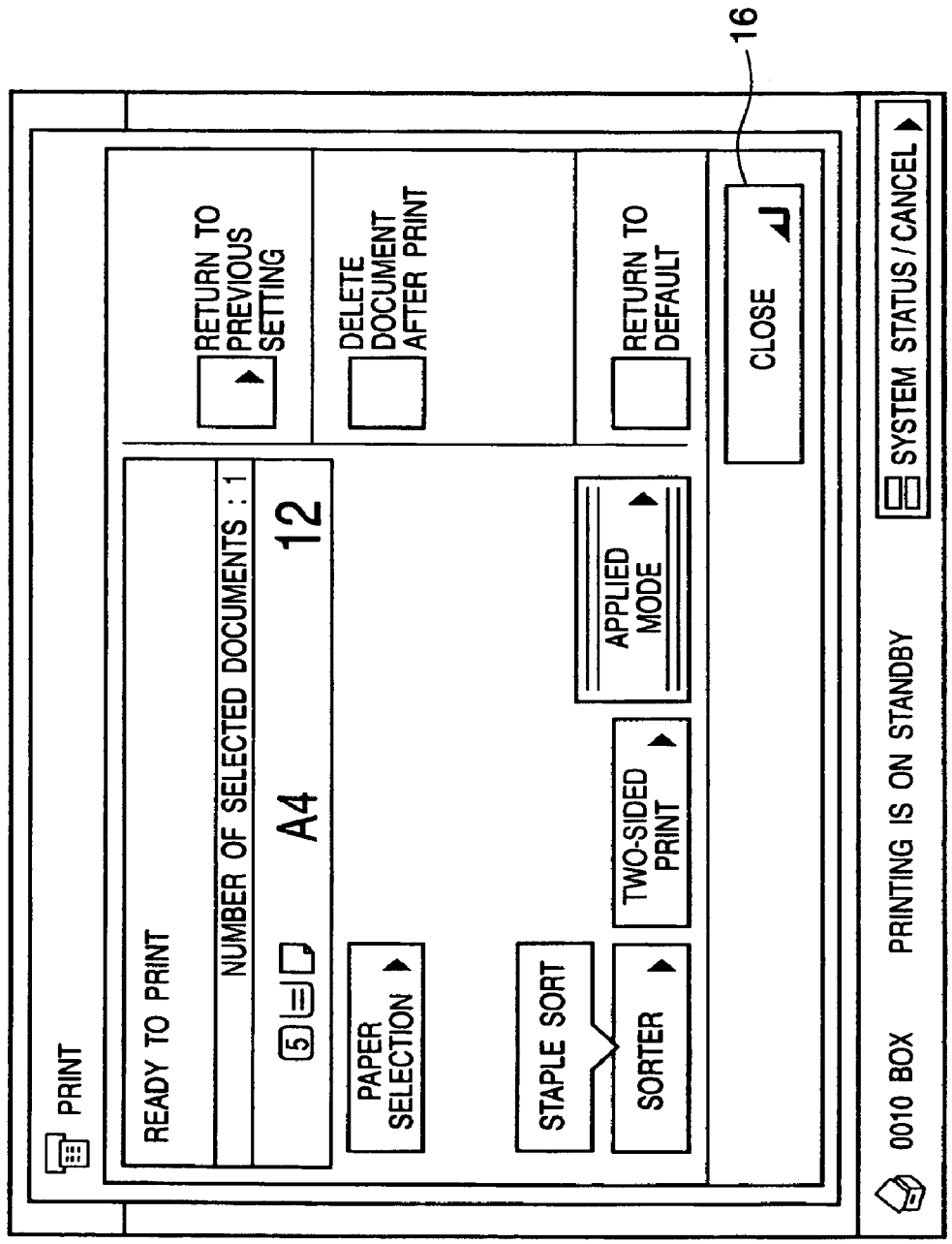
FIG. 29 shows a display example of an operation window (user interface) to be displayed on the display unit 301.

Upon detection of designation of the button icon 15, the control unit 201 switches the display content of the display unit 301 to a window shown in FIG. 28, and displays a GUI used to make settings such as a setting of sorter, a setting associated with the print face such as double- or single-sided printing, and the like in the same manner as the settings on the window shown in FIG. 22. In this case, the operator changes the setting of sorter to "staple sort", as shown in FIG. 29. Upon completion of such setting, when the operator designates a button icon 16, the control unit 201 detects this, and switches the display content of the display unit 301 to a window shown in FIG. 30.

After execution of the trial print processing, the operator can change various settings associated with print processing. The setting contents are stored in the memory 204 as data. Note that an item to be re-set is not limited to this.

Figure 30:
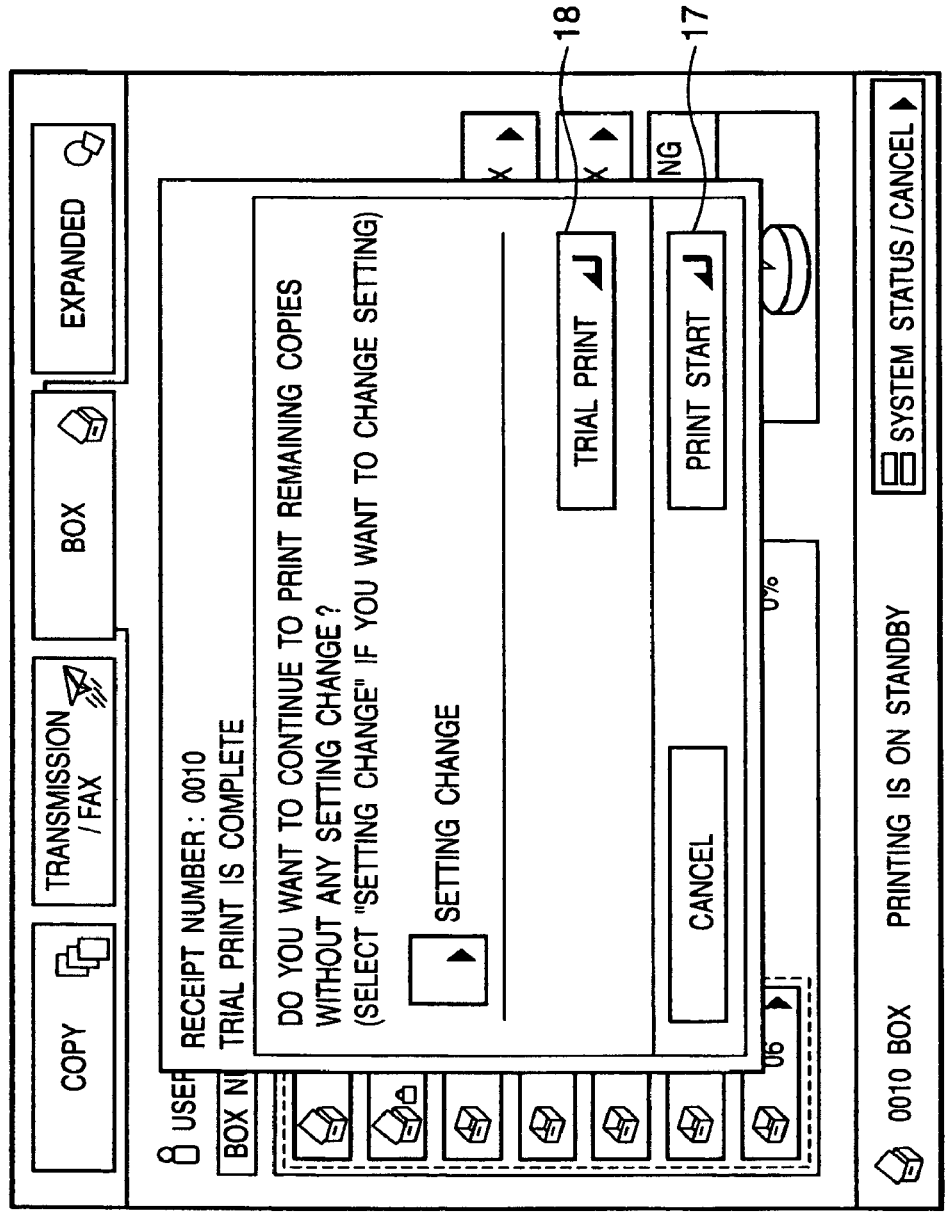
FIG. 30 shows a display example of an operation window (user interface) to be displayed on the display unit 301.
Figure 31:
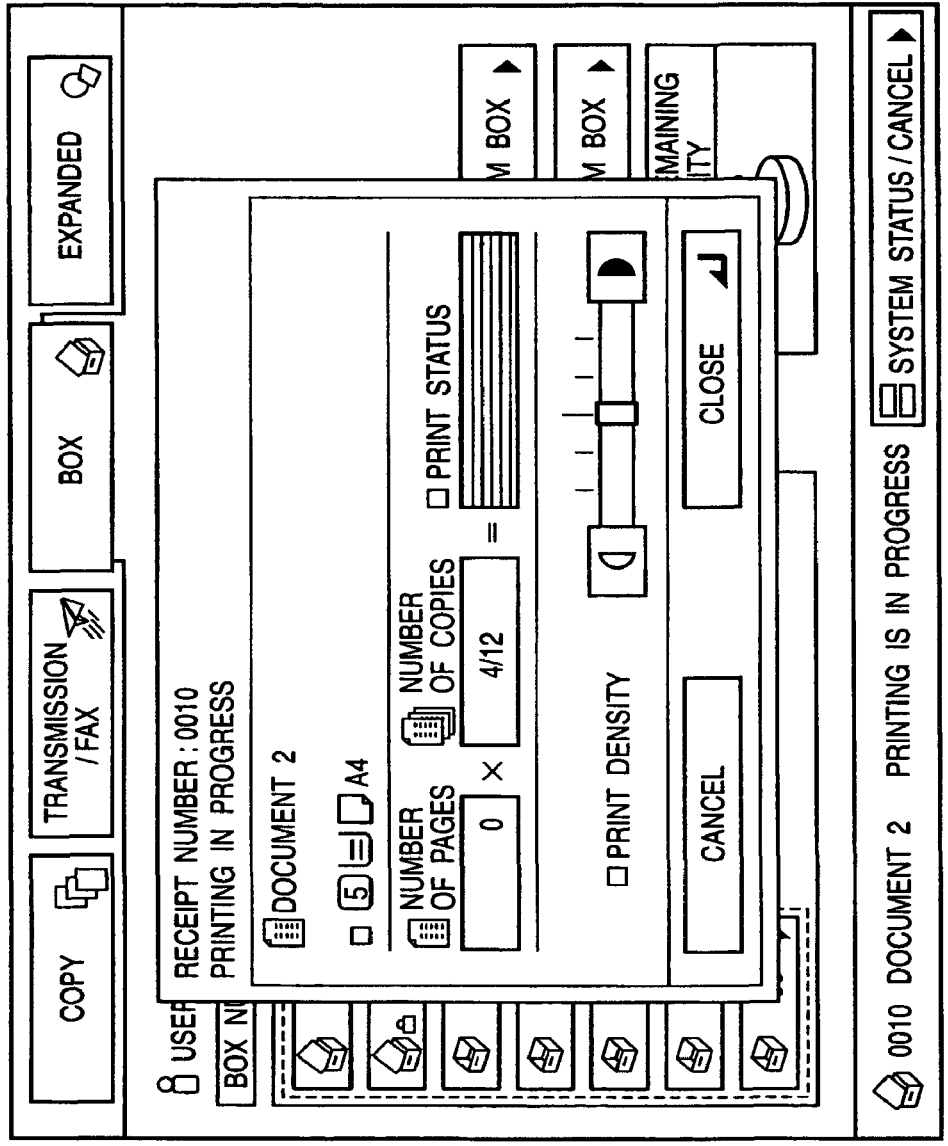
FIG. 31 shows a display example of an operation window (user interface) to be displayed on the display unit 301.

When the operator designates a button icon 18 on the window shown in FIG. 30, the same processing as the above trial print processing is executed. On the other hand, when the operator designates a button icon 17 or a "print start" button on the window of FIG. 27, the control unit 201 detects this, switches the display content of the display unit 301 to a window shown in FIG. 31, and executes processing for printing the print job selected from the list 9.

Figure 32:
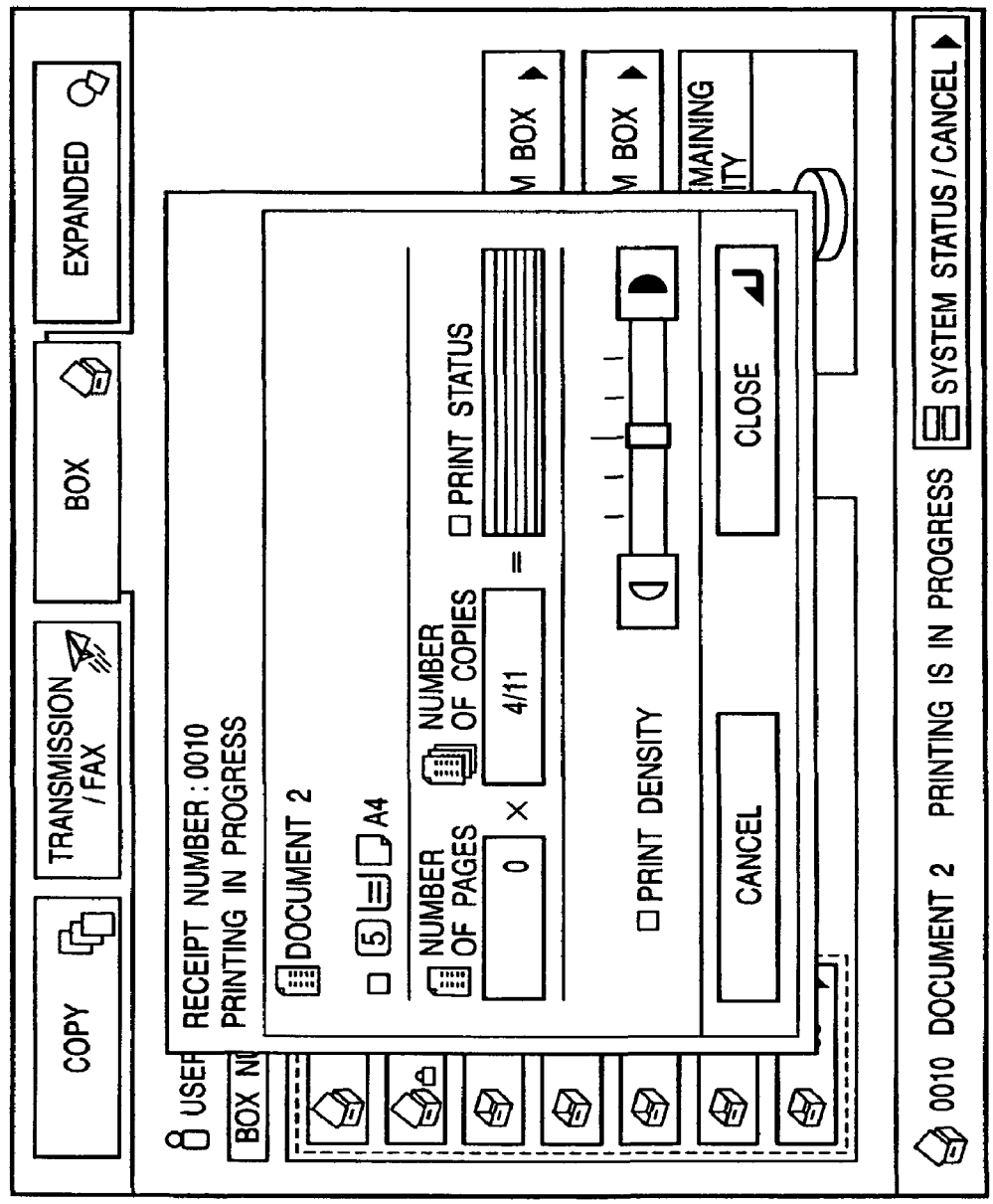
FIG. 32 shows a display example of an operation window (user interface) to be displayed on the display unit 301.

On the other hand, if no settings are changed after the trial print processing, when the operator designates a button icon 18, the control unit 201 detects this, switches the display content of the display unit 301 to a window shown in FIG. 32, and executes processing for printing the print job selected from the list 9.

That is, the number of print copy is 12, as shown in the window of FIG. 22. However, when no settings are changed, since the previously printed one copy can be used, the remaining 11 copies need only be printed. However, when settings are changed, since the previously printed one copy is invalid, 12 copies are printed from the beginning.

<Copy Mode>

Print processing in the copy mode will be described below. As described above, in case of the copy mode, print jobs are sequentially enqueued in the form of a queue in the hard disk 208, and are selected as an object to be printed in turn from the first one. Therefore, the control unit 201 refers to the first print job, and determines whether or not this job is a secure job. In this determination processing, for example, if the print job is a secure job, a password is appended to this print job. If appending of the password is detected, the control unit 201 detects this, and displays the window shown in FIG. 17 as the display contents of the display unit 301.

The control unit 201 can collate the appended password with that which is input to the field 1701. In any case, the processing for prompting the operator to input a password and collating it remains the same irrespective of the input mode of the print job.

If the password input to the field 1701 is authenticated (if it matches with the password appended to the print job), the control unit 201 detects this, and switches the display contents of the display unit 301 to the window shown in FIG. 6. When the print job is not a secure job, the control unit 201 directly displays the window shown in FIG. 6 without displaying the window shown in FIG. 17.

The operator sets the number of copies, paper sheet, magnification, and the like of the job on this window using the operation unit 203.

Referring to FIG. 6, reference numeral 1 denotes a button image used to instruct trial print (trial copy) processing. When the operator designates this button icon with a finger, he or she can instruct to execute trial print processing of a print job. When the operator designates this button icon 1 with a finger or the like, the control unit 201 detects this, switches display contents of the display unit 301 to the window shown in FIG. 7, and executes trial print processing. Executing the trial print processing is to print one copy according to the print job. The number of copies to be printed is not limited to one, but it is the number of copies equal to or smaller than the number of print copies set on the window in FIG. 6 using the operation unit 203.

Upon completion of the print processing for one copy, the control unit 201 detects this, switches display contents of the display unit 301 to the window shown in FIG. 17, and prompts the operator to input a password required to grant a permission to the subsequent processes.

When the operator inputs a password to the field 1701 using the operation unit 203 and designates the button icon 1702, the control unit 201 detects this designation, and authenticates the password input to the field 1701. If the password input to the field 1701 is authenticated, the control unit 201 detects this, and switches the display content of the display unit 301 to a window shown in FIG. 8. If the print job is not a secure job, the control unit 201 directly displays the window shown in FIG. 8 without displaying the window shown in FIG. 17.

The operator confirms the print settings by checking one copy printed by the trial print processing. If the operator wants to change the settings, he or she designates a button icon 2 shown in FIG. 8.

Figure 10:
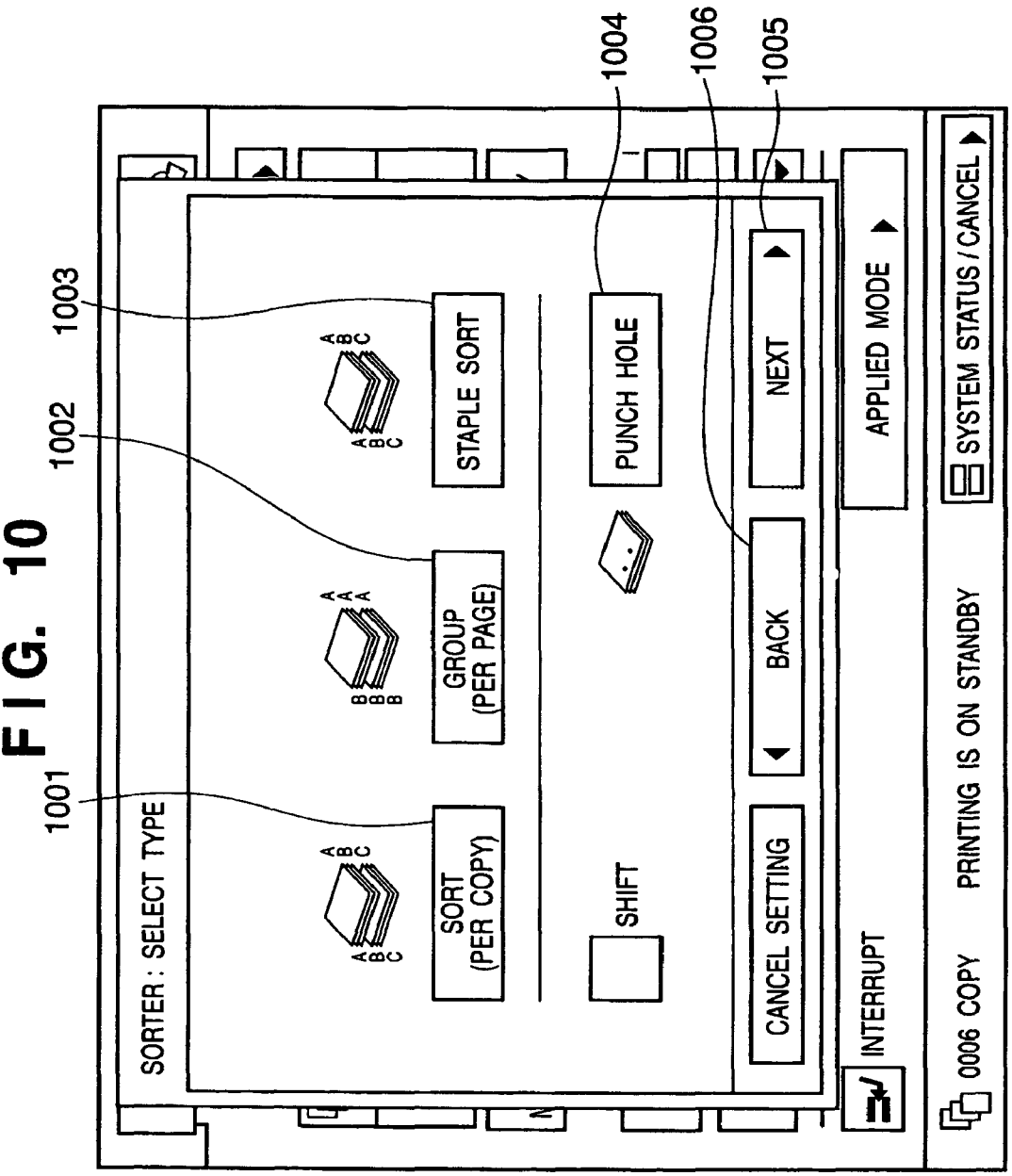
FIG. 10 shows a display example of an operation window (user interface) to be displayed on the display unit 301.

Upon designation of the button icon 2, the control unit 201 detects this, switches the display content of the display unit 301 to a window shown in FIG. 9, and displays a GUI used to change settings of, e.g., the number of copies, density, finishing, and the like. When the operator designates a button icon 3 used to input an instruction for switching a sorter, the control unit 201 detects this, and switches the display content of the display unit 301 to a window shown in FIG. 10. The window shown in FIG. 10 is a GUI window used to select a sorter to be used. When the operator designates one of buttons 1001 to 1004 used to designate the sorter to be used, he or she can designate the sorter to be used, and the display contents of the display unit 301 are switched to a window shown in FIG. 12. When still another setting is to be referred to, the operator can designate a button icon 1005 or 1006.

On the other hand, when the operator designates a button icon 4 used to instruct double-sided copy on the window shown in FIG. 9, the control unit 201 detects this, and switches the display content of the display unit 301 to a window shown in FIG. 11. The window shown in FIG. 11 is a GUI window used to select details of the double-sided copy mode. When the operator designates one of button icons 1101 and 1102 as details of the double-sided copy mode, and then designates a button icon 1103, the control unit 201 detects this, and switches the display content of the display unit 301 to a window shown in FIG. 12.

After execution of the trial print processing, the operator can change various settings associated with print processing. The setting contents are stored in the memory 204 as data. Note that an item to be re-set is not limited to this.

When the operator designates a button icon 5 on the window shown in FIG. 12, the control unit 201 detects this, and switches the display content of the display unit 301 to a window shown in FIG. 13.

When the operator designates a button icon 6 on the window shown in FIG. 13, the control unit 201 detects this, switches the display content of the display unit 301 to a window shown in FIG. 14, and executes print processing of a job to be printed under the previously set print conditions. In this case, the number of copies to be printed is that which is initially set or that which is re-set in the re-setting processing.

When the operator wants to change the settings again before he or she designates the button icon 6, he or she can designate a button icon 1301 to execute the same processing as that upon instructing the re-setting processing. Furthermore, when the operator wants to execute trial print processing, he or she can designate a button icon 1302 to execute the aforementioned trial print processing.

When the re-setting processing is skipped, since the copy previously printed by the trial print processing need not be printed again, the print processing is executed for the number of copies obtained by subtracting 1 from the number of print copies set on the window in FIG. 6 using the operation unit 203. In this case, the display window shown in FIG. 15 is displayed in place of that in FIG. 14.

With the above processing, when a print job is a secure job and the operator leaves the image forming apparatus 101 after this print job is printed by the trial print processing, processing for "printing for the designated number of copies" to be executed after the trial print processing cannot be started without password authentication. Hence, even when trial print processing and processing for "printing for the designated number of copies" are executed based on a secure job, the security for the print job can be maintained.

Figure 33A:
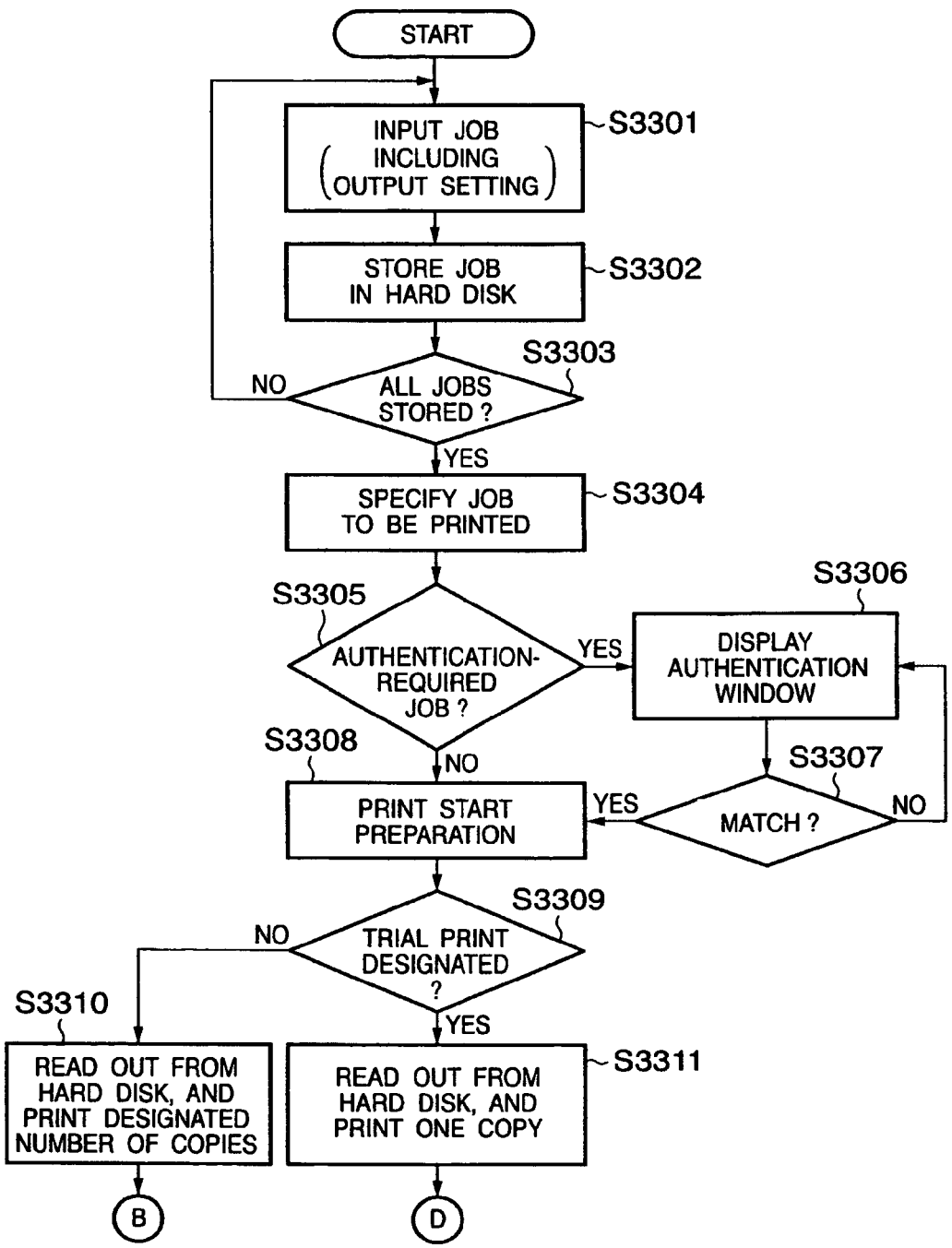
FIGS. 33A and 33B are flowcharts of print processing to be executed by the image forming apparatus 101 according to the first embodiment of the present invention.
Figure 33B:
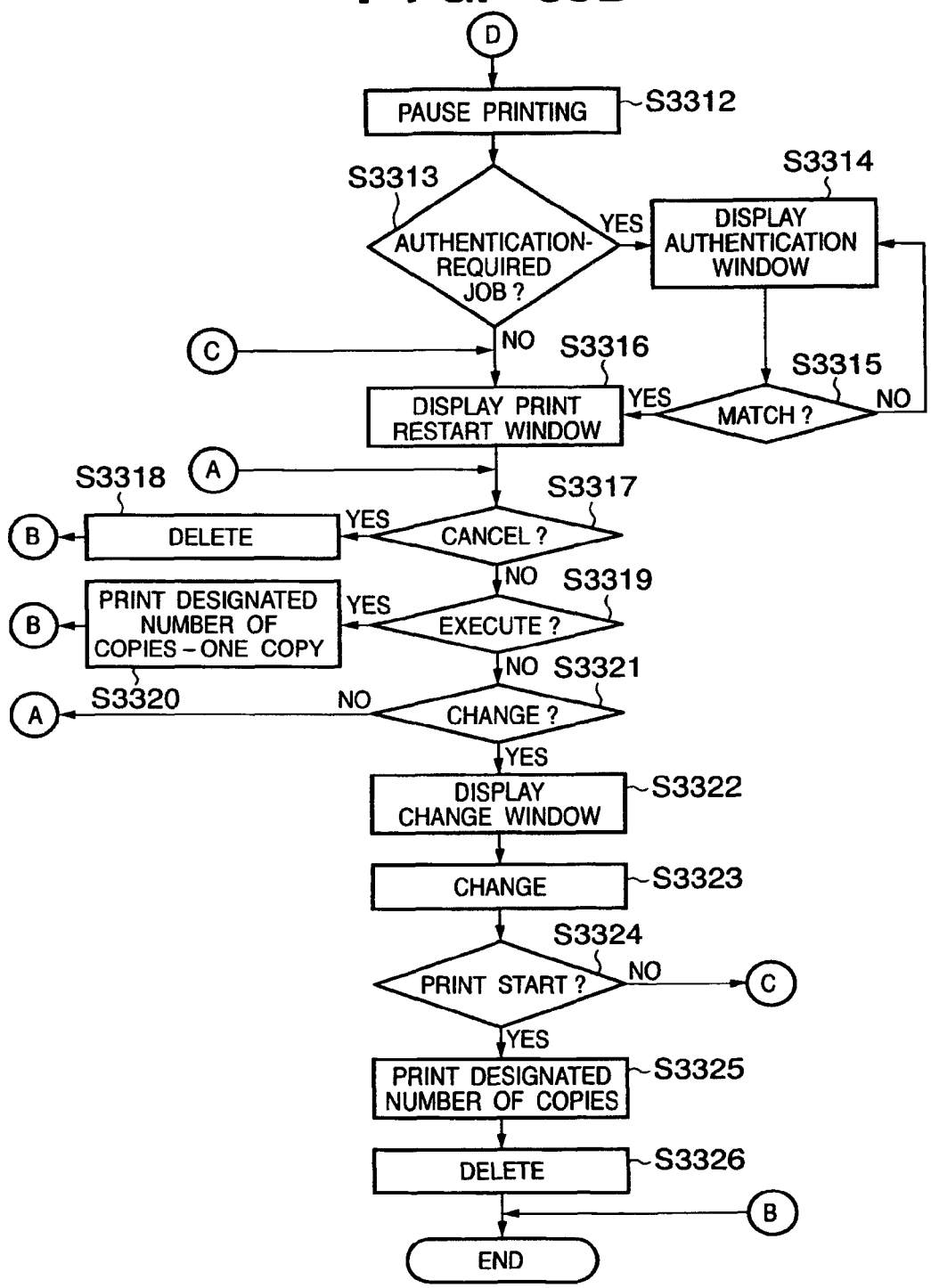

FIGS. 33A and 33B are flowcharts of the aforementioned print processing to be executed by the image forming apparatus 101. Note that programs and data for making the control unit 201 execute the processing according to the flowcharts of FIGS. 33A and 33B are saved in the hard disk 208, and are loaded onto the memory 204 under the control of the control unit 201. When the control unit 201 executes processing using these programs and data, the image forming apparatus 101 can implement print processing to be described below.

Upon detection of a print job input from the external apparatus or the scanner unit 202 of the self apparatus (step S3301), the control unit 201 executes processing for saving this print job in the hard disk 208 (step S3302). Upon saving the print job, when the operator selects "box" from the function selection area 401, the print job is stored in the box of the operator who is currently using the image forming apparatus 101. On the other hand, when the operator selects "copy", the print job is sequentially stored in the queue assured in the hard disk 208. Also, this print job is appended with data of print conditions (output settings such as the number of print copies, and the like).

It is checked if data of all input print jobs are saved in the hard disk 208 (step S3303). If data of all input print jobs are saved, the flow advances to step S3304. In case of the box mode, the control unit 201 executes processing for specifying a job to be printed by accepting an input of the operation for opening one of boxes using the operation unit 203. In case of the copy mode, the control unit 201 executes processing for specifying the first job in the queue as a job to be printed (step S3304).

In case of the box mode, it is determined whether or not the box to be accessed by the operator using the operation unit

203 is a box that stores secure jobs. In case of the copy mode, it is checked if the first job in the queue is a secure job (step S3305).

If the box to be accessed is not a box which stores secure jobs, or if the first job in the queue is not a secure job, the flow advances to step S3308. On the other hand, if the box to be accessed is a box which stores secure jobs, or if the first job in the queue is a secure job, the flow advances to step S3306 to display the window shown in FIG. 17 on the display screen of the display unit 301 and to wait for a password input (step S3306). A password input to the field 1701 on this window is collated with that pre-set for this box (or a password appended to the job to be printed), and it is checked if these two passwords match (step S3307). If the two passwords match, the flow advances to step S3308.

Upon completion of the above processing, in case of the box mode, the control unit 201 displays the window shown in FIG. 18 on the display screen of the display unit 301 and prompts the operator to select a job to be printed. When the operator selects a job and designates the button icon 10, the control unit 201 displays the window shown in FIG. 20 on the display screen of the display unit 301 and makes print preparation (step S3308). On the other hand, in case of the copy mode, the control unit 201 displays the window shown in FIG. 6 on the display screen of the display unit 301, accepts the settings of print conditions on this window as needed, and makes print preparation (step S3308).

It is checked if a trial print instruction is issued (step S3309). In case of the box mode, it is checked if the operator designates the button icon 13 on the window in FIG. 22 and then designate the "print start" button icon in FIG. 24. On the other hand, in the copy mode, it is checked if the operator designates the button icon 1 in FIG. 6.

If the operator designates no trial print instruction, and designates a print operation start instruction using the button group 302 on the operation unit 203, the flow advances to step S3310, and the control unit 201 reads out the previously specified print job from the hard disk 208 and executes print processing in accordance with the designated print conditions (step S3310).

On the other hand, if the operator designates the trial print instruction, the flow advances to step S3311, and the control unit 201 reads out the previously specified print job from the hard disk (HDD) 208 and prints that print job for one copy (step S3311).

The print processing is done by outputting the processing result of data of the print job by the data processing unit 206 to the printer unit 207. Since the actual print operation is known to those skilled in the art, a description thereof will be omitted. Upon completion of the print processing for one copy, the control unit 201 pauses the print processing (step S3312), and checks if the print job is a secure job by executing the same processing as that in step S3305 (step S3313). If the print job is not a secure job, the flow advances to step S3316.

On the other hand, if the print job is a secure job, the flow advances to step S3314, and the control unit 201 displays the window shown in FIG. 26 (box mode) or FIG. 17 (copy mode) on the display screen of the display unit 301. The control unit 201 waits for a password input, and executes the same processing as in step S3307, thus authenticating the input password (step S3315). If the input password is authenticated, the flow advances to step S3316.

In step S3316, the control unit 201 displays the window shown in FIG. 27 (box mode) or FIG. 8 (copy mode) on the display screen of the display unit 301 (step S3316).

If the operator designates a "cancel" button image on this window (step S3317), the flow advances to step S3318, and the control unit 201 executes processing for clearing the print job to be printed from the memory 204 and hard disk 208 (step S3318), thus ending this processing.

If the operator designates a "print start" button image on this window (step S3319), the flow advances to step S3320, and the control unit 201 executes print processing on the basis of the print job to be printed (step S3320). Note that the number of copies to be printed is that obtained by subtracting 1 from the number of copies which is previously set.

On the other hand, if the operator designates a "setting change" button image on this window (step S3321), the flow advances to step S3322, and the control unit 201 displays the window associated with the setting change (step S3322). If the operator designates a button icon for a predetermined change on this window, the control unit 201 displays a window accordingly to accept various change instructions (step S3323).

Upon completion of the change processing, since the control unit 201 displays the window shown in FIG. 30 (box mode) or FIG. 13 (copy mode) on the display screen of the display unit 301, if the operator designates a "print start" button image on this window (step S3324), the flow advances to step S3325 to execute print processing based on the print job to be printed (step S3325). Note that the number of copies to be printed is that which is set previously or that which is changed in step S3323. On the other hand, if the operator does not designate the "print start" button image, the flow returns to step S3316 to repeat the subsequent processes.

After the print processing in step S3325, the control unit 201 clears the data of the print job from the memory 204 and hard disk 208 and ends this processing.

With the above processing, the security of the secure job can be maintained.

Also, in this embodiment, password authentication is made to authenticate the operator who wants to print a secure job so as to maintain the security of the secure job. Alternatively, authentication may be made using living body information such as a retina pattern, voice, fingerprints, and the like of the operator in place of the password. In this case, the image forming apparatus 101 requires a mechanism for scanning living body information of the operator and matching it with living body information appended to a print job.

As a data input mode for authentication, a contact type ID card for personal recognition may be used.

Second Embodiment

In this embodiment, when print settings are changed after trial print processing, and the trial print processing is executed again, the control prompts the operator to input a password again.

Figure 35A:
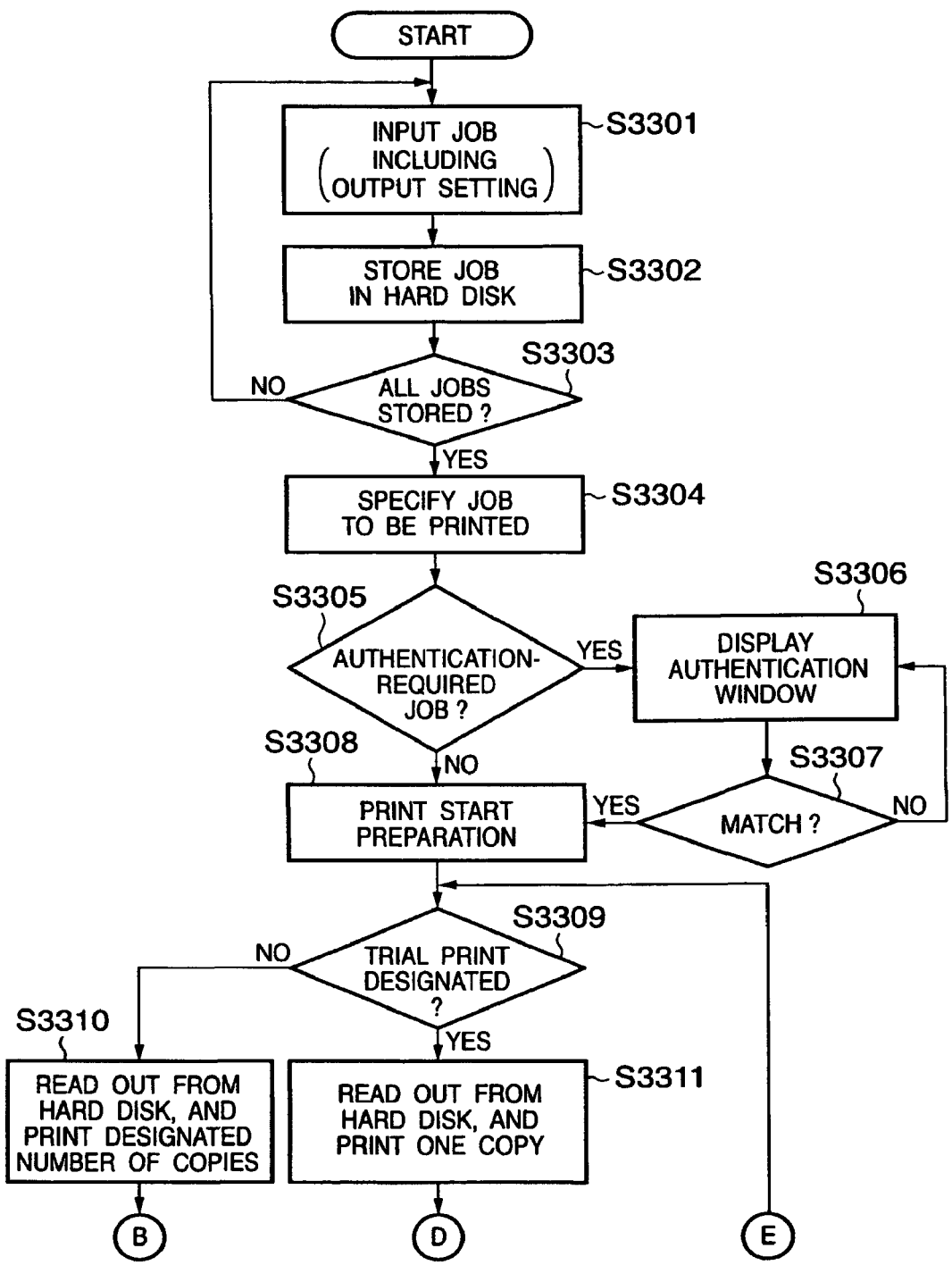
FIGS. 35A and 35B are flowcharts of print processing to be executed by an image forming apparatus 101 according to the second embodiment of the present invention.
Figure 35B:
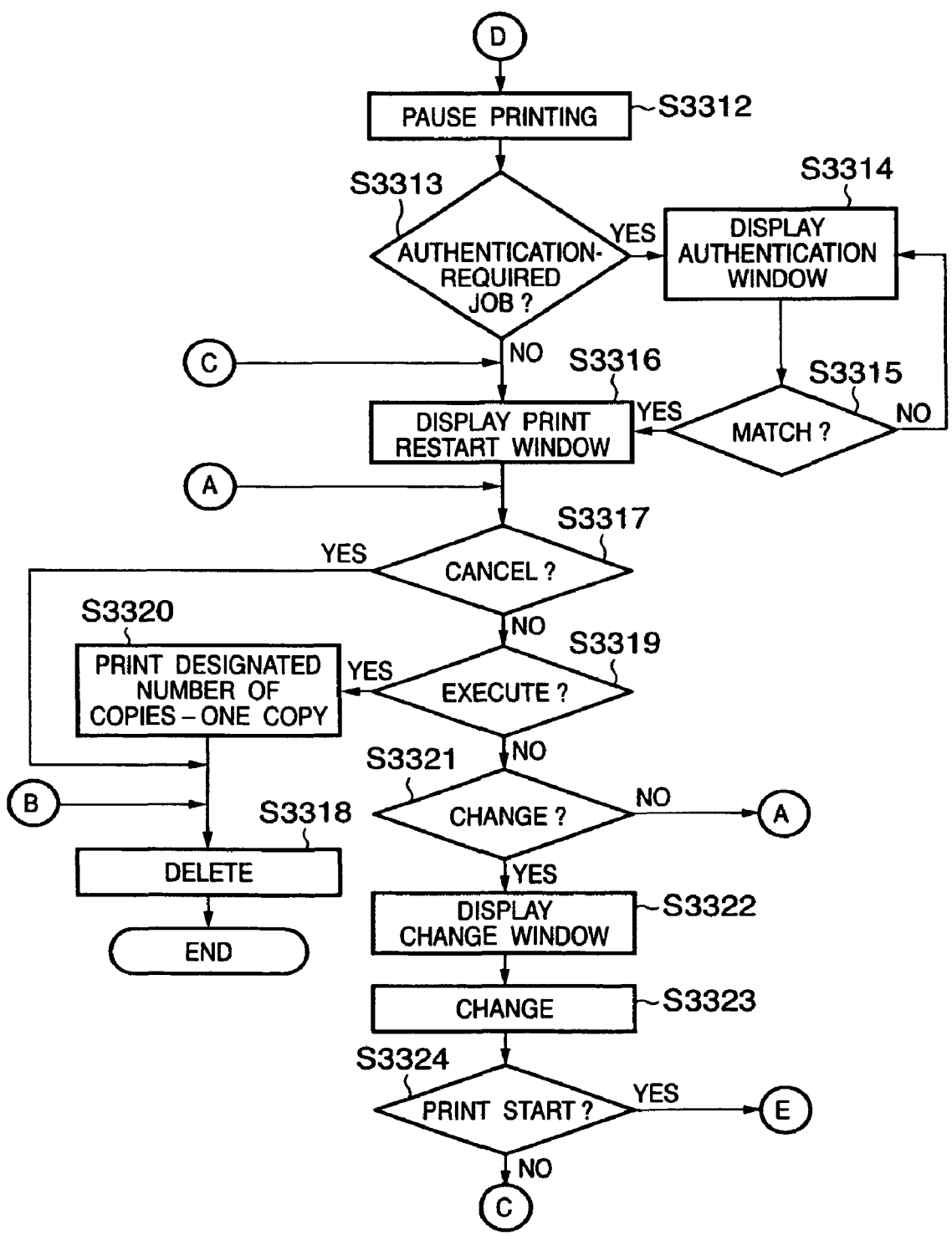

FIGS. 35A and 35B are flowcharts of print processing according to this embodiment. Note that the same step numbers in FIGS. 35A and 35B denote the same steps as those in FIGS. 33A and 33B, and a description thereof will be omitted.

After the print settings are changed in step S3323, if the operator designates the trial print or print start button icon on the window shown in FIG. 30 (box mode) or FIG. 13 (copy mode), the flow returns to step S3309 to repeat the subsequent processes.

More specifically, when the print settings are changed and trial print processing is executed, a password input is required anew.

Figure 37:
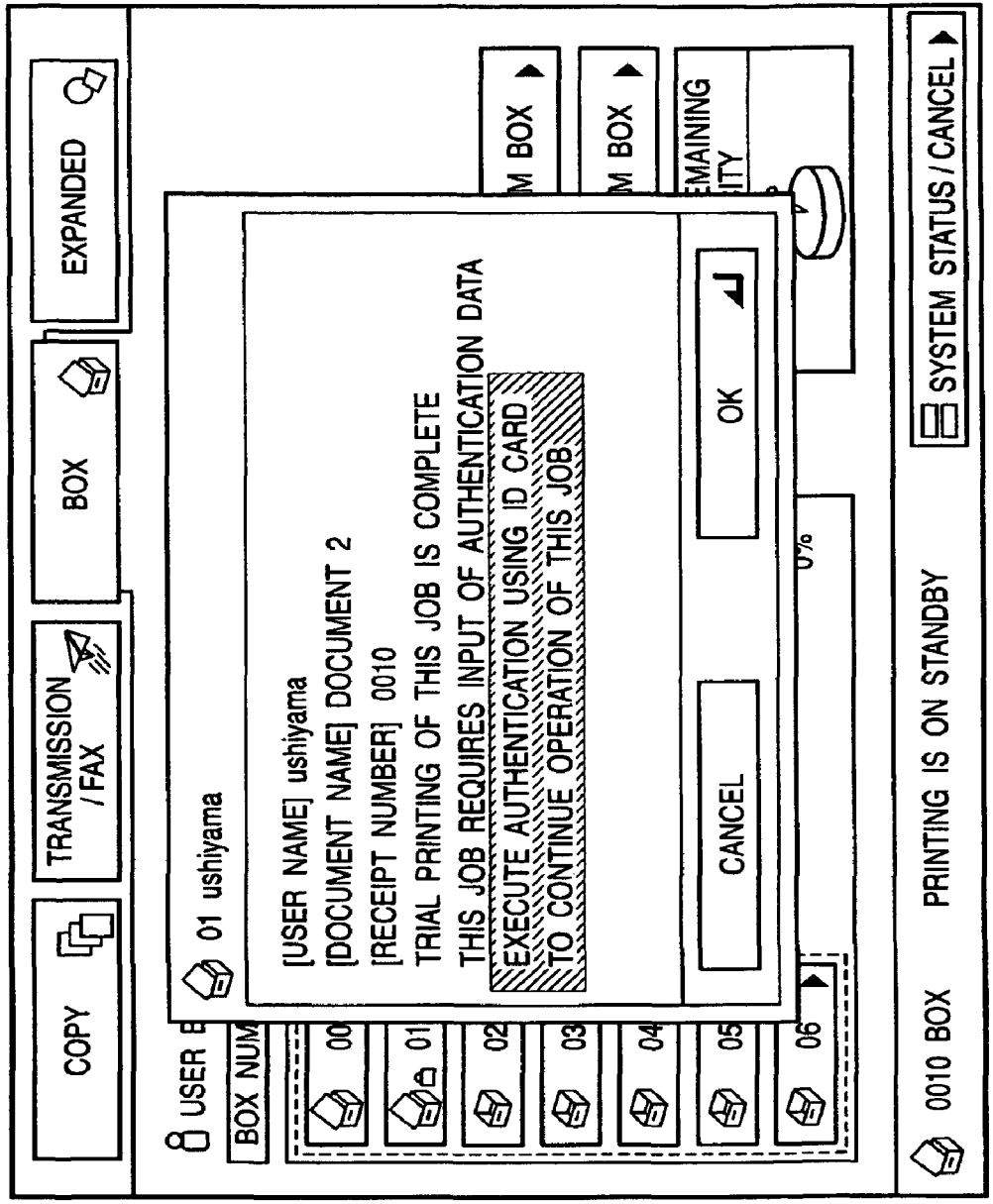
FIG. 37 shows a display example of an operation window (user interface) to be displayed on the display unit 301.

In this embodiment as well, as a data input mode for authentication, a method of using a contact type ID card for personal recognition may be used. When a non-contact type ID card for personal recognition and card reader are used, it is recognized that the operator is around a printer as well as personal authentication. If the card reader cannot recognize the ID card, i.e., if the operator leaves his or her seat, a window shown in FIG. 37 is displayed on the display screen of the display unit 301 to implement a scheme that prohibits a job from being restarted by a person other than an original.

Third Embodiment

In this embodiment, upon executing the processing in step S3316 in the processing according to the flowcharts of FIGS. 33A and 33B, no password input is required before this processing. However, if a no-operation input time period for the window displayed in step S3316 (the window shown in FIG. 27 (box mode) or FIG. 8 (copy mode)) continuously elapses for a predetermined period of time or more, authentication is made again.

Figure 34A:
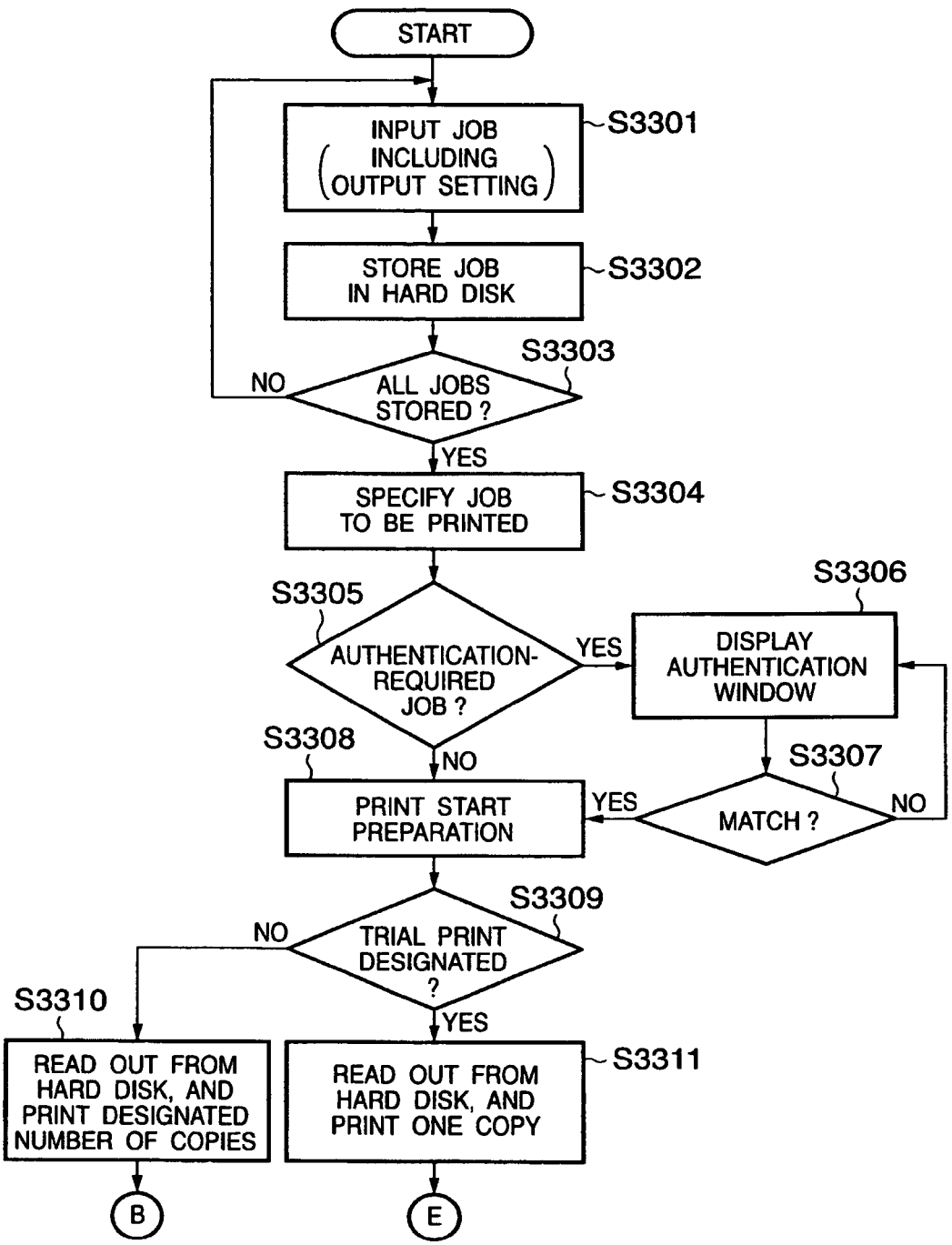
FIGS. 34A, 34B, and 34C are flowcharts of print processing to be executed by an image forming apparatus 101 according to the third embodiment of the present invention.
Figure 34B:
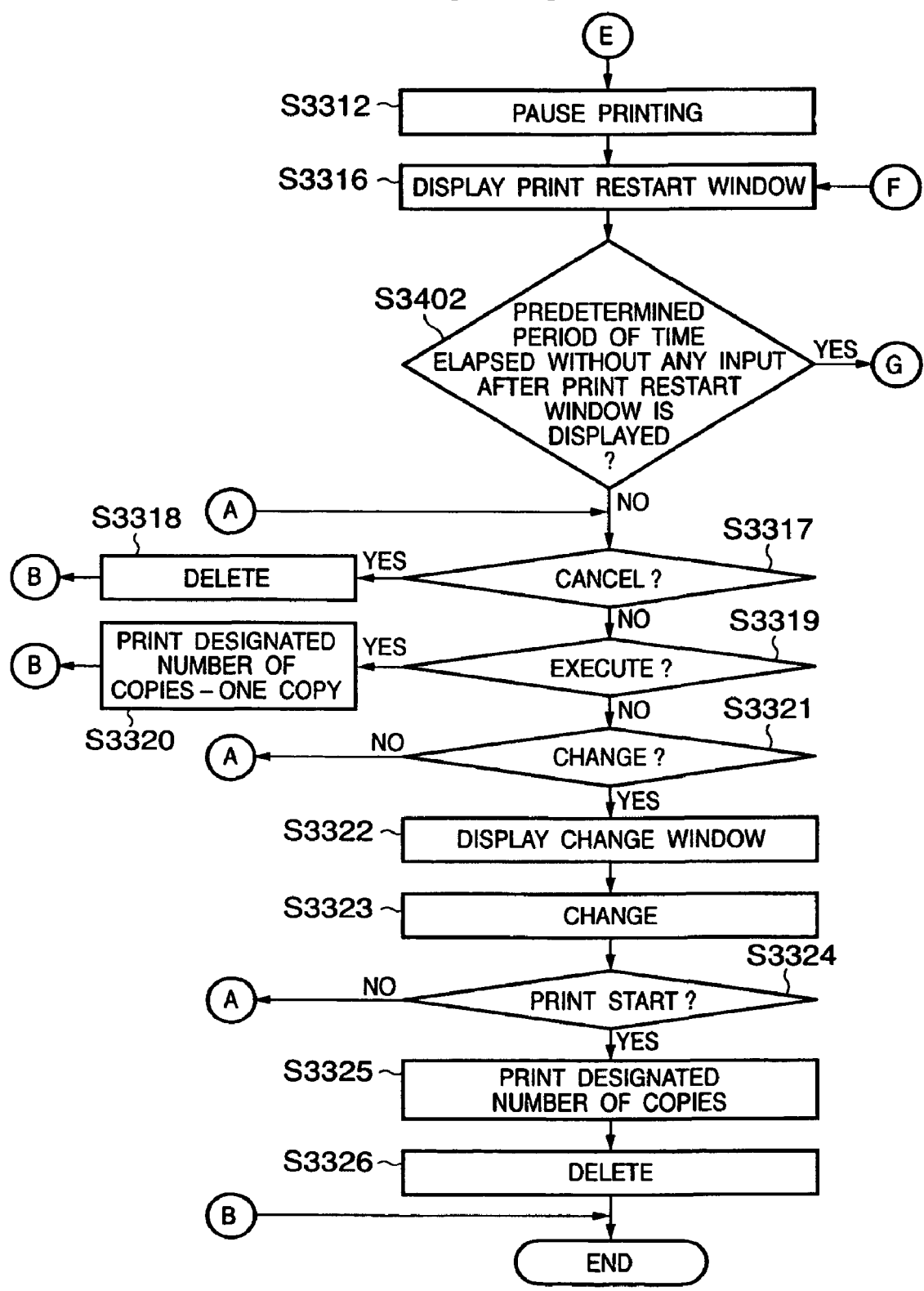
Figure 34C:
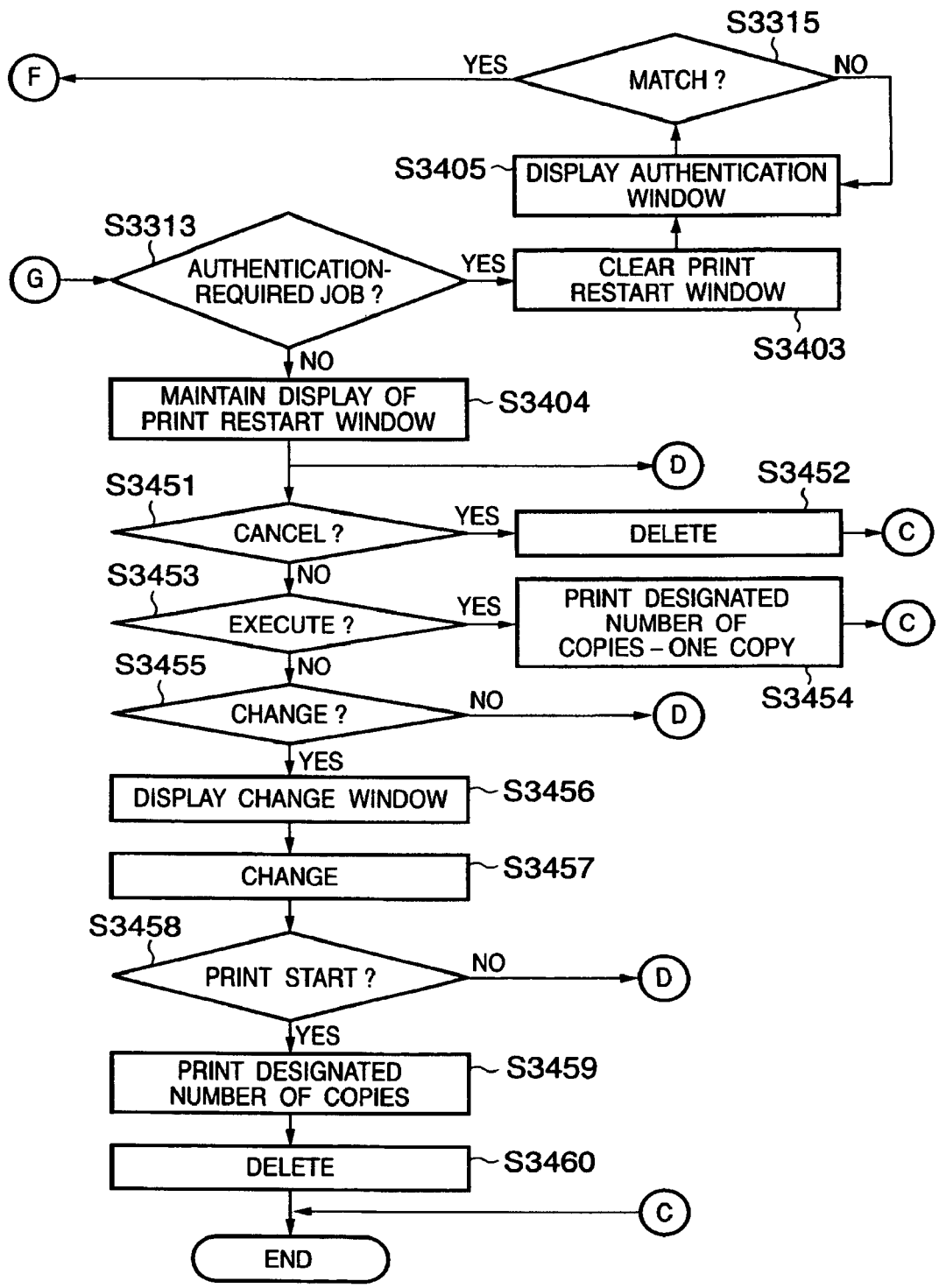

FIGS. 34A, 34B, and 34C are flowcharts of print processing according to this embodiment. Note that the same step numbers in FIGS. 34A, 34B, and 34C denote the same steps as those in FIGS. 33A and 33B, and a description thereof will be omitted. After the processing in step S3312, that in step S3316 is executed. In this case, it is checked if a no-operation input time period for the window shown in FIG. 27 (box mode) or FIG. 8 (copy mode) continuously elapses for a predetermined period of time or more (step S3402). The time measurement is attained by the internal timer of the control unit 201.

If the no-operation input time period falls within the predetermined period of time, the processes in step S3317 and subsequent steps are executed; otherwise, the flow advances to step S3313 to check if the print job is a secure print job. If the print job is not a secure job, the flow advances to step S3404, and the control unit 201 continues to display the window shown in FIG. 27 (box mode) or FIG. 8 (copy mode) and executes the processes in step S3451 and subsequent steps. Since the processes in step S3451 and subsequent steps are the same as those in step S3317 and subsequent steps, a description thereof will be omitted.

On the other hand, if it is determined in step S3313 that the print job is a secure job, the flow advances to step S3403, and the control unit 201 clears the window shown in FIG. 27 (box mode) or FIG. 8 (copy mode) (step S3403), and displays a password input window shown in FIG. 38 to prompt the operator to input a password (step S3405). In FIG. 38, reference numeral 3800 denotes a window used to input a password; 3801, a field for inputting a password; and 3802, a button icon used to instruct authentication of the password when this button icon is designated after the password is input.

When the operator inputs a password in the field 3801 using the operation unit 203 and designates the button icon 3802, the control unit 201 detects this, and authenticates the password input to the field 3801. This authentication processing is the same as that described above. If the password is authenticated, the flow returns to step S3316 via step S3315 to repeat the subsequent processes.

In this embodiment as well, as a data input mode for authentication, a method of using a contact type ID card for personal recognition may be used. When a non-contact type ID card for personal recognition and card reader are used, it is recognized that the operator is around a printer as well as personal authentication. If the card reader cannot recognize the ID card, i.e., if the operator leaves his or her seat, a window shown in FIG. 37 is displayed on the display screen of the display unit 301 to implement a scheme that prohibits a job from being restarted by a person other than an original.

Fourth Embodiment

The print processing according to this embodiment is substantially the same as that in FIGS. 33A and 33B, except for processes in step S3317 and subsequent steps. That is, if no operation input is made for a predetermined period of time after the change processing, the control prompts the operator to input a new password.

Figure 36A:
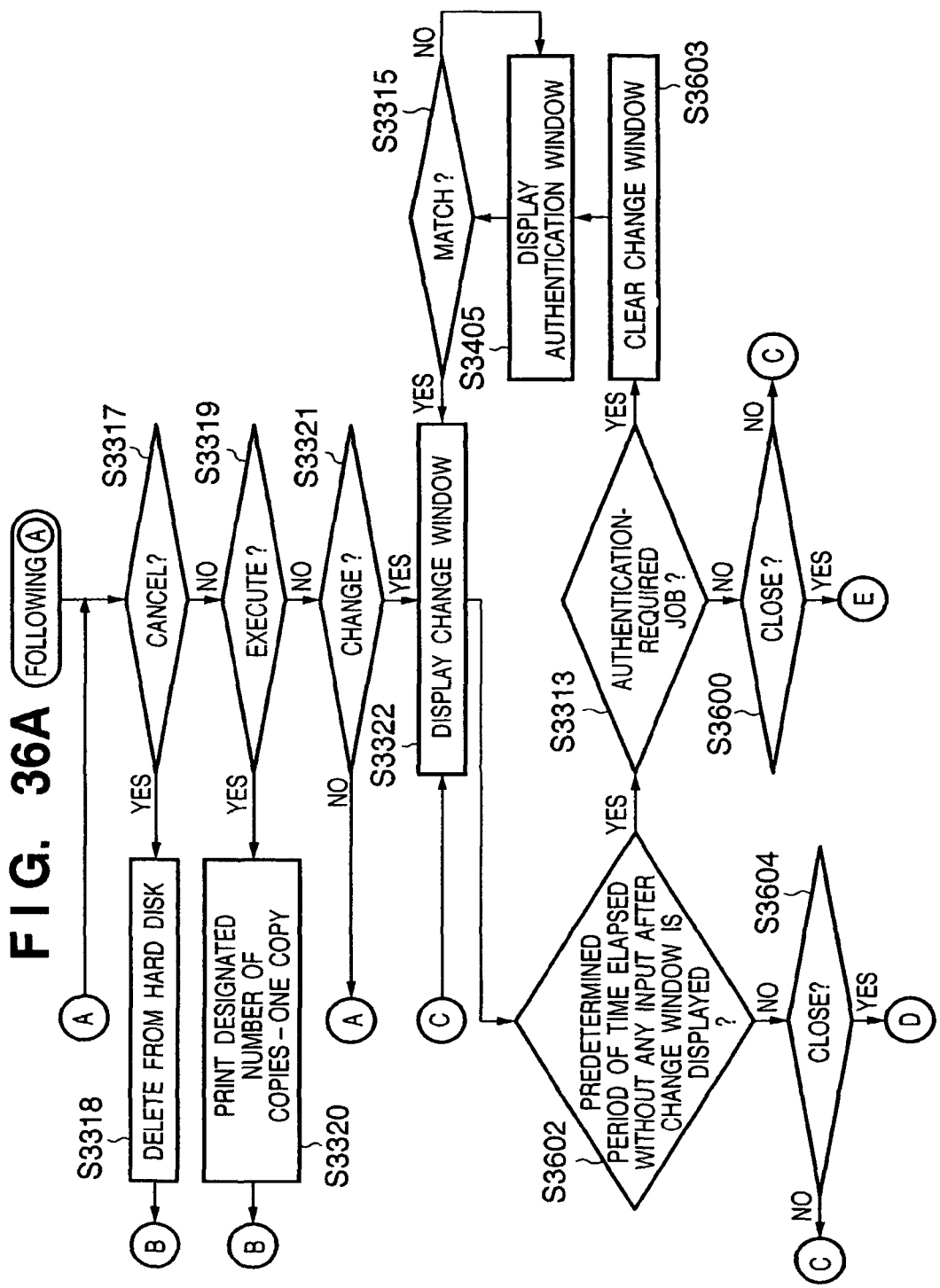
FIGS. 36A and 36B are flowcharts of print processing to be executed by an image forming apparatus 101 according to the fourth embodiment of the present invention.
Figure 36B:
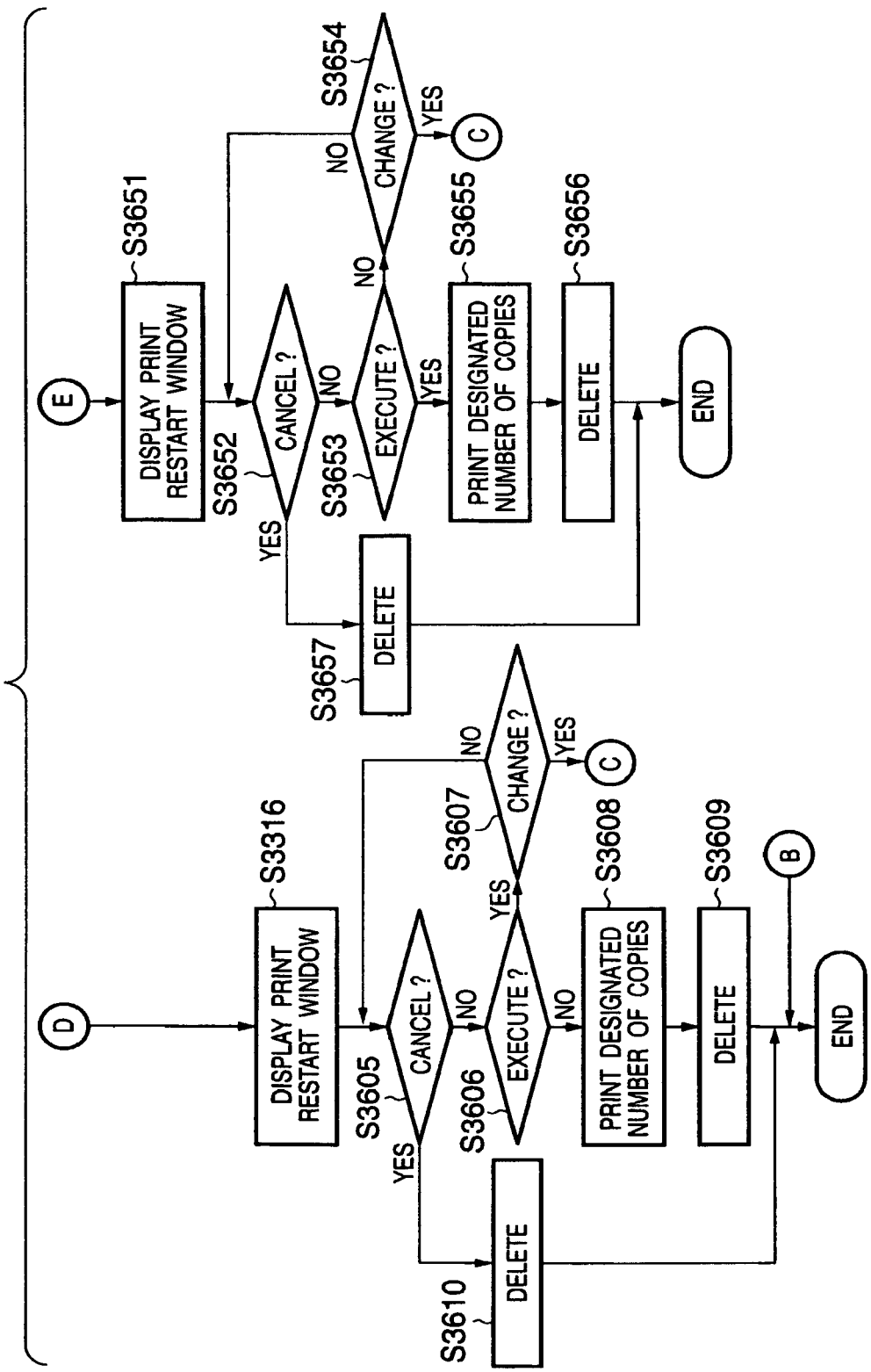

FIGS. 36A and 36B are flowcharts of processes in step S3317 and subsequent steps in the print processing according to this embodiment. Note that the same step numbers in FIGS. 36A and 36B denote the same steps as those in FIGS. 33A, 33B, 34A, 34B, and 34C, and a description thereof will be omitted.

Figure 21:
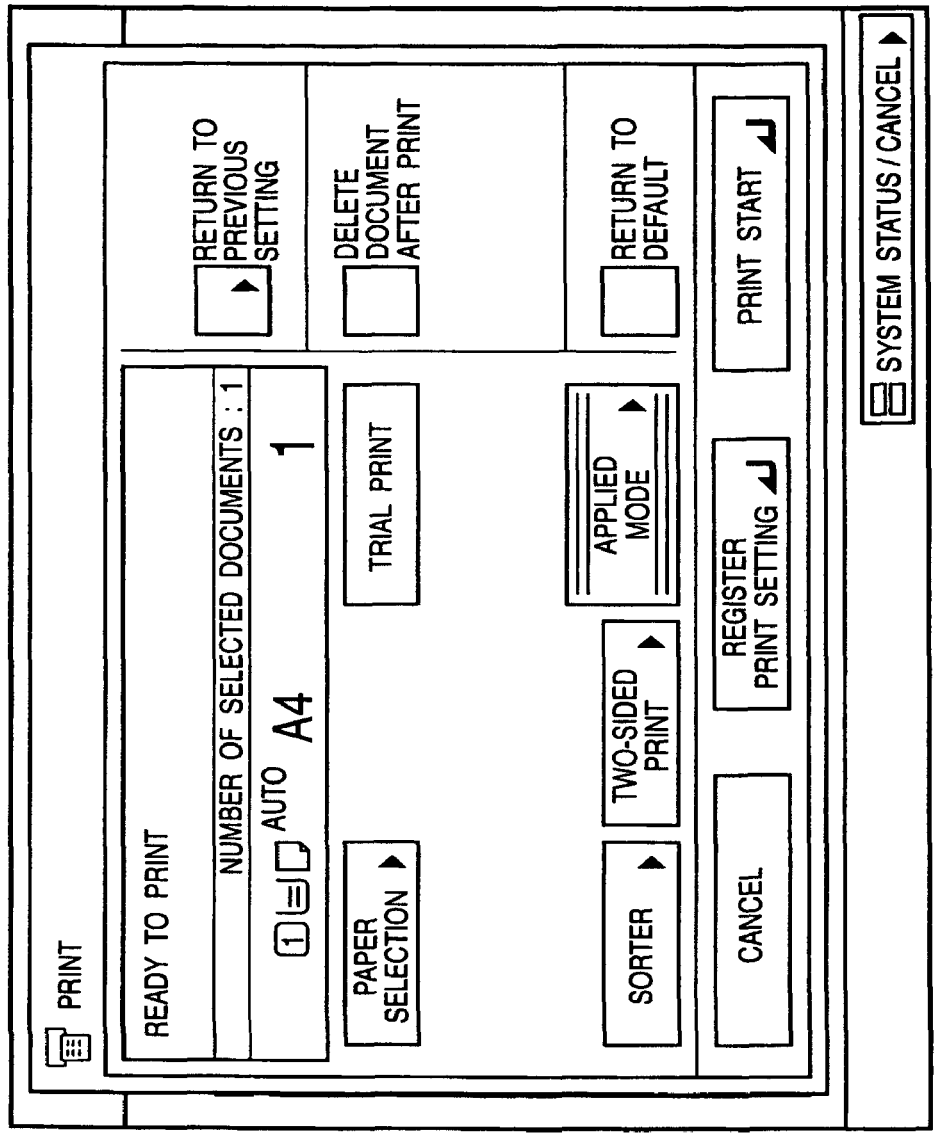
FIG. 21 shows a display example of an operation window (user interface) to be displayed on the display unit 301.

After the change processing in step S3321, if the setting are changed, the flow advances to step S3322, and the control unit 201 displays the window shown in FIG. 21 (box mode) or FIG. 9 (copy mode) on the display screen of the display unit 301 to accept various changes. It is then checked if a no-operation input time period continuously elapses for a predetermined period of time or more after this window is displayed (step S3602).

As a result of this checking processing, if a no-operation input time period continuously elapses for a predetermined period of time or more after the window shown in FIG. 21 (box mode) or FIG. 9 (copy mode) is displayed on the display screen of the display unit 301, the flow advances to step S3313 to check if the print job is a secure job. If the print job is not a secure job, the flow advances to step S3600 to check if the operator designates a "close" button icon. If the operator designates a "close" button icon, the flow advances to step S3651.

On the other hand, if it is determined in step S3313 that the print job is a secure job, the flow advances to step S3603, and the control unit 201 clears the window shown in FIG. 21 (box mode) or FIG. 9 (copy mode) (step S3603), and displays a password input window shown in FIG. 38 to prompt the operator to input a password (step S3405).

When the operator inputs a password in the field 3801 using the operation unit 203 and designates the button icon 3802, the control unit 201 detects this, and authenticates the password input to the field 3801. This authentication processing is the same as that described above. If the password is authenticated, the flow returns to step S3322 via step S3315 to repeat the subsequent processes.

On the other hand, if a no-operation input time period does not continuously elapse for a predetermined period of time or more after the window shown in FIG. 21 (box mode) or FIG. 9 (copy mode) is displayed on the display screen of the display unit 301, the flow advances to step S3604 to check if the operator designates a "close" button icon. If the operator designates a "close" button icon, the flow advances to step S3316, and the control unit 201 displays the window shown in FIG. 27 (box mode) or FIG. 8 (copy mode) on the display screen of the display unit 301 (step S3316).

If the operator designates a "cancel" button image on this window (step S3605), the flow advances to step S3610, and the control unit 201 executes processing for clearing the print job to be printed from the memory 204 and hard disk 208 (step S3610), thus ending this processing.

If the operator designates a "print start" button image on this window (step S3606), the flow advances to step S3608, and the control unit 201 executes print processing on the basis of the print job to be printed (step S3608). Note that the number of copies to be printed is that which is previously set. Then, the control unit 201 executes processing for clearing the print job to be printed from the memory 204 and hard disk 208 (step S3609), thus ending this processing.

On the other hand, if the operator designates a "setting change" button image on this window (step S3607), the flow advances to step S3322 to repeat the aforementioned processes.

Since the processes in steps S3651 and subsequent steps are the same as those in steps S3316 and subsequent steps, a description thereof will be omitted.

In this embodiment as well, as a data input mode for authentication, a method of using a contact type ID card for personal recognition may be used. When a non-contact type ID card for personal recognition and card reader are used, it is recognized that the operator is around a printer as well as personal authentication. If the card reader cannot recognize the ID card, i.e., if the operator leaves his or her seat, a window shown in FIG. 37 is displayed on the display screen of the display unit 301 to implement a scheme that prohibits a job from being restarted by a person other than an original.

The above description has been given mainly for a case wherein the print job is a secure job. When the print job is a non-secure job, no processes associated with input and authentication of a password are required in the above description.

That is, upon handling data of a job set with a trial print function, when the job to be processed by the trial print function is a non-secure print job, a control unit of the image forming apparatus controls to display, on an operation unit of the image forming apparatus, an operation window for prompting the user to select to change settings of print conditions of the job, to continuously print the job for the remaining number of output copies without changing the settings, or the like without executing any authentication processing (e.g., by controlling to prohibit an authentication data request window from being displayed) in response to trial print processing of the job executed by the image forming apparatus. When the user issues a print setting change instruction of the job via the operation window, the control unit controls to print the print job under the print conditions after the setting change for the number of output copies designated initially (i.e., for the number of print copies initially set by the user via the operation unit before execution of the trial print processing in this example).

On the other hand, when the user instructs to continue print processing without changing the settings via the window, the control unit controls to print for the number of output copies obtained by subtracting the number of copies output by the trial print processing from the initially set number of output copies under the initially designated print conditions (corresponding to various print setting conditions at least other than the number of print copies such as a paper size setting, a print setting required to specify double- or single-sided printing, a setting associated with sheet processing such as staple processing, sort processing, or the like, an image layout processing setting, and the like).

In this manner, when a non-secure job undergoes trial print processing, the control unit controls to prohibit the image forming apparatus from executing authentication processing unlike a secure job after execution of the trial print processing, controls to directly display, on the operation unit of the image forming apparatus, the operation window for that job (a user interface window used to execute an operation for changing the settings of the print conditions, to continuously execute print processing without changing the settings of the print conditions, or the like), controls to accept a desired instruction from the user via the UI, and controls the image forming apparatus to execute the operation based on the instruction.

This arrangement can prevent occurrence of new problems (e.g., a non-secure job is affected by the specification for maintaining security upon executing trial print processing of a secure job, and when a non-secure job is to undergo trial print processing, authentication processing such as an input request of a password or the like is required to give users of non-secure jobs extra troubles).

As described above, this embodiment does not adopt a specification that merely maintains security of a secure job after the trial print processing, but it can prevent occurrence of new problems such as poor usability and the like upon executing trial print processing of a non-secure job, and can realize both the effect of maintaining security even after the trial print processing of a secure job, and the effect of improving usability upon executing the trial print processing of a non-secure job. Hence, this embodiment can provide a flexible system which considers use environments of the image forming apparatus, various needs from users, and the like.

Other Embodiments

The objects of the present invention are also achieved when a CPU or MPU of a camera reads out and executes a program code from a recording medium (or storage medium), which records a program code of a software program that can implement the functions of the above-mentioned embodiments. In this case, the program code itself read out from the recording medium implements the functions of the above-mentioned embodiments, and the recording medium which stores the program code constitutes the present invention.

The functions of the above-mentioned embodiments may be implemented not only by executing the readout program code by the camera, but also by some or all of actual processing operations executed by an operating system (OS) running on the camera on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the camera, after the program code read out from the recording medium is written in a memory of the extension card or unit.

When the present invention is applied to the recording medium, that recording medium stores program codes corresponding to the aforementioned flowcharts.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-316308 filed on Oct. 29, 2004, which is hereby incorporated by reference herein.

What is claimed is:

1. A printing apparatus, comprising:
an input unit that inputs a secure print job;
a first authentication unit that performs authentication processing for the secure print job;
a first print unit that, when the authentication processing succeeds, performs a print process based on the secure print job by a predetermined number of print copies less than a number of print copies set to the secure print job;
a second authentication unit that performs the authentication processing after completing the print process by said first print unit;
a first display unit that, when the authentication processing performed by said second authentication unit succeeds, displays a screen for accepting an instruction from a user, wherein the instruction is for instructing performing the print process based on the secure print job or is for instructing changing a print condition of the secure print job;
a second print unit that, when accepting an instruction for instructing performing of the print process based on the secure print job from the user via the screen, performs print processing based on the secure print job by a number of print copies obtained by subtracting the predetermining number of print copies from the number of print copies set to the secure print job;
a third authentication unit that, when accepting an instruction for instructing changing of the print condition of the secure print job from the user via the screen, performs the authentication processing;
a second display unit that, when the authentication processing performed by said third authentication unit succeeds, displays a screen for accepting a changing operation for changing the print condition from the user; and
a third print unit that performs the print process based on the secure print job by the number of print copies set to the secure print job, after accepting the changing operation from the user via the screen displayed by said second display unit.

2. The apparatus according to claim 1, wherein said second authentication unit performs the authentication processing, when a predetermined time elapses without accepting from the user any instruction for instructing performing of the print process based on the secure print job and any instruction for instructing changing of the print condition of the secure print job after completing the print process by said first print unit.

3. The apparatus according to claim 1, wherein said third authentication unit performs the authentication processing, when a predetermined time elapses without accepting from the user any instruction for instructing changing of the print condition of the secure print job after accepting an instruction for instructing changing of the print condition of the secure print job from the user via the screen displayed by said first display unit.

4. The apparatus according to claim 1, further comprising:
a third display unit that displays, after completing the print process by said first print unit, a screen for accepting from the user an instruction for instructing performing of the print process based on the secure print job or being for instructing changing of the print condition,
wherein said second authentication unit removes the screen displayed by said third display unit before the authentication processing to be performed by said second authentication unit.

5. The apparatus according to claim 1, further comprising:
a fourth display unit that displays, after accepting an instruction for instructing a changing of the print condition of the secure print job from the user via the screen displayed by said first display unit, a screen for accepting the changing operation for changing the print condition of the secure print job from the user,
wherein said third authentication unit removes the screen displayed by said fourth display unit before the authentication processing to be performed by said third authentication unit.

6. A printing method, comprising:
an input step of inputting a secure print job;
a first authentication step of performing authentication processing for the secure print job;
a first print step of, when the authentication processing succeeds, performing a print process based on the secure print job by a predetermined number of print copies less than a number of print copies set to the secure print job;
a second authentication step of performing the authentication processing after completing the print process by said first print step;
a first display step of, when the authentication processing performed by said second authentication step succeeds, displaying a screen for accepting an instruction from a user, wherein the instruction is for instructing performing the print process based on the secure print job or is for instructing changing a print condition of the secure print job;
a second print step of, when accepting an instruction for instructing performing of the print process based on the secure print job from the user via the screen, performing print processing based on the secure print job by a number of print copies obtained by subtracting the predetermining number of print copies from the number of print copies set to the secure print job;
a third authentication step of, when accepting an instruction for instructing changing of the print condition of the secure print job from the user via the screen, performing the authentication processing;
a second display step of, when the authentication processing performed by said third authentication step succeeds, displaying a screen for accepting a changing operation for changing the print condition from the user; and
a third print step of performing the print process based on the secure print job by the number of print copies set to the secure print job, after accepting the changing operation from the user via the screen displayed by said second display step.

7. A non-transitory computer-readable storage medium storing a program that, when executed by a computer in a printer, causes the printer to execute a printing method, the program comprising instructions for:
an input step of inputting a secure print job;
a first authentication step of performing authentication processing for the secure print job;
a first print step of, when the authentication processing succeeds, performing a print process based on the secure print job by a predetermined number of print copies less than a number of print copies set to the secure print job;
a second authentication step of performing the authentication processing after completing the print process by said first print step;
a first display step of, when the authentication processing performed by said second authentication step succeeds, displaying a screen for accepting an instruction from a user, wherein the instruction is for instructing performing the print process based on the secure print job or is for instructing changing a print condition of the secure print job;
a second print step of, when accepting an instruction for instructing performing of the print process based on the secure print job from the user via the screen, performing print processing based on the secure print job by a number of print copies obtained by subtracting the predetermining number of print copies from the number of print copies set to the secure print job;
a third authentication step of, when accepting an instruction for instructing changing of the print condition of the secure print job from the user via the screen, performing the authentication processing;
a second display step of, when the authentication processing performed by said third authentication step succeeds, displaying a screen for accepting a changing operation for changing the print condition from the user; and
a third print step of performing the print process based on the secure print job by the number of print copies set to the secure print job, after accepting the changing operation from the user via the screen displayed by said second display step.

* * * * *